(12) United States Patent
Hagen et al.

(10) Patent No.: US 9,316,178 B2
(45) Date of Patent: Apr. 19, 2016

(54) INTERNAL COMBUSTION ENGINE FOR NATURAL GAS COMPRESSOR OPERATION

(71) Applicant: State of Oregon acting by and through the State Board of Higher Education on behalf of Oregon State University, Corvallis, OR (US)

(72) Inventors: Christopher L. Hagen, Bend, OR (US); Guy Babbitt, Fort Collins, CO (US); Christopher Turner, Fort Collins, CO (US); Nick Echter, Fort Collins, CO (US); Kristina Weyer-Geigel, Fort Collins, CO (US)

(73) Assignee: State of Oregon Acting By and Through the State Board of Higher Education on Behalf of Oregon State University, Corvallis, OR (US)

( * ) Notice: Subject to any disclaimer, the term of this patent is extended or adjusted under 35 U.S.C. 154(b) by 0 days.

(21) Appl. No.: 14/244,807

(22) Filed: Apr. 3, 2014

(65) Prior Publication Data

US 2014/0238327 A1    Aug. 28, 2014

Related U.S. Application Data

(63) Continuation of application No. PCT/US2014/019623, filed on Feb. 28, 2014.

(60) Provisional application No. 61/770,265, filed on Feb. 27, 2013.

(51) Int. Cl.
| | | |
|---|---|---|
| *F02B 43/00* | (2006.01) | |
| *F02M 21/02* | (2006.01) | |
| *F02D 13/06* | (2006.01) | |
| *F02D 19/02* | (2006.01) | |
| *F02B 3/06* | (2006.01) | |
| *F02B 1/04* | (2006.01) | |
| *F02M 25/00* | (2006.01) | |
| *F02B 43/10* | (2006.01) | |
| *F02D 19/08* | (2006.01) | |

(52) U.S. Cl.
CPC ........... *F02M 21/0215* (2013.01); *F02D 13/06* (2013.01); *F02D 19/022* (2013.01); *F02M21/029* (2013.01); *F02M 21/0224* (2013.01); *F02M 21/0245* (2013.01); *F02B 1/04* (2013.01); *F02B 3/06* (2013.01); *F02B 43/10* (2013.01); *F02D 19/08* (2013.01); *F02M 25/00* (2013.01); *Y02T 10/18* (2013.01); *Y02T 10/32* (2013.01)

(58) Field of Classification Search
CPC .............. F02B 1/04; F02B 43/10; F02B 3/06; F02M 25/00; F02D 19/08
USPC ........................................................ 123/1 A
See application file for complete search history.

(56) References Cited

U.S. PATENT DOCUMENTS

| | | |
|---|---|---|
| 3,958,900 A | 5/1976 | Ueno |
| 4,825,820 A | 5/1989 | Morgan |
| 5,163,409 A | 11/1992 | Gustafson |
| 5,947,697 A | 9/1999 | Morrison |
| 8,356,478 B2 | 1/2013 | Fong et al. |
| 2007/0079815 A1* | 4/2007 | Shinkarenko et al. ........ 123/525 |
| 2010/0077982 A1* | 4/2010 | Chapman et al. ........ 123/184.56 |
| 2013/0192701 A1 | 8/2013 | Poorman |
| 2014/0182561 A1 | 7/2014 | Ibizugbe, Jr. |

FOREIGN PATENT DOCUMENTS

| | | | |
|---|---|---|---|
| EP | 269882 A | * | 6/1988 |
| EP | 0 938 625 | | 10/2003 |
| EP | 1 882 879 A2 | | 1/2008 |
| FR | 2257782 | | 8/1975 |
| GB | 1466311 | | 3/1977 |
| GB | 2403772 | | 1/2005 |
| WO | WO 2007/122108 | | 11/2007 |
| WO | WO 2009/020488 | | 2/2009 |

OTHER PUBLICATIONS

"Pioneering natural gas vehicle research," College of Engineering, Oregon State University, http://engineering.oregonstate.edu/pioneering-natural-gas-vehicle-research, 5 pp., published Oct. 17, 2012, downloaded Dec. 17, 2014.

Elgin, et al., "Combustion Chamber Design Considerations for a Compression Ignition Engine to Spark Ignited Natural Gas Engine Conversion," presented at the 2013 Fall Technical Meeting of the Western States Section of the Combustion Institute, Fort Collins, CO, Oct. 7, 2013, 6 pp.

NGV Onboard Refueling System, presentation given at 2013 ARPA-E MOVE Annual Meeting, Atlanta, GA, Nov. 18, 2013, 4 pp.

NGV Self-Contained Home Filling Station, poster presented at 2012 ARPA-E MOVE Kickoff Meeting, Arlington, VA, Dec. 6, 2012, 3 pp.

PDF of http://arpa-e.energy.gov/?q=arpa-e-projects/gas-compressing-engine, Natural Gas Vehicle Self-Contained Home Filling Station, Oregon State University—Cascades, 2 pp, archived Feb. 20, 2013, downloaded Dec. 17, 2014.

PDF of http://www.osucascades.edu/chris-hagen, Chris Hagen, Oregon State University—Cascades, 5 pp, archived Apr. 29, 2013, downloaded Dec. 17, 2014.

International Search Report and Written Opinion issued by the ISA/US on Jun. 6, 2014, for corresponding PCT patent application No. PCT/US2014/019623, filed Feb. 28, 2014, 11 pp.

Natural Gas Vehicle Self-Contained Home Filling Station, poster presented at 2013 ARPA-E Energy Innovation Summit, Washington, D.C., Feb. 25, 2013, 4 pp.

PDF of http://www.osucascades.edu/chris-hagen, Chris Hagen, Oregon State University—Cascades, 5 pp, archived Jan. 5, 2013.

PDF of http://www.osucascades.edu/powered-natural-gas, Powered by Natural Gas, Oregon State University—Cascades, 2 pp, archived Oct. 26, 2013.

International Search Report and Written Opinion issued by the ISA/European Patent Office on Jun. 8, 2015, for related PCT Patent Application No. PCT/US2015/023932, filed Apr. 1, 2015, 11 pp.

\* cited by examiner

*Primary Examiner* — Lindsay Low
*Assistant Examiner* — Charles Brauch
(74) *Attorney, Agent, or Firm* — Klarquist Sparkman, LLP

(57) ABSTRACT

This application concerns systems and methods for compressing natural gas with an internal combustion engine. In a representative embodiment, a system for compressing a gas comprises a reciprocating internal combustion engine including at least one piston-cylinder assembly comprising a piston configured to travel in a cylinder and to compress gas in the cylinder in multiple compression stages. The system can further comprise a first pressure tank in fluid communication with the piston-cylinder assembly to receive compressed gas from the piston-cylinder assembly until the first pressure tank reaches a predetermined pressure, and a second pressure tank in fluid communication with the piston-cylinder assembly and the first pressure tank. The second pressure tank can be configured to receive compressed gas from the piston-cylinder assembly until the second pressure tank reaches a predetermined pressure. When the first and second pressure tanks have reached the predetermined pressures, the first pressure tank can be configured to supply gas to the piston-cylinder assembly, and the piston can be configured to compress the gas supplied by the first pressure tank such that the compressed gas flows into the second pressure tank.

21 Claims, 23 Drawing Sheets

INTERNAL COMBUSTION ENGINE FOR NATURAL GAS COMPRESSOR OPERATION

CROSS REFERENCE TO RELATED APPLICATION

This application is a continuation of International Patent Application No. PCT/US2014/019623, filed on Feb. 28, 2014, which claims the benefit of the earlier filing date of U.S. Provisional Application No. 61/770,265, filed on Feb. 27, 2013, both of which are incorporated herein by reference in their entirety.

ACKNOWLEDGMENT OF GOVERNMENT SUPPORT

This invention was made with government support under DE-AR0000259 awarded by the U.S. Department of Energy. The government has certain rights in the invention.

FIELD

This application concerns systems and methods for compressing natural gas with an internal combustion engine.

BACKGROUND

Reciprocating internal combustion engines for passenger and commercial vehicles that are configured to operate on natural gas are commonly available. Internal combustion engines configured to operate using conventional motor fuels, such as gasoline or diesel, are also easily converted to run on natural gas. However, relatively few refueling stations exist that offer compressed natural gas for use in passenger and commercial vehicles. As a result, operators of natural gas-powered vehicles often must drive long distances to the nearest refueling station. This lack of natural gas refueling infrastructure has limited the adoption of natural gas-powered vehicles by the public and industry to those who operate on fixed routes and/or return to a central location where a refueling station can be located. Accordingly, improvements to systems and methods for refueling natural gas-powered vehicles are desirable.

SUMMARY

Disclosed herein are representative systems and methods that can be used to compress natural gas using an internal combustion engine for storage onboard a vehicle. In a representative embodiment, a system for compressing a gas comprises a reciprocating internal combustion engine including at least one piston-cylinder assembly comprising a piston configured to travel in a cylinder and to compress gas in the cylinder in multiple compression stages. The system can further comprise a first pressure tank in fluid communication with the piston-cylinder assembly to receive compressed gas from the piston-cylinder assembly until the first pressure tank reaches a predetermined pressure, and a second pressure tank in fluid communication with the piston-cylinder assembly and the first pressure tank. The second pressure tank can be configured to receive compressed gas from the piston-cylinder assembly until the second pressure tank reaches a predetermined pressure. When the first and second pressure tanks have reached the predetermined pressures, the first pressure tank can be configured to supply gas to the piston-cylinder assembly, and the piston can be configured to compress the gas supplied by the first pressure tank such that the compressed gas flows into the second pressure tank.

In another representative embodiment, a method comprises supplying gas to a piston-cylinder assembly of an internal combustion engine from a gas source, the piston-cylinder assembly including a piston configured to travel in a cylinder, the piston-cylinder assembly being fluidly connected to a first pressure tank and a second pressure tank. The method can further comprise compressing the gas in the piston-cylinder assembly with the piston such that the gas flows into the first and second pressure tanks, supplying gas from the first pressure tank to the piston-cylinder assembly when the first and second pressure tanks reach a predetermined pressure, and compressing the gas in the piston-cylinder assembly with the piston such that compressed gas flows into the second pressure tank.

Another representative embodiment comprises one or more non-transitory processor-readable storage media storing computer-executable instructions for causing one or more processors to perform a method comprising opening a first valve when a piston of a piston-cylinder assembly reaches bottom dead center. A cylinder of the piston-cylinder assembly can contain a gas to be compressed, and the first valve can be in fluid communication with a first pressure tank and a second pressure tank. The method can further comprise sensing the pressure in the first and second pressure tanks, closing the first valve when the pressure in the first and second pressure tanks reaches a predetermined pressure, and opening a second valve in communication with the first pressure tank and the piston-cylinder assembly when the piston reaches top dead center such that gas from the first pressure tank flows into the piston-cylinder assembly as the piston travels from top dead center to bottom dead center. The method can further comprise sensing the pressure in the second pressure tank, and closing the second valve when the pressure in the second pressure tank reaches a predetermined pressure.

In another representative embodiment, a reciprocating internal combustion engine configured to compress natural gas for storage onboard an automobile can comprise a plurality of piston-cylinder assemblies, and each of the piston-cylinder assemblies can include a piston configured to travel in a cylinder. At least one of the piston-cylinder assemblies can be configured as a bimodal piston-cylinder assembly to operate in a combustion mode or a compression mode. The engine can further comprise a valve head located above the plurality of piston-cylinder assemblies and including at least one intake valve and at least one exhaust valve located above each respective piston-cylinder assembly. The intake valves can be configured to supply a fuel-air mixture to the respective piston-cylinder assemblies before a combustion stroke of the respective pistons. The exhaust valves can be configured to exhaust combustion gases from the respective piston-cylinder assemblies after the combustion stroke of the respective pistons. The engine can further comprise one or more compressor valves located in the valve head above the bimodal piston-cylinder assembly. The one or more compressor valves can be in fluid communication with the bimodal piston-cylinder assembly and with at least one pressure tank through a manifold in the valve head.

The foregoing and other objects, features, and advantages of the invention will become more apparent from the following detailed description, which proceeds with reference to the accompanying figures.

DETAILED DESCRIPTION

For purposes of this description, certain aspects, advantages, and novel features of the embodiments of this disclosure are described herein. The disclosed methods, apparatuses, and systems should not be construed as limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level abstractions of the actual operations that are performed. The actual operations that correspond to these terms may vary depending on the particular implementation and are readily discernible by one of ordinary skill in the art.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

Figure 1:
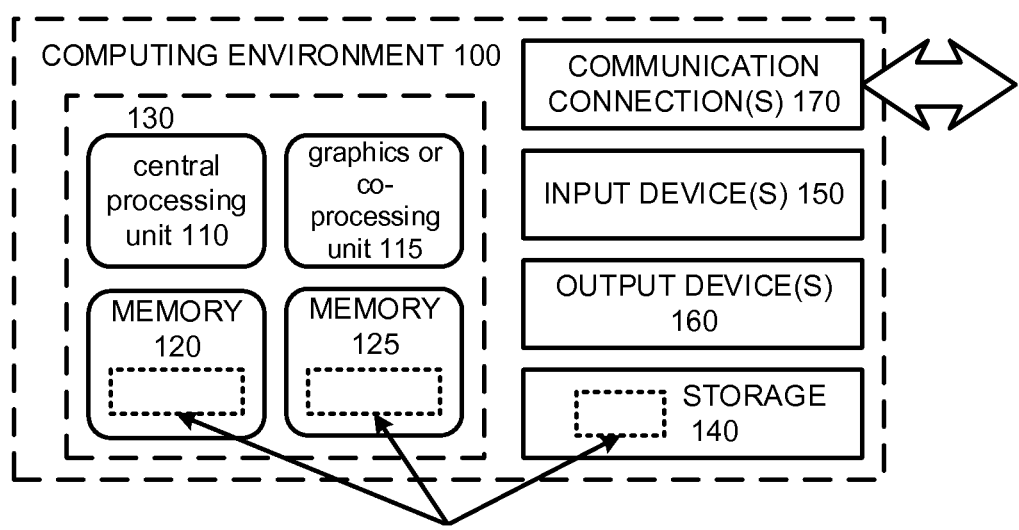
FIG. 1 is a schematic illustration of a representative computing environment for carrying out control of a natural gas compression system.

FIG. 1 depicts a generalized example of a suitable computing environment 100 in which software and control algorithms for the described innovations may be implemented. The computing environment 100 is not intended to suggest any limitation as to scope of use or functionality, as the innovations may be implemented in diverse general-purpose or special-purpose computing systems. For example, the computing environment 100 can be any of a variety of computing devices (e.g., desktop computer, laptop computer, server computer, tablet computer, media player, gaming system, mobile device, programmable automation controller etc.)

With reference to FIG. 1, the computing environment 100 includes one or more processing units 110, 115 and memory 120, 125. In FIG. 1, this basic configuration 130 is included within a dashed line. The processing units 110, 115 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 1 shows a central processing unit 110 as well as a graphics processing unit or co-processing unit 115. The tangible memory 120, 125 may be volatile memory (e.g., registers, cache, RAM), non-volatile memory (e.g., ROM, EEPROM, flash memory, etc.), or some combination of the two, accessible by the processing unit(s). The memory 120, 125 stores software 180 implementing one or more innovations described herein, in the form of computer-executable instructions suitable for execution by the processing unit(s).

A computing system may have additional features. For example, the computing environment 100 includes storage 140, one or more input devices 150, one or more output devices 160, and one or more communication connections 170. An interconnection mechanism (not shown) such as a bus, controller, or network, interconnects the components of the computing environment 100. Typically, operating system software (not shown) provides an operating environment for other software executing in the computing environment 100, and coordinates activities of the components of the computing environment 100.

The tangible storage 140 may be removable or non-removable, and includes magnetic disks, magnetic tapes or cassettes, CD-ROMs, DVDs, or any other medium that can be used to store information in a non-transitory way and can be accessed within the computing environment 100. The storage 140 stores instructions for the software 180 implementing one or more innovations described herein.

The input device(s) 150 may be: a touch input device, such as a keyboard, mouse, pen, or trackball; a voice input device; a scanning device; any of various sensors; another device that provides input to the computing environment 100; or combinations thereof. For video encoding, the input device(s) 150 may be a camera, video card, TV tuner card, or similar device that accepts video input in analog or digital form, or a CD-ROM or CD-RW that reads video samples into the computing environment 100. The output device(s) 160 may be a display, printer, speaker, CD-writer, or another device that provides output from the computing environment 100.

The communication connection(s) 170 enable communication over a communication medium to another computing entity. The communication medium conveys information, such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones, other mobile devices that include computing hardware, or programmable automation controllers). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Figure 2:
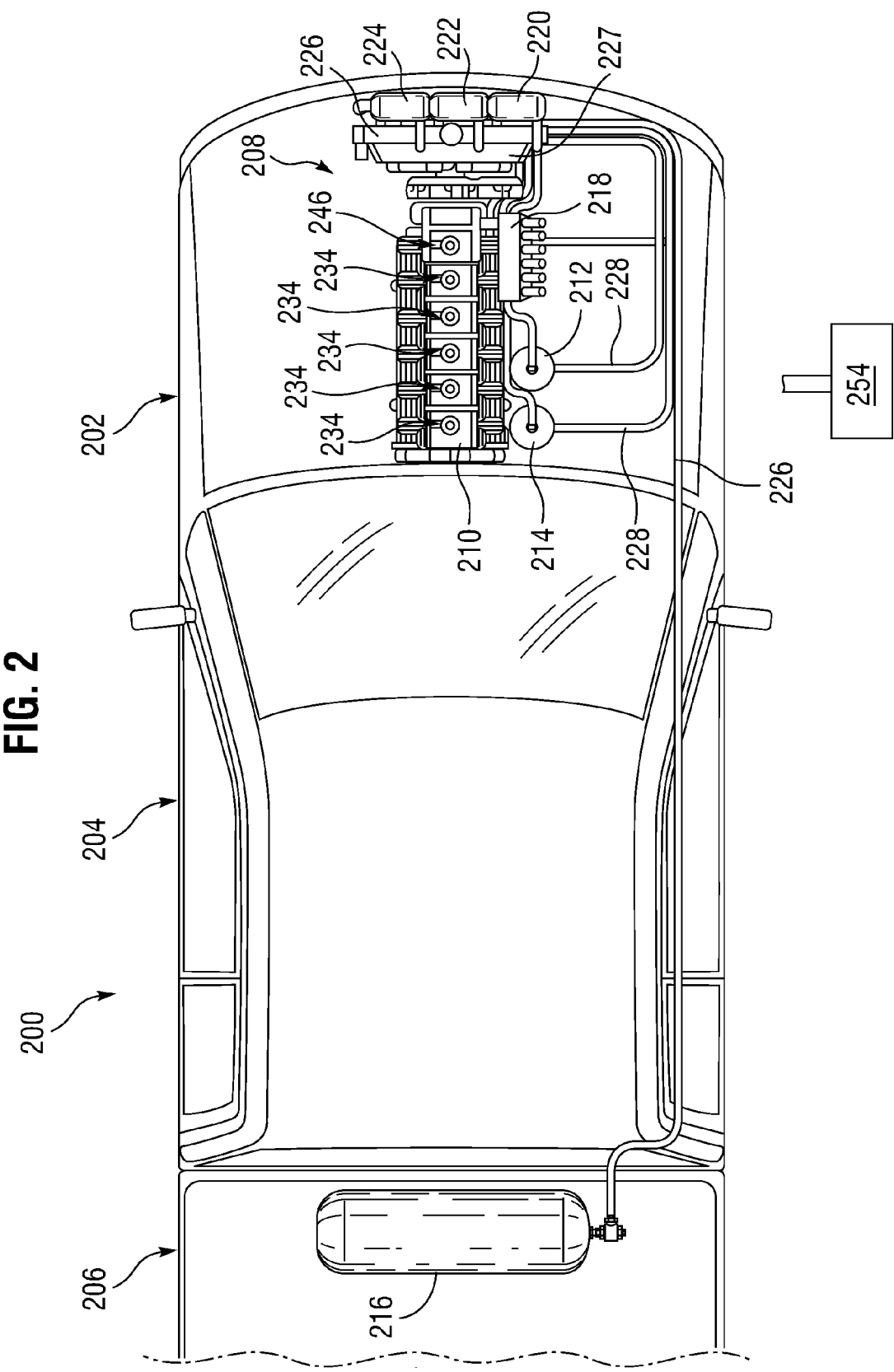
FIG. 2 is a plan view of a vehicle having an onboard natural gas compression system.

Referring to FIG. 2, a representative natural gas-powered automobile or vehicle 200 can comprise an engine compartment 202, a cabin portion 204, and a rear portion 206. As used herein, the terms "natural gas" and "gas" refer to a hydrocarbon gas, the primary component of which is methane gas having the chemical formula $CH_4$. The vehicle 200 can further include a natural gas compression system generally indicated at 208 configured to compress and store natural gas onboard the vehicle 200 for use as fuel. The natural gas compression system 208 can include a reciprocating internal combustion engine 210, at least one pressure tank, such as a first pressure tank 212, a second pressure tank 214, a third pressure tank 216, and a valve block 218. In the embodiment shown, the engine 210, valve block 218, and the first and second pressure tanks 212, 214 can all be located in the engine compartment 202, while the third pressure tank 216 is shown located in the rear portion 206 of the vehicle 200. The first, second, and third pressure tanks 212, 214, 216 can all be in fluid communication with the valve block 218 via a series of gas lines generally indicated at 228. The system 208 can also include first, second, and third heat exchangers 220, 222, 224 shown located in the engine compartment 202 forward of a radiator 226. Control logic for controlling the various components of the natural gas compression system 208 can be implemented by an onboard computer, such as the computer 100 described above.

In the embodiment shown, the valve block 218 can be in fluid communication with a natural gas source 254, such as a municipal gas utility hookup. In some embodiments, the natural gas source 254 can be coupled to the vehicle 200 by a gas supply nozzle. The engine 210 can be configured to compress natural gas supplied by the natural gas source 254 such that the gas flows into the first, second, and third pressure tanks 212, 214, 216 until they reach a first predetermined pressure. The gas contained in the first pressure tank 212 can then be compressed further such that the gas flows into the second and third pressure tanks 214, 216 until the second and third pressure tanks 214, 216 reach a second predetermined pressure. The gas in the second pressure tank 214 can then be further compressed such that it flows into the third pressure tank 216 at a final pressure. In this manner, the natural gas can be compressed in multiple compression stages using the same piston-cylinder assembly, as more fully described below. In alternative embodiments, the natural gas compression system 208 disclosed herein can also be compatible with various other hydrocarbon gases including propane and butane, to name a few.

Figure 3:
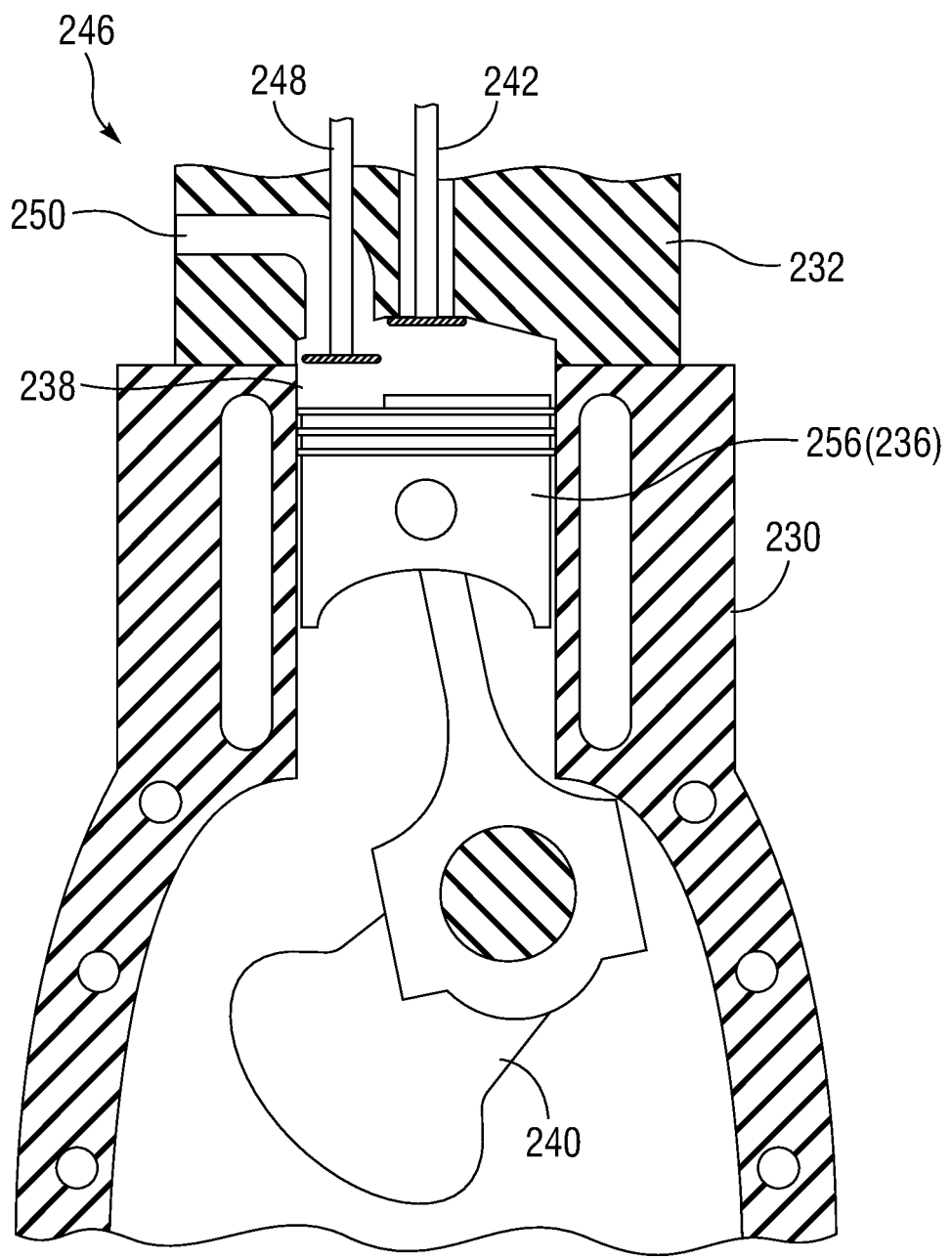
FIG. 3 is a cross-sectional view of an engine including a bimodal piston-cylinder assembly.

Referring to FIGS. 2 and 3, the engine 210 can include a cylinder block 230, a cylinder head 232, and a plurality of piston-cylinder assemblies 234. Each of the piston-cylinder assemblies 234 can include a piston (e.g., representative piston 236 configured as a bimodal piston 256, further described below) configured to travel in a cylinder 238 defined by the cylinder block 230 and the cylinder head 232. The pistons 236 can be coupled to a crankshaft 240 such that rotary motion of the crankshaft 240 translates to linear motion of the piston 236 in the cylinder 238. In this manner, the pistons 236 can be configured to travel in the respective cylinders 238 between a top dead center (TDC) position and a bottom dead center (BDC) position. As used herein, the term "top dead center" refers to a position of the piston 236 in the cylinder 238 in which the piston 236 is farthest from the rotational axis of the crankshaft 240. As used herein, the term "bottom dead center" refers to a position of the piston 236 in the cylinder 238 in which the piston 236 is closest to the rotational axis of the crankshaft 240.

In the embodiment shown, the engine 210 includes six piston-cylinder assemblies 234 in an inline arrangement (i.e., an inline six-cylinder engine). Alternatively, the engine 210 can include any suitable number of piston-cylinder assemblies 234 arranged in any suitable arrangement including, without limitation, an inline four-cylinder engine, an inline five-cylinder engine, or an engine having more than one bank of piston-cylinder assemblies connected to a common crank shaft including, for example, any V-arrangement such as a V-twin engine, a V6 engine, a V8 engine, etc., and can be configured as a two-cycle engine or a four-cycle engine.

The engine 210 can be a spark-ignited internal combustion engine configured to operate using natural gas as fuel. In some embodiments, the engine 210 can be specially designed to operate using natural gas as fuel, or can be retrofitted to operate using natural gas as fuel. For example, the engine 210 can be a spark-ignited internal combustion engine originally configured to operate using gasoline as fuel that has been converted to operate using natural gas. Similarly, the engine 210 can also be a compression-ignited internal combustion engine originally configured to operate using diesel fuel that has been converted to operate using natural gas.

Each of the piston-cylinder assemblies 234 can include at least one intake valve 242 and at least one exhaust valve 244 located in the cylinder head 232. The intake valves 242 and the exhaust valves 244 can be movable between respective open positions and closed positions according to the location of the pistons 236 in the cylinders 238, and the corresponding radial position of the crankshaft 240. When in the open position, the intake valves 242 can be configured to supply a fuel-air mixture to the respective piston-cylinder assemblies 234 before a combustion stroke of the respective pistons 236. When in the open position, the exhaust valves 244 can allow evacuation of combustion gases from the respective piston-cylinder assemblies 234 after the combustion stroke of the respective pistons 236. In this manner, each of the piston-cylinder assemblies 234 can operate in a combustion mode when the engine 210 is turned on. In the embodiment shown, each piston-cylinder assembly 234 includes one intake valve 242 and one exhaust valve 244 (FIG. 4) configured as poppet valves. The intake and exhaust valves 242, 244 can be biased toward the closed position by springs 252. In alternative embodiments, the piston-cylinder assemblies 234 can include any suitable number of intake valves and/or exhaust valves configured as any suitable valve type.

Figure 4:
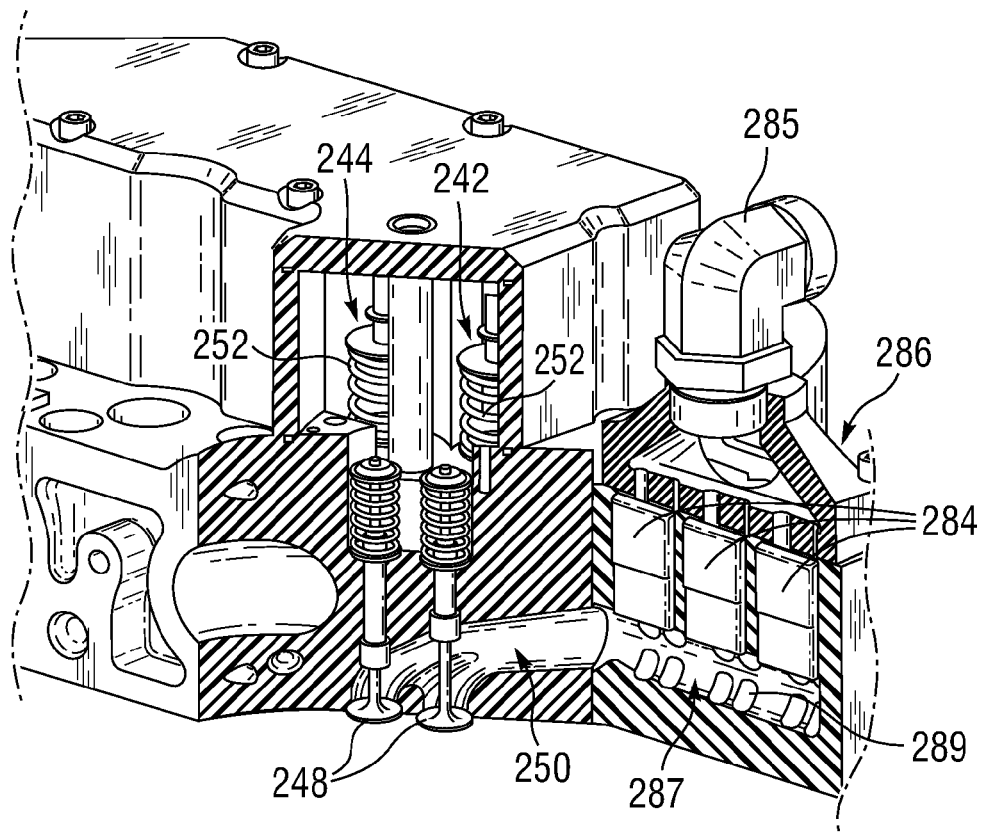
FIG. 4 is a sectional perspective view of a cylinder head of the engine of FIG. 3.
Figure 5:
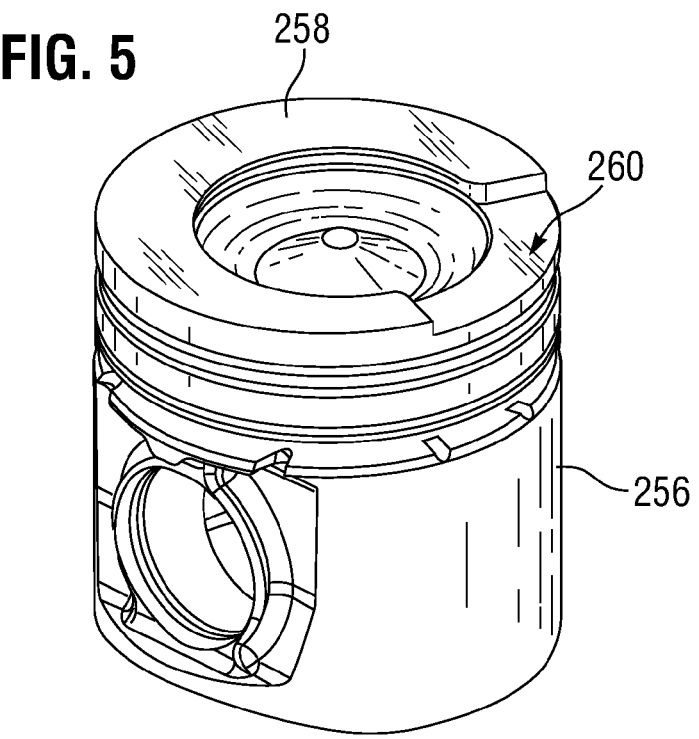
FIG. 5 is a perspective view of a bimodal piston.

Referring to FIGS. 2, 3 and 4, one or more of the piston-cylinder assemblies 234 can be configured as a bimodal piston-cylinder assembly 246. In addition to the intake and exhaust valves 242, 244, the bimodal piston-cylinder assembly 246 can include one or more compressor valves 248 disposed in the cylinder head 232. The one or more compressor valves 248 can be configured as poppet valves, and can be movable between an open position and a closed position. As shown in FIG. 3, the compressor valves 248 can be in communication with the valve block 218 via a passageway or manifold 250 defined by the cylinder head 232. In the embodiment shown, the bimodal piston-cylinder assembly 246 includes two compressor valves 248. However, in alternative embodiments, the bimodal piston-cylinder assembly 246 can include any suitable number of compressor valves 248 including, for example, a single compressor valve 248.

The bimodal piston-cylinder assembly 246 can be configured to operate in the combustion mode or in a compressor mode. In the combustion mode, the bimodal piston-cylinder assembly 246 can burn a fuel-air mixture drawn in through the intake valve 242 and exhaust the combustion gases through the exhaust valve 244 in a standard four-cycle mode (i.e., an intake stroke, followed by a compression stroke, followed by a combustion stroke, followed by an exhaust stroke). The various stages of the four-cycle combustion mode can occur in accordance with the position of the bimodal piston-cylinder assembly 246 in the firing order relative to the other piston-cylinder assemblies 234. While operating in the combustion mode, the compressor valves 248 can be in the closed position, thereby isolating the cylinder 238 of the bimodal piston-cylinder assembly 246 from the manifold 250.

In the compressor mode, the intake and exhaust valves 242, 244 can be deactivated (e.g., by collapsible cam lifters) such that they remain in the default closed position, and the compressor valves 248 can move to the open position. In this manner, the bimodal piston-cylinder assembly 246 can be in fluid communication with the manifold 250 and the valve block 218. In this manner, natural gas from the natural gas source 254 can be drawn into the cylinder 238 of the bimodal piston cylinder assembly 246 through the manifold 250 and compressed by the piston 236. The remaining piston-cylinder assemblies 234 can continue to operate in the combustion mode, thereby providing power to drive the bimodal piston-cylinder assembly 246 in the compressor mode. This can allow the bimodal piston-cylinder assembly 246 to compress gas in multiple compression stages, such as in three compression stages, as further described below.

The bimodal piston-cylinder assembly 246 can include a bimodal piston 256, and can be configured to compress natural gas in a two-cycle mode when operating in the compressor mode (i.e., natural gas is drawn into the cylinder 238 on a downward stroke of the bimodal piston 256 and compressed by the bimodal piston 256 on an upward stroke). As a result, the compressor valves 248 serve as both inlet and outlet valves for natural gas while operating in the compressor mode. The compressor valves 248 can, therefore, remain in the open position throughout each two-cycle compression event. Because the compressor valves 248 extend inwardly into the cylinder 238 of the bimodal piston-cylinder assembly 246 when in the open position, the top surface 258 of the bimodal piston 256 can include a cutout region 260. The cutout region 260 can provide clearance such that the bimodal piston 256 and the compressor valves 248 do not interfere with one another when the bimodal piston-cylinder assembly 246 is operating in the compressor mode.

When operating in the combustion mode, the bimodal piston-cylinder assembly 246 can have a compression ratio defined by the ratio of the volume of the cylinder 238 when the bimodal piston 256 is in the BDC position to the volume of the cylinder 238 when the bimodal piston 256 is in the TDC position. In the embodiment shown, the bimodal piston-cylinder assembly 246 can have a compression ratio of about 17:1 when operating in the combustion mode. When operating in the compression mode, the compressor valves 248 remain open throughout the two-cycle compression event. As a result, the volumes defined by the manifold 250 and a plenum 287 of a check valve housing 286 in communication with the manifold 250 (further described below) can add additional clearance volume to the cylinder 238 when the bimodal piston 256 is in the TDC position, as shown in FIG. 4. As used herein, the term "clearance volume" refers to the volume defined between the bimodal piston 256 and the cylinder head 232 when the bimodal piston 256 is in the TDC position. This additional clearance volume can reduce the compression ratio of the bimodal piston-cylinder assembly 246 when operating in the compressor mode.

Reducing the compression ratio of the bimodal piston-cylinder assembly 246 when operating in the compressor mode can have advantageous effects. For example, as natural gas is compressed to higher pressures in the second and third stages of compression, the intake stroke of the bimodal piston-cylinder assembly 246 can impart torque on crankshaft 240 acting in a direction opposite the direction of rotation of the crankshaft 240. High torque impulses on the crankshaft 240 can have undesirable effects, including stopping the engine 210 or causing components of the engine 210 to fail. Thus, reducing the compression ratio of the bimodal piston-cylinder assembly 246 when operating in the compressor mode can result in a corresponding reduction in the counter-rotational torque applied to the crankshaft 240 by the piston 236 when the bimodal piston-cylinder assembly 246 is operating in the compressor mode. Accordingly, the compression ratio of the bimodal piston-cylinder assembly 246 when operating in the compressor mode can vary according to the respective volumes of the manifold 250 and the plenum 287. In some embodiments, the compression ratio of the bimodal piston-cylinder assembly 246 when operating in the compressor mode can be about 5.9:1. In alternative embodiments, the compression ratio of the bimodal piston-cylinder assembly 246 when operating in the compressor mode can be about 6:1, about 13:1, or any other suitable compression ratio, as desired.

Figure 6:
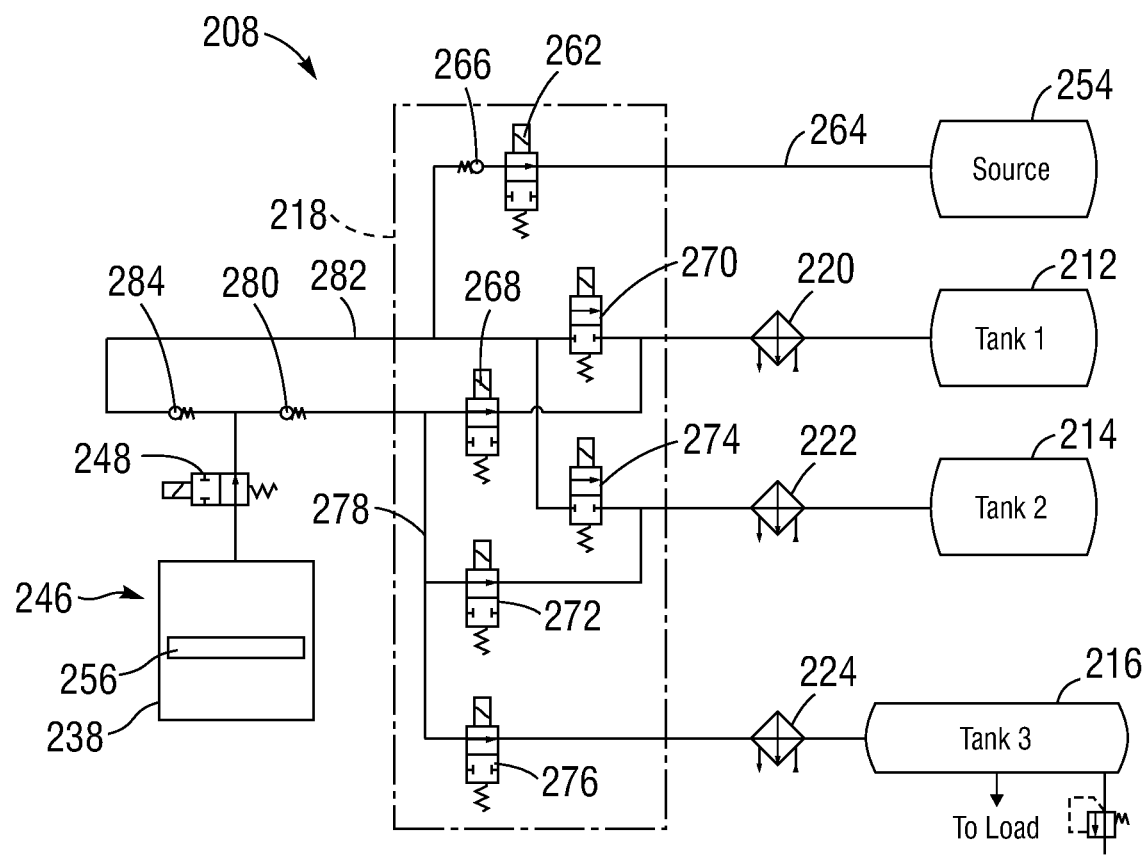
FIG. 6 is a schematic representation of a natural gas compression system including three pressure tanks.

The valve block 218 is illustrated in FIG. 2 and shown schematically in FIG. 6 The valve block 218 can include a plurality of actively and passively actuated valves in communication with the first, second, and third pressure tanks 212, 214, 216, the natural gas source 254, and the bimodal piston-cylinder assembly 246. Actively actuated valves can include, for example, solenoid valves and pneumatically actuated valves. Passively actuated valves can include, for example, spring-biased check valves configured to open when the pressure exerted against the check valve reaches a predetermined pressure. In the embodiment shown, the actively actuated valves are configured as solenoid valves, while the passively actuated valves are configured as spring-biased check valves. However, the actively and passively actuated valves described herein can be configured to be actuated in any suitable manner.

FIG. 6 illustrates a schematic representation of the natural gas compression system 208. The valve block 218 (represented in phantom) can include a gas source valve 262 in fluid communication with the natural gas source 254 via a gas source conduit 264. The gas source valve 262 can be movable between an open position and a closed position, and can be controlled by the computer 100. For example, when the bimodal piston cylinder assembly 246 is operating in the combustion mode, the gas source valve 262 can be closed. When the bimodal piston-cylinder assembly 246 is operating in the compressor mode, the gas source valve 262 can be open to allow natural gas to enter the natural gas compression system 208. A source check valve 266 can be located in series with the gas source valve 262, and can be configured to open when the pressure downstream of the source check valve 266 falls below a predetermined pressure. In this manner, the source check valve 266 can allow natural gas to flow into the natural gas compression system 208 when the pressure in the system 208 is below the pressure of the natural gas source 254, while preventing natural gas from flowing back toward the source 254 when the pressure in the system 208 is greater than the pressure of the source 254.

The valve block 218 can include a first pressure tank inlet valve 268 and a first pressure tank outlet valve 270 in communication with the first pressure tank 212. The valve block 218 can also include a second pressure tank inlet valve 272 and a second pressure tank outlet valve 274 in communication with the second pressure tank 214, and a third pressure tank inlet valve 276 in communication with the third pressure tank 216. The first pressure tank inlet valve 268, the second pressure tank inlet valve 272, and the third pressure tank inlet valve 276 can all be coupled to a high-pressure outlet header 278. The high-pressure outlet header 278 can be in communication with the compressor valves 248, and thereby the bimodal piston cylinder assembly 246, via an output check valve 280. Similarly, the first pressure tank outlet valve 270 and the second pressure tank outlet valve 274 can be coupled to an intake header 282 in communication with the compressor valves 248, and thereby the bimodal piston-cylinder assembly 246, via an intake check valve 284. The first, second, and third pressure tank inlet valves 268, 272, 276 can all be movable between respective open and closed positions, as controlled by the computer 100, and can be configured to allow natural gas to flow into the respective first, second, and third pressure tanks 212, 214, 216 from the high-pressure output header 278. Similarly, the first second pressure tank outlet valves 270, 274 can be movable between respective open and closed positions, as controlled by the computer 100, and can be configured to allow gas to flow out of the first and second tanks 212, 214 into the intake header 282.

In the embodiment shown, the intake check valve 284 can be configured as three intake check valves 284 contained in the check valve housing 286 (FIG. 4). The check valve housing 286 can define the plenum 287, which can be in communication with the manifold 250, as described above. The intake check valves 284 can be in communication with the plenum 287, and with a natural gas inlet connector 285. The natural gas inlet connector 285 can be in communication with the intake header 282 and the gas source conduit 264 (see FIG. 6). Likewise, the outlet check valve 280 can be configured as three outlet check valves (not shown), which can be in communication with the plenum 287 via a plurality of outlet ports, such as representative outlet port 289.

Compression of the natural gas between stages can cause the natural gas to increase in temperature, which can reduce the mechanical and thermal efficiency of the natural gas compression system 208. Thus, prior to flowing into the first, second, and third pressure tanks 212, 214, 216, the natural gas can flow through respective first, second, and third heat exchangers 220, 222, 224 illustrated in FIG. 2, and shown schematically in FIG. 7. As shown in FIG. 2, the heat exchangers 220, 222, 224 can be located forward of the radiator 226. In this manner, a radiator fan 227 located behind the radiator 226 can induce air currents to flow across the heat exchangers 220, 222, 224, thereby cooling the gas flowing through the heat exchangers 220, 222, 224 between compression stages. In some embodiments, the heat exchangers 220, 222, 224 can be further configured to make use of an air conditioning system on the vehicle 200 when air flow induced by the radiator fan is insufficient (for example, when the vehicle is stationary).

Operation of the natural gas compression system 208 can proceed in the following manner. If all of the piston-cylinder assemblies 234 of the engine 210 are operating in the combustion mode, the engine 210 can first be turned off. A user can then connect the natural gas source 254 to a natural gas input (not shown) on the vehicle 200 such that gas flows from the natural gas source 254 to the gas source conduit 264 of the valve block 218 at the pressure of the natural gas source 254. The user can then engage the natural gas compression system 208 by, for example, activating a switch or other mechanism in the cab portion 204 of the vehicle 200. The computer 100 can then prepare the bimodal piston-cylinder assembly 246 to operate in the compressor mode by transmitting commands to collapse the cam lifters associated with the intake and exhaust valves 242, 244, causing intake and exhaust valves 242, 244 to remain in the closed position. The computer 100 can also transmit commands to open the compressor valves 248. The engine 210 can then be restarted with the bimodal piston-cylinder assembly 246 operating in the compressor mode.

Figure 7:
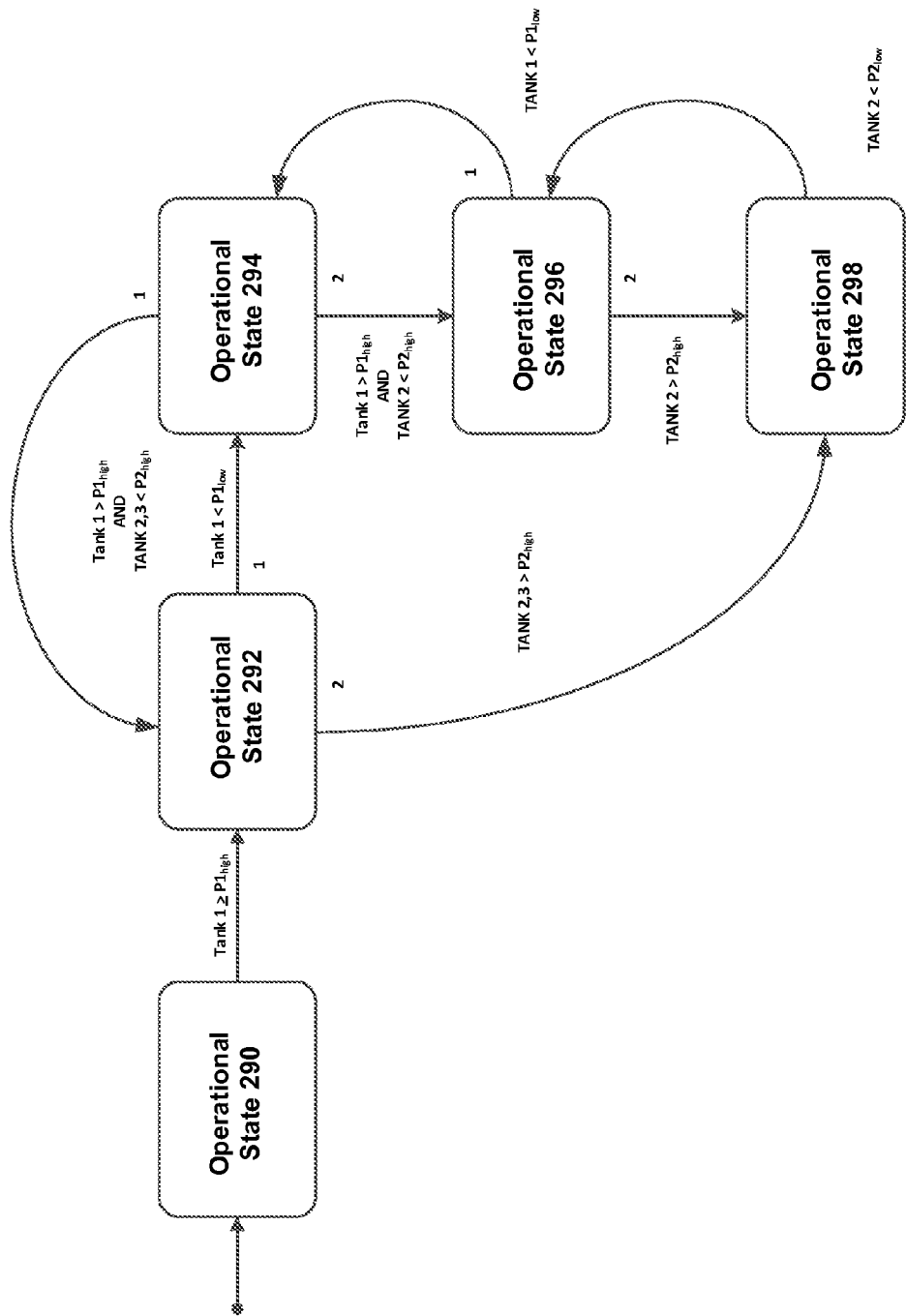
FIG. 7 is a flow chart illustrating one embodiment of a method of compressing natural gas.

Compression of natural gas can proceed in multiple compression stages, such as in three compression stages, by switching between five operational states 290, 292, 294, 296, and 298, as shown schematically in FIG. 7. The position (open or closed) of the respective actively actuated valves 262, 268, 270, 272, 274, and 276, and of the passively actuated source check valve 266, in each respective operational state, are indicated in Table 1. In the first compression stage, pressure tanks 212, 214, and 216 are filled to a first predetermined pressure $P1_{high}$. The first compression stage can be reached by operating the natural gas compression system 208 in the first operational state 290 (FIG. 7). Natural gas compressed by the bimodal piston-cylinder assembly 246 can flow into the first, second, and third pressure tanks 212, 214, 216 until pressure tanks 212, 214, 216 reach the first predetermined pressure $P1_{high}$. In some embodiments, $P1_{high}$ can be about 7.2 bar (104 psi). In the first operational state 290, the gas source valve 262, the first, second, and third pressure tank inlet valves 268, 272, and 276 can all be in the open position, and the first and second pressure tank outlet valves 270 and 274 can be in the closed position, as shown in Table 1. In this manner, natural gas can be continuously supplied to the bimodal piston-cylinder assembly 246 through the intake check valve 284 and compressed by the bimodal piston 256 such that the gas flows through the outlet check valve 280 and into the first, second, and third pressure tanks 212, 214, 216 through the high-pressure outlet header 278 and respective pressure tank inlet valves 268, 272, and 276.

TABLE 1

|  | Valve 262 | Valve 270 | Valve 274 | Valve 268 | Valve 272 | Valve 276 | Valve 266 |
| --- | --- | --- | --- | --- | --- | --- | --- |
| First Operational State 290 | Open | Closed | Closed | Open | Open | Open | Open |
| Second Operational State 292 | Open | Open | Closed | Closed | Open | Open | Closed |
| Third Operational State 294 | Open | Closed | Closed | Open | Closed | Closed | Open |

TABLE 1-continued

| | Valve 262 | Valve 270 | Valve 274 | Valve 268 | Valve 272 | Valve 276 | Valve 266 |
|---|---|---|---|---|---|---|---|
| Fourth Operational State 296 | Open | Open | Closed | Closed | Open | Closed | Closed |
| Fifth Operational State 298 | Open | Closed | Open | Closed | Closed | Open | Closed |

When the pressure in the first, second, and third pressure tanks 212, 214, 216 reaches the first predetermined pressure $P1_{high}$, the computer 100 can transmit commands to the natural gas compression system 208 to begin operating in the second operational state 292 (FIG. 7). In the second operational state 292, the gas source valve 262, the first pressure tank outlet valve 270, and the second and third pressure tank inlet valves 272, 276 can be in the open position, while the second pressure tank outlet valve 274, the first pressure tank inlet valve 268, and the source check valve 266 can be in the closed position. In this manner, the natural gas contained in the first pressure tank 212 at pressure $P1_{high}$ can flow into the bimodal piston-cylinder assembly 246, which can further compress the gas in a second compression stage such that the gas flows into the second and third pressure tanks 214, 216 until the pressure in the second and third pressure tanks 214, 216 reaches a second predetermined pressure $P2_{high}$. In the embodiment shown, the pressure $P2_{high}$ can be about 42.4 bar (610 psi) in accordance with the compressor mode compression ratio of the bimodal piston-cylinder assembly 246 of about 5.9:1.

As natural gas flows out of the first pressure tank 212 to be compressed by the bimodal piston-cylinder assembly 246, the pressure in the first pressure tank 212 can fall. When the pressure in the first pressure tank 212 falls below a predetermined low-pressure threshold $P1_{low}$, the computer 100 can transmit commands to the natural gas compression system 208 to begin operating in the third operational state 294, as shown in FIG. 7. Thus, the gas source valve 260 can remain in the open position, the first pressure tank outlet valve 270 can move to the closed position, the second pressure tank outlet valve 274 can remain in the closed position, the first pressure tank inlet valve 268 can move to the open position, the second pressure tank inlet valve 272 can move to the closed position, the third pressure tank inlet valve 276 can move to the closed position, and the source check valve 266 can move to the open position, as shown in Table 1. At this point in the refueling process, the pressure in the second and third pressure tanks 214, 216 can be intermediate $P1_{high}$ and $P2_{high}$, while the pressure in the first pressure tank can be $P1_{low}$. Thus, in this manner, natural gas can enter the natural gas compression system 208 at source pressure, can be compressed by the bimodal piston-cylinder assembly 246, and can flow into the first pressure tank 212 until the pressure in the first pressure tank again reaches $P1_{high}$.

When the pressure in the first pressure tank 212 returns to $P1_{high}$, the computer 100 can transmit commands to the natural gas compression system 208 causing the system 208 to resume operating in the second operational state 292. The system 208 can be switched between operation in the second and third operational states 292, 294 as needed until the pressure in the second and third pressure tanks 214, 216 reaches $P2_{high}$. When the pressure in the second and third pressure tanks 214, 216 reaches $P2_{high}$, the computer 100 can transmit commands to the natural gas compression system 208 causing the system 208 to switch from operating in the second operational state 292 to operating in the fifth operational state 298. In the fifth operational state 298, the gas source valve 262 can remain in the open position, the first pressure tank outlet valve 270 can remain in the closed position, the second pressure tank outlet valve 274 can move to the open position, the first pressure tank inlet valve 268 can move to the closed position, the second pressure tank inlet valve 272 can remain in the closed position, the third pressure tank inlet valve 276 can move to the open position, and the source check valve can move to the closed position, as shown in Table 1. In this manner, the natural gas contained in the second pressure tank 214 at pressure $P2_{high}$ can flow into the bimodal piston-cylinder assembly 246, which can further compress the gas in a third compression stage such that the gas flows into the third pressure tank 216 until the pressure in the third pressure tank 216 reaches a final pressure P3. In the embodiment shown, the final pressure P3 can be about 250 bar (3600 psi), corresponding to the standard pressure for storage of compressed natural gas in the United States.

As natural gas flows out of the second pressure tank 214 to be compressed by the bimodal piston-cylinder assembly 246, the pressure in the second pressure tank 214 can fall. When the pressure in the second pressure tank 214 falls below a predetermined low-pressure threshold $P2_{low}$, the computer 100 can transmit commands to the natural gas compression system 208 to begin operating in the fourth operational state 296, as shown in FIG. 7. Thus, the gas source valve 260 can remain in the open position, the first pressure tank outlet valve 270 can move to the open position, the second pressure tank outlet valve 274 can move to the closed position, the first pressure tank inlet valve 268 can remain in the closed position, the second pressure tank inlet valve 272 can move to the closed position, the third pressure tank inlet valve 276 can move to the closed position, and the source check valve 266 can remain in the closed position, as shown in Table 1. At this point in the compression process, the pressure in the third pressure tank 216 can be intermediate $P2_{high}$ and P3, while the pressure in the second pressure tank 214 can be $P2_{low}$, and the pressure in the first pressure tank 212 can be $P1_{high}$. Thus, in this manner, natural gas can flow from the first pressure tank 212 into the bimodal piston-cylinder assembly 246, where it can be compressed such that it flows into the second pressure tank 214 until the pressure in the second pressure tank again reaches $P2_{high}$.

The natural gas compression system 208 can switch between the second, third, fourth, and fifth operational states 292, 294, 296, 298 as needed until the third pressure tank 216 reaches the final pressure P3. When the third pressure tank 216 reaches the final pressure P3, the computer 100 can transmit commands to the natural gas compression system 208 causing the engine 210 to shut down. The computer 100 can also transmit commands to cause the compressor valves 248 to move to the closed position, and to re-activate the intake and exhaust valves 242, 244 of the bimodal piston-cylinder assembly. The vehicle 200 can then be disconnected from the natural gas source 254, and the engine 210 can be restarted with the bimodal piston-cylinder assembly 246 operating in the combustion mode. The vehicle 200 can then be driven using the natural gas stored in the third pressure tank 216 as fuel for the engine 210.

In alternative embodiments, the first, second, and/or third pressure tanks 212, 214, 216 can be configured as a single pressure tank having one or more partitions configured to hold gas at different pressures. For example, the first and/or second and/or third pressure tanks 212, 214, 216 can be configured as compartments within a single pressure tank. In further alternative embodiments, the first and second pressure tanks 212, 214 need not be located on the vehicle 200. For example, in some embodiments, the first and second pressure tanks 212, 214 can be external to the vehicle 200 and can be in communication with the rest of the natural gas compression system 208 via the valve block 218.

Figure 8:
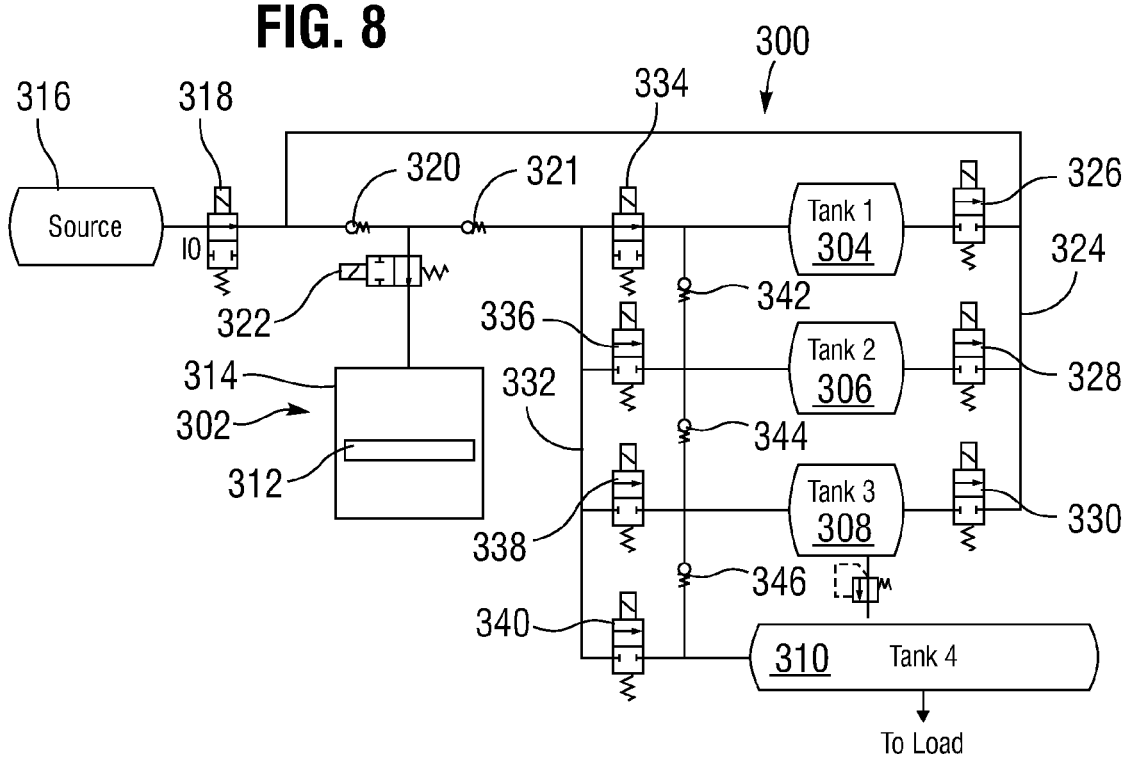
FIG. 8 is a schematic representation of another embodiment of a natural gas compression system including four pressure tanks.

FIG. 8 shows another embodiment of a natural gas compression system 300 configured to compress natural gas for storage onboard a vehicle in four compression stages. The natural gas compression system 300 can include a bimodal piston-cylinder assembly 302 as part of a multi-cylinder engine (not shown) similar to the engine 210. The bimodal piston-cylinder assembly 302 can include a bimodal piston 312 configured to move between a TDC position and BDC position in a cylinder 314, and can be configured to operate in a combustion mode or compressor mode, similar to the bimodal piston-cylinder assembly of FIG. 2. The bimodal piston-cylinder assembly 302 can also include one or more compressor valves 322 similar to the compressor valves 248. The natural gas compression system 300 can be in communication with a natural gas source 316, such as a residential gas utility hookup, via a gas source valve 318 and an inlet check valve 320. The high-pressure outlet header 332 can be in communication with the bimodal piston-cylinder assembly 302 via an outlet check valve 321.

The system 300 can also include first, second, third, and fourth pressure tanks 304, 306, 308, 310. The first, second, and third pressure tanks 304, 306, 308 can be in communication with an inlet header 324 via respective first, second, and third pressure tank outlet valves 326, 328, 330. Similarly, the first, second, third, and fourth pressure tanks 304, 306, 308, 310 can be in communication with a high-pressure outlet header 332 via respective first, second, third and fourth pressure tank inlet valves 334, 336, 338, 340. In the embodiment shown, the first and second pressure tanks 304, 306 can be interconnected by a first check valve 342, the second and third pressure tanks 306, 308 can be interconnected by a second check valve 344, and the third and fourth pressure tanks 308, 310 can be interconnected by a third check valve 346.

Operation of the natural gas compression system 300 can proceed in the following manner, and can be controlled by a computer such as the computer 100, or any other suitable electrical, mechanical, or electro-mechanical control system. First, the gas source valve 318, the compressor valve 322, and the first pressure tank inlet valve 334 are opened, while all other valves remain closed. As the bimodal piston 312 travels from TDC to BDC, the pressure in the cylinder 314 of the bimodal piston-cylinder assembly 302 decreases below the pressure of the natural gas source 316 (e.g., 3 psi). This can cause the inlet check valve 320 to open, allowing natural gas to flow from the natural gas source 316 into the cylinder 314. As the bimodal piston 312 travels from BDC to TDC, the pressure in the cylinder 314 can increase above the pressure in the first pressure tank 304, causing the outlet check valve 321 to open, and allowing gas to flow into the first pressure tank 304. Gas can also flow into the second, third, and fourth pressure tanks 306, 308, 310 via the first, second, and third check valves 342, 344, 346, respectively. The bimodal piston 312 of the bimodal piston-cylinder assembly 302 can continue to reciprocate in the compressor mode until each of the first, second, third, and fourth pressure tanks 304, 306, 308, 310 reach a first predetermined pressure $P_1$.

When the first, second, third, and fourth pressure tanks 304, 306, 308, 310 reach the pressure $P_1$, the computer 100 can transmit commands causing the first pressure tank inlet valve 334 to close, and causing the first pressure tank outlet valve 326 and the second pressure tank inlet valve 336 to open. As the bimodal piston 312 travels from TDC to BDC, the pressure in the cylinder 314 of the bimodal piston-cylinder assembly 302 can decrease below the pressure $P_1$, causing the inlet check valve 320 to open, and allowing natural gas to flow into the cylinder 314 from the first pressure tank 304. As the bimodal piston 312 travels from BDC to TDC, the pressure in the bimodal piston-cylinder assembly 302 can increase above the pressure in the second pressure tank 306 causing the outlet check valve 321 to open. Gas can thereby flow from the bimodal piston-cylinder assembly 302 into the second pressure tank 306. Gas can also flow into the third and fourth pressure tanks 308, 310 via second and third check valves 344, 346. The bimodal piston 312 of the bimodal piston-cylinder assembly 302 can continue to reciprocate until each of the second, third, and fourth pressure tanks 306, 308, 310 reach a second predetermined pressure $P_2$.

When the second, third, and fourth pressure tanks 306, 308, 310 have reached the pressure $P_2$, the computer 100 can transmit commands to the system 300 causing the first pressure tank outlet valve 326 and the second pressure tank inlet valve 336 to close. The computer 100 can also transmit commands causing the second pressure tank outlet valve 328 and the third pressure tank inlet valve 338 to open. As the bimodal piston 312 travels from TDC to BDC, the pressure in the bimodal piston-cylinder assembly 302 can decrease below the pressure $P_2$, causing the inlet check valve 320 to open, and allowing natural gas to flow into the cylinder 314 from the second pressure tank 306. As the bimodal piston 312 travels from BDC to TDC, the pressure in the bimodal piston-cylinder assembly 302 can increase above the pressure in the third pressure tank 308, causing the outlet check valve 321 to open. Gas can thereby flow from the bimodal piston-cylinder assembly 302 into the third pressure tank 308. Gas can also flow into the fourth pressure tank 310 via the third check valve 346. The bimodal piston 312 of the bimodal piston-cylinder assembly 302 can continue to reciprocate until each of the third, and fourth pressure tanks 308, 310 reach a third predetermined pressure $P_3$.

When the third, and fourth pressure tanks 308, 310 have reached the pressure $P_3$, the computer 100 can transmit commands to the system 300 causing the second pressure tank outlet valve 328 and the third pressure tank inlet valve 338 to close. The computer 100 can also transmit commands causing the third pressure tank outlet valve 330 and the fourth pressure tank inlet valve 340 to open. As the bimodal piston 312 travels from TDC to BDC, the pressure in the bimodal piston-cylinder assembly 302 can decrease below the pressure $P_3$, causing the inlet check valve 320 to open, and allowing natural gas to flow into the cylinder 314 from the third pressure tank 308. As the bimodal piston 312 travels from BDC to TDC, the pressure in the bimodal piston-cylinder assembly 302 can increase above the pressure in the fourth pressure tank 310, causing the outlet check valve 321 to open. Gas can thereby flow from the bimodal piston-cylinder assembly 302 into the fourth pressure tank 310. The bimodal piston 312 of the bimodal piston-cylinder assembly 302 can continue to reciprocate until the fourth pressure tank 310 reaches a final pressure $P_{final}$. In some embodiments, $P_{final}$ can be about 250 bar (3600 psi).

As gas is compressed and flows into the fourth pressure tank 310, the pressure in the first, second, and third pressure tanks 304, 306, 308 can decrease. In order to maintain a desirable working pressure in these tanks, the computer 100 can transmit commands causing the various valves in the system 300 to open or close as appropriate in order to re-pressurize the respective pressure tanks. When the fourth pressure tank 310 reaches the final pressure $P_{final}$, the computer 100 can transmit instructions causing the natural gas compression system 300 to shut down. The engine can then be restarted with all piston-cylinder assemblies, including the bimodal piston-cylinder assembly 302, operating in the combustion mode with natural gas fuel supplied by the fourth pressure tank 310.

Figure 9:
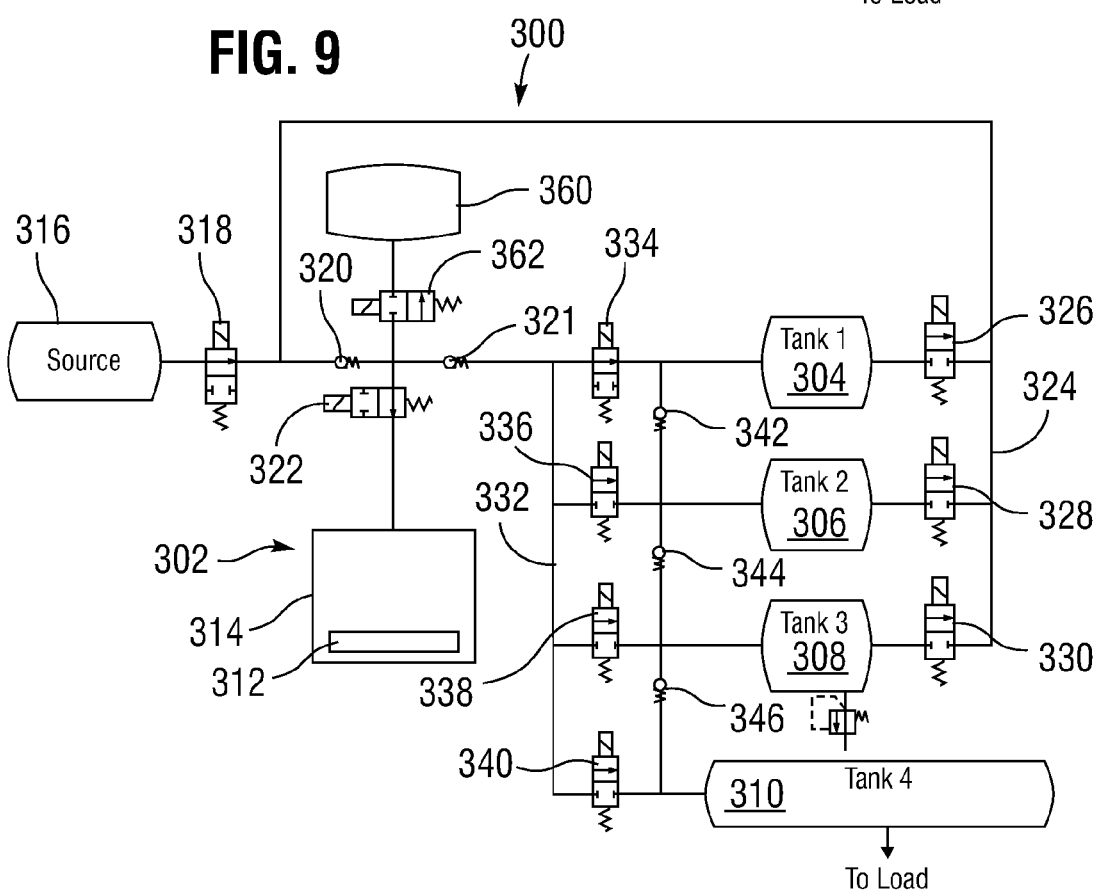
FIG. 9 is a schematic representation of another embodiment of a natural gas compression system including a variable control volume.

Referring now to an alternative embodiment of the natural gas compression system 300 shown in FIG. 9 the following discussion proceeds with reference to the crank angle of an engine crankshaft. As used herein, the terms "crank angle" and "crank angle degrees" refer to the radial position of the engine crankshaft as a function of a particular reference piston's distance from the TDC position. Thus, over a period of one crankshaft revolution, the TDC position of a reference piston corresponds to 0° crank angle, the BDC position of the piston corresponds to 180° crank angle, and a return to the TDC position corresponds to 360° crank angle.

Referring to FIG. 9, the illustrated alternative embodiment of the natural gas compression system 300 can include a control volume 360 in communication with the bimodal piston-cylinder assembly 302 via a control volume valve 362. When the control volume valve 362 is open, the bimodal piston-cylinder assembly 302 can be in communication with the control volume 360 such that the clearance volume of the bimodal piston-cylinder assembly 302 is increased by an amount equal to the control volume 360. In this manner, if the bimodal piston-cylinder assembly 302 has a compression ratio of about 13:1 when operating in the compressor mode, addition of the control volume 360 can reduce the compression ratio of the bimodal piston-cylinder assembly 302 to, for example, 4:1. This reduction in compression ratio can reduce the torque impulses imparted to the bimodal piston 312 and other engine components (connecting rods, crankshaft, etc.) when compressing natural gas to high pressures.

Figure 10:
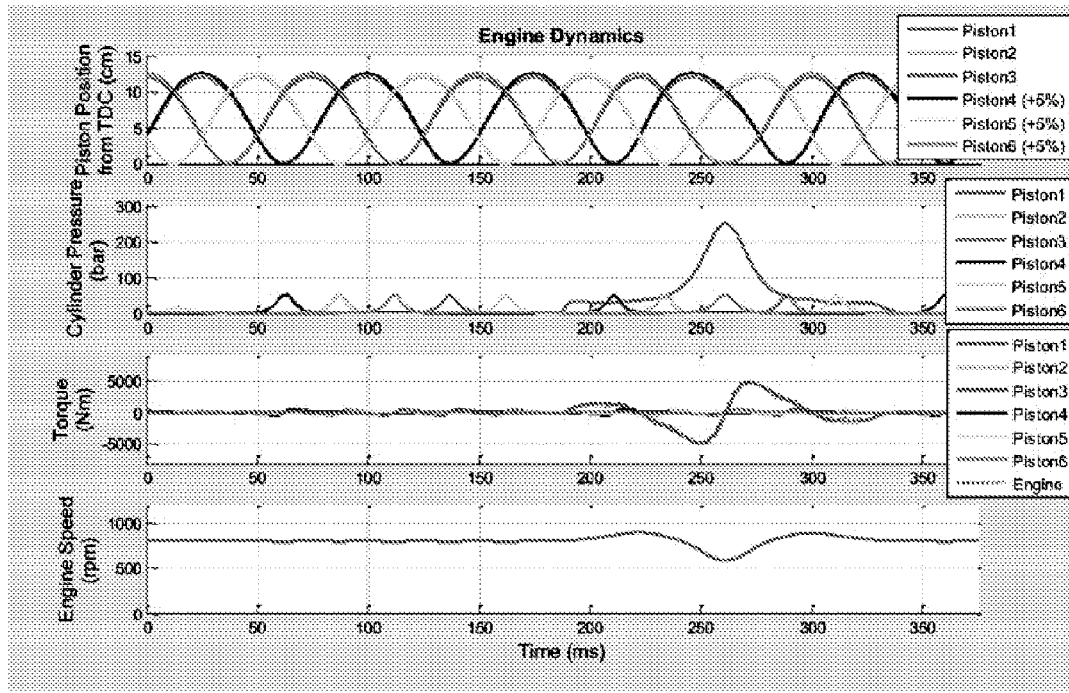
FIG. 10 is a plot of engine speed, torque, cylinder pressure and piston position versus time showing five revolutions of an inline six-cylinder engine in which a bimodal piston-cylinder assembly experiences a compression event in which gas is drawn into the bimodal piston-cylinder assembly at a pressure of about 40 bar.

FIG. 10 illustrates a simulation of the system 300 including an inline six-cylinder engine with five piston-cylinder assemblies operating in the combustion mode and the bimodal piston-cylinder assembly 302 operating in the compressor mode. Approximately five engine revolutions are displayed in FIG. 11, with one engine revolution including a compression event wherein the bimodal piston-cylinder assembly 302 draws gas into the cylinder 314 at a pressure of 40 bar (e.g., from the third pressure tank 308) and compresses the gas to 250 bar such that the gas flows into the fourth pressure tank 310. As illustrated in FIG. 10, this compression event can reduce the engine RPM from 900 RPM to 600 RPM in about 35 to 40 crank angle degrees. Depending upon the rotational inertia of the engine and other system parameters, such a decrease in engine RPM can be enough to stop the engine.

Operation of the system 300 including the control volume 360 can proceed in a similar manner to the system 300 without the control volume 360 as described above, except that the volume of the compression stroke can be adjusted in the following manner. While natural gas compressed by the bimodal piston-cylinder assembly 302 flows into the first, second, and third pressure tanks 304, 306, 308, the control volume valve 362 can be open, thereby reducing the compression ratio of the bimodal piston-cylinder assembly 302 to about 4:1. When gas is drawn from the third pressure tank 308 to charge the fourth pressure tank 310, the control volume valve 362 can be closed. Closing the control volume valve 362 can increase the compression ratio of the bimodal piston-cylinder assembly 302 from about 4:1 to about 13:1, for example. As the bimodal piston 312 reaches TDC (0° crank angle), the first pressure tank outlet valve 326 and the first pressure tank inlet valve 334 can be opened. This can add the volume of the first pressure tank 304 and the associated conduits to the clearance volume of the bimodal piston-cylinder assembly 302.

As the bimodal piston 312 travels from TDC to BDC (0° to 180° crank angle), the pressure in the combined volume of the bimodal piston-cylinder assembly 302 and the first pressure tank 304 can decrease below the pressure of the first pressure tank $P_1$, causing gas to flow into the cylinder 314 through inlet check valve 320. As the bimodal piston 312 travels from BDC (180° crank angle) to about 225° crank angle, the first pressure tank outlet valve 326 and the first pressure tank inlet valve 334 can remain open such that gas flows into the first pressure tank 304 through the outlet check valve 321. As the bimodal piston 312 travels from about 225° crank angle to about 315° crank angle, the first pressure tank inlet and outlet valves 334, 326 can be closed, and the third pressure tank outlet valve 330 and the fourth pressure tank inlet valve 340 can be opened. Despite the upward motion of the bimodal piston 312, the pressure of the gas in the bimodal piston-cylinder assembly 302 can still be less than the pressure in the third pressure tank 308. As a result, pressurized gas from the third pressure tank 308 can flow into the cylinder 314 through the inlet check valve 320.

As the bimodal piston 312 travels from about 315° crank angle to about 350° crank angle, the gas pressure in the bimodal piston-cylinder assembly 302 can reach $P_3$, the pressure in the third pressure tank 308. At this point, the inlet check valve 320 can close and the gas in the bimodal piston-cylinder assembly 302 can be compressed beyond the pressure $P_3$. Since this compression begins after the bimodal piston 312 has traveled a fraction of the distance between BDC and TDC on the compression stroke, the volumetric compression of the gas can be dictated by the following equation:

$$\text{Volumetric Compression Ratio} = \frac{\text{Swept} + \text{Clearance Volume}}{\text{Clearance Volume}}$$

where Swept Volume=Volume at BDC−Volume at TDC. However, the Effective Volumetric Compression Ratio can be defined by the following equation:

$$\text{Effectice Volumetric Compression Ratio} = \frac{\text{Partial Swept Volume} + \text{Clearance Volume}}{\text{Clearance Volume}}$$

where Partial Swept Volume=Volume at the given crank angle (e.g., 315°)−Volume at TDC.

Thus, the first pressure tank inlet and outlet valves 334, 326 can be closed and the third pressure tank outlet valve 330 and the fourth pressure tank inlet valve 340 can be opened such that the effective volumetric compression ratio of the bimodal piston-cylinder assembly 302 is about 4:1, which is the same compression ratio achieved with use of the control volume 360 while the first, second, and third pressure tanks 304, 306, 308 are being pressurized.

Figure 11:
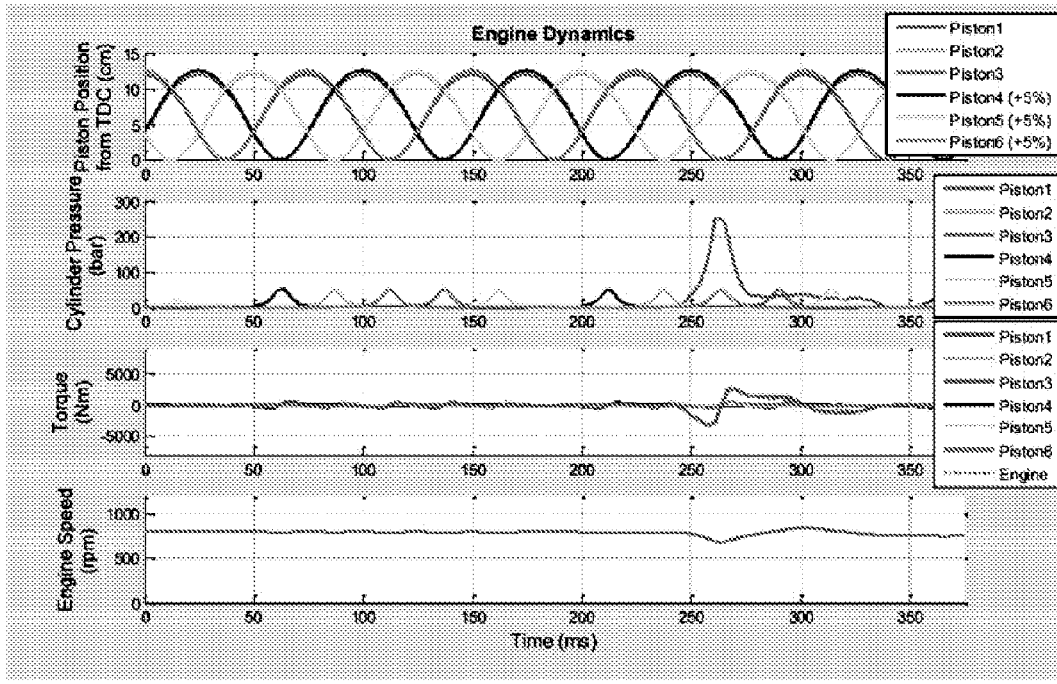
FIG. 11 is a plot of engine speed, torque, cylinder pressure, and piston position versus time showing five revolutions of an inline six-cylinder engine including a bimodal piston-cylinder assembly operating according to a method of compression stroke adjustment.

At, for example, 350° crank angle, the pressure in the bimodal piston-cylinder assembly 302 will exceed the pressure in the fourth pressure tank 310, and gas will flow into the fourth pressure tank 310 through the fourth pressure tank inlet valve 340. In this manner, reducing the number of crank angle degrees during which the bimodal piston-cylinder assembly 302 compresses the gas, coupled with the fact that the first pressure tank 304 can be in communication with the bimodal piston-cylinder assembly 302 between about 0° and about 225° crank angle can result in a significant decrease in the average pressure in the cylinder 314 throughout the crankshaft revolution. This decrease in average pressure can reduce the torque impulse applied to the crankshaft, which can result in a lower instantaneous change in engine RPM when drawing in gas from the third pressure tank 308, as shown in FIG. 11. For example, when operating the system 300 using the control volume 360 and the compression stroke adjustment described above, the engine RPM can decrease from about 800 RPM to about 700 RPM while achieving the desired final pressure $P_{final}$ in the fourth pressure tank 310.

Figure 12:
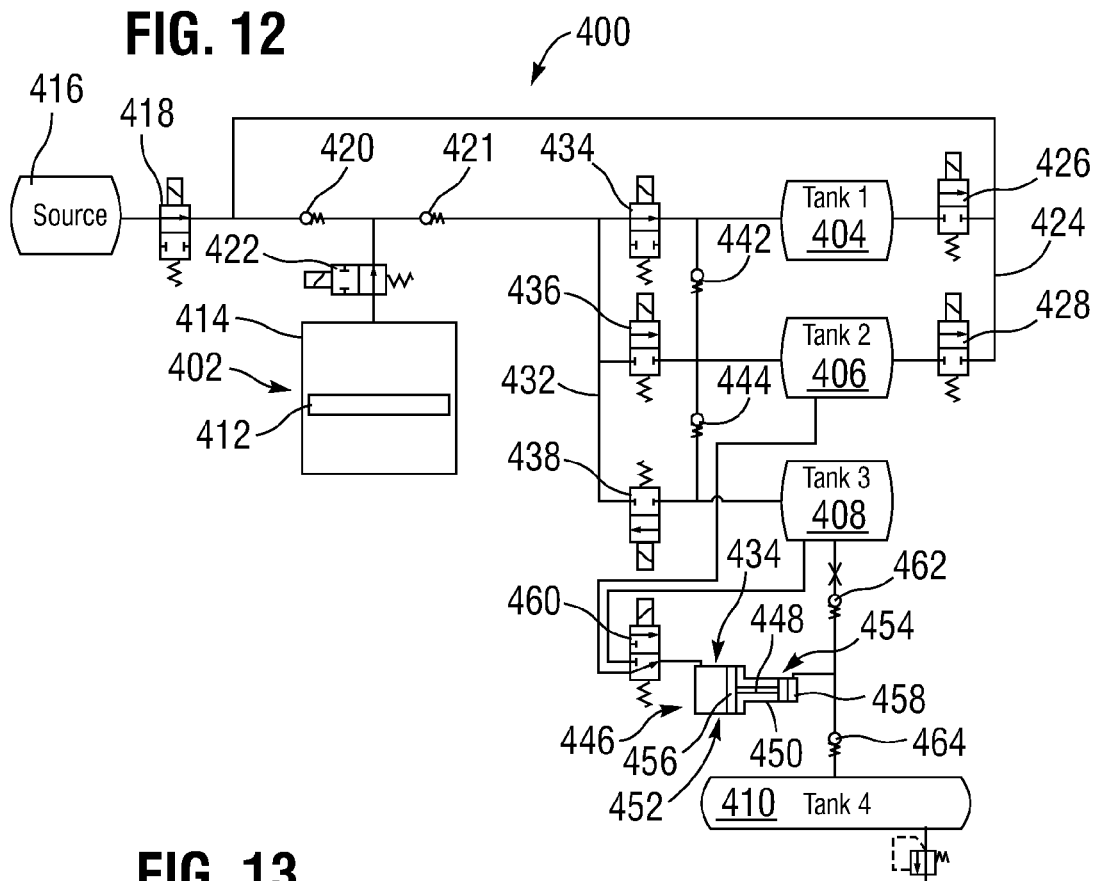
FIG. 12 is a schematic representation of another embodiment of a natural gas compression system including an amplifier piston-cylinder assembly.

FIG. 12 illustrates another embodiment of a natural gas compression system 400 configured to compress natural gas for storage onboard a vehicle in four compression stages. The natural gas compression system 400 can include a bimodal piston-cylinder assembly 402 as part of a multi-cylinder engine (not shown) similar to the engine 210. The bimodal piston-cylinder assembly 402 can include a bimodal piston 412 configured to move between a TDC position and BDC position in a cylinder 414, and can be configured to operate in a combustion mode or compressor mode, similar to the bimodal piston-cylinder assembly of FIG. 2. The bimodal piston-cylinder assembly 402 can also include one or more compressor valves 422 similar to the compressor valves 248. The natural gas compression system 400 can be in communication with a natural gas source 416, such as a residential gas utility hookup, via a gas source valve 418 and an inlet check valve 420. A high-pressure outlet header 432 can be in communication with the bimodal piston-cylinder assembly via an outlet check valve 421.

The system 400 can include first, second, third, and fourth pressure tanks 404, 406, 408, 410. The first, second, and third pressure tanks 404, 406, 408 can be in communication with an inlet header 424 via respective first, and second pressure tank outlet valves 426, 428. Similarly, the first, second, and third pressure tanks 404, 406, 408 can be in communication with the high-pressure outlet header 432 via respective first, second, and third pressure tank inlet valves 434, 436, 438. In the embodiment shown, the first and second pressure tanks 404, 406 can be interconnected by a first check valve 442, and the second and third pressure tanks 406, 408 can be interconnected by a second check valve 444.

The system 400 can also include an amplifier piston-cylinder assembly 446 including a two-way amplifier piston 448 configured to travel in an amplifier cylinder 450. The amplifier cylinder 450 can have a large volume portion 452 and a small volume portion 454. The two-way amplifier piston 448 can have a large-diameter piston head 456 disposed in the large volume portion 452 of the amplifier cylinder 450, and a small-diameter piston head 458 disposed in the small volume portion 454 of the amplifier cylinder 450. The amplifier piston 448 can be configured to travel between a first position and a second position, the first position corresponding to a position in which the amplifier piston 448 is stroked right (i.e., the amplifier piston 448 is disposed such that the volume defined by the large-diameter piston head 456 and the large volume portion 452 of the amplifier cylinder 450 is at a maximum, and the volume defined by the small-diameter piston head 458 and the small volume portion 454 of the amplifier cylinder 450 is at a minimum). Similarly, the second position can correspond to a position in which the amplifier piston 448 is stroked left (i.e., the amplifier piston 448 is disposed such that the volume defined by the large-diameter piston head 456 and the large volume portion 452 of the amplifier cylinder 450 is at a minimum, and the volume defined by the small-diameter piston head 458 and the small volume portion 454 of the amplifier cylinder 450 is at a maximum).

In the exemplary embodiment shown, the ratio of the area of the large-diameter piston head 456 to the area of the small-diameter piston head 458 can be about 5:1 although, in alternative embodiments, the areas of the respective piston heads 456, 458 can have any suitable ratio. The large volume portion 452 of the amplifier cylinder 450 of the amplifier piston-cylinder assembly 446 can be in communication with the second and third pressure tanks 406, 408 via a three-way valve 460. The three-way valve 460 can be movable between a first position, in which the large volume portion 452 of the amplifier cylinder 450 is in communication with the second pressure tank 406, and a second position, in which the large volume portion 452 of the amplifier cylinder 450 is in communication with the third pressure tank 408. The small volume portion 454 of the amplifier cylinder 450 can be in communication with the third pressure tank 408 via a third check valve 462, and with the fourth pressure tank 410 via a fourth check valve 464.

The natural gas compression system 400 can be configured such that the final stage of natural gas compression occurs in the amplifier piston-cylinder assembly 446 instead of in the bimodal piston-cylinder assembly 402. This can significantly reduce the peak pressures experienced by the bimodal piston-cylinder 402 when operating in the compressor mode. This, in turn, can reduce the instantaneous torque impulses experienced by the bimodal piston 412 and other associated engine components, which can allow the natural gas compression system 400 to be retrofitted to an existing internal combustion engine more easily.

Operation of the natural gas compression system 400 can proceed in the following manner, and can be controlled by a computer such as the computer 100, or any other suitable electrical, mechanical, or electro-mechanical control system. First, the gas source valve 418 and the first pressure tank inlet valve 434 can be moved to the open position, and the amplifier piston 448 of the amplifier piston-cylinder assembly 446 can be in the first position (i.e., stroked to the right), as shown in FIG. 12. All of the other valves can be in the closed position. As the bimodal piston 412 of the bimodal piston-cylinder assembly 402 travels from TDC to BDC, the pressure in the cylinder 414 can decrease below the pressure of the natural gas source 416 (e.g., about 3 psi), causing the inlet check valve 420 to open and allowing natural gas to flow into the bimodal piston-cylinder assembly 402. As the bimodal piston 412 travels from BDC to TDC, the pressure in the cylinder 414 can increase above the pressure of the first pressure tank 404, causing the outlet check valve 421 to open and allowing gas to flow into the first pressure tank 404. Gas can also flow into the second, third, and fourth pressure tanks 406, 408, 410 through the first, second, third, and fourth check valves 442, 444, 462, 464. The bimodal piston 412 can continue to reciprocate until the first, second, third, and fourth pressure tanks 404, 406, 408, 410 reach a first predetermined pressure $P_1$. At this point, the pressure in the large and small volume portions 452, 454 of the amplifier cylinder 450 of the amplifier piston-cylinder assembly 446 can be equal, and the amplifier piston 448 can remain in the first position.

When the first, second, third, and fourth pressure tanks 404, 406, 408, 410 have reached the first predetermined pressure $P_1$, the gas source valve 418 and the first pressure tank inlet valve 434 can move to the closed position, and the first pressure tank outlet valve 426 and the second pressure tank inlet valve 436 can be opened. As the bimodal piston 412 travels from TDC to BDC, the pressure in the cylinder 414 can decrease below the pressure $P_1$, causing the inlet check valve 420 to open and allowing gas to flow into the cylinder 414. As the bimodal piston 412 travels from BDC to TDC, the pressure in the cylinder 414 can increase above the pressure in the second pressure tank 406, causing the outlet check valve 421 to open and allowing gas to flow into the second pressure tank 406. Gas can also flow into the third and fourth pressure tanks 408, 410 through the second, third, and fourth check valves 444, 462, 464. The bimodal piston 412 can continue to reciprocate until the second, third, and fourth pressure tanks 406, 408, 410 reach a second predetermined pressure $P_2$. At this point, the pressure in the large and small volume portions 452, 454 of the amplifier cylinder 450 of the amplifier piston-cylinder assembly 446 can remain equal, and the amplifier piston 448 can remain in the first position.

When the second, third, and fourth pressure tanks 406, 408, 410 have reached the second predetermined pressure $P_2$, the first pressure tank outlet valve 426 and the second pressure tank inlet valve 436 can be closed, and the second pressure tank outlet valve 428 and the third pressure tank inlet valve 438 can be opened. As the bimodal piston 314 travels from TDC to BDC, the pressure in the cylinder 414 can decrease below the second predetermined pressure $P_2$, causing the inlet check valve 420 to open and allowing gas to flow into the bimodal piston-cylinder assembly 402. As the bimodal piston 412 travels from BDC to TDC, the pressure in the cylinder 414 can increase above the pressure in the third pressure tank 408, causing the outlet check valve 421 to open and allow gas to flow into the third pressure tank 408. Gas can also flow into the fourth pressure tank 410 through the third and fourth check valves 462, 464. The bimodal piston 412 can continue to reciprocate until the third and fourth pressure tanks 408, 410 reach a third predetermined pressure $P_3$.

Figure 13:
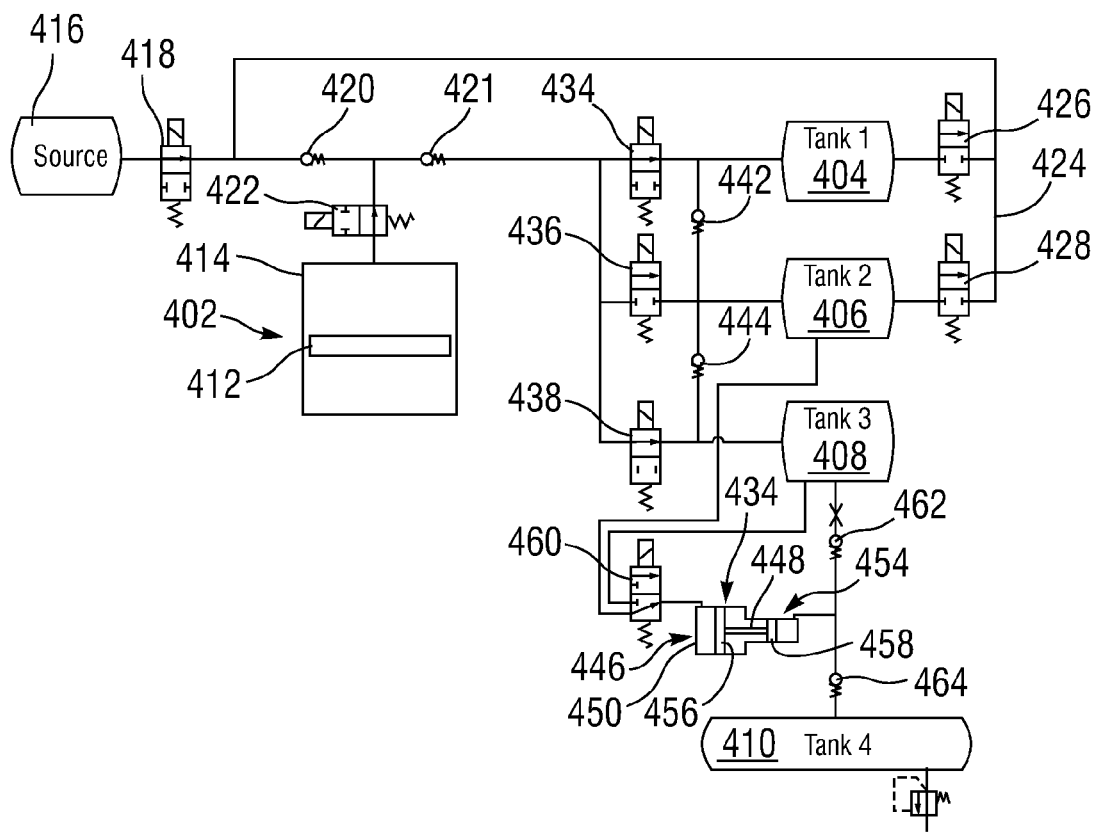
FIG. 13 is a schematic representation of the natural gas compression system of FIG. 12 illustrating the amplifier piston stroked to the left.

As the pressure in the third pressure tank 408 approaches the third predetermined pressure $P_3$, the pressure exerted against the small-diameter piston head 458 in the small volume portion 454 of the amplifier cylinder 450 can exceed the pressure exerted against the large-diameter piston head 456 in the large volume portion 452. This can cause the amplifier piston 448 to move to the second position (i.e., to be stroked to the left), as shown in FIG. 13. As the amplifier piston 448 moves to the second position, the natural gas contained in the large volume portion 452 of the amplifier cylinder 450 can be forced back into the second pressure tank 406 through the three-way valve 460. At the same time, the pressure in the small volume portion 454 of the amplifier cylinder 450 can decrease as the amplifier piston 448 moves to the second position, causing natural gas to flow into the small volume portion 454 from the third pressure tank 408 through the third check valve 462.

When the amplifier piston 448 has moved from the first position to the second position, the three-way valve 460 can be moved to the second position, placing the large volume portion 452 of the amplifier cylinder 450 in communication with the third pressure tank 408. This can allow gas to flow from the third pressure tank 408 into the large volume portion 452 of the amplifier cylinder 450, causing the amplifier piston 448 to move back to the first position (i.e., to stroke right). As the small-diameter piston head 458 moves to the second position, the pressure in the small volume portion 454 of the amplifier cylinder 450 can increase beyond the pressure in the fourth pressure tank 410, causing gas to flow into the fourth pressure tank 410 through the fourth check valve 464. At this point, the three-way valve 460 can be reset to the first position, thereby placing the large volume portion 452 of the amplifier cylinder 450 in communication with the second pressure tank 406. Gas in the third pressure tank 408 can then enter the small volume portion 454 of the amplifier cylinder 450 via the third check valve 462, causing the amplifier piston 448 to move back to the second position (i.e., to stroke left), forcing gas in the large volume portion 452 of the amplifier cylinder 450 to flow back into the second pressure tank 406. This process can be repeated as necessary until the pressure in the fourth pressure tank 410 reaches a final pressure $P_{final}$. As the fourth pressure tank 410 is pressurized to the final pressure $P_{final}$, the pressure in the first, second, and third pressure tanks 404, 406, 408 can fall. Thus, the various valves can be moved between their respective open and closed positions as necessary to restore the pressure in first, second, and third pressure tanks 404, 406, 408 during pressurization of the fourth pressure tank 410.

Figure 14:
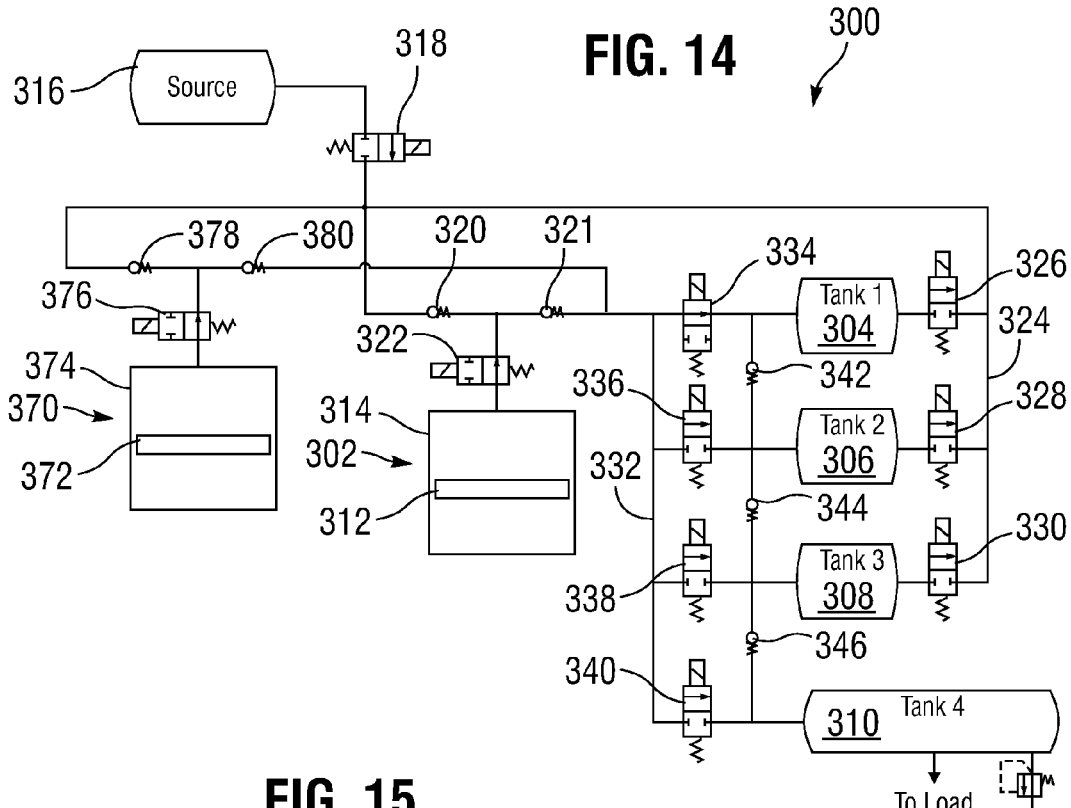
FIG. 14 is a schematic representation of an alternative embodiment of the natural gas compression system of FIG. 11 including two bimodal piston-cylinder assemblies.

FIG. 14 illustrates another alternative embodiment of the natural gas compression system 300 wherein the bimodal piston-cylinder assembly 302 is configured as a first bimodal piston-cylinder assembly 302, and further including a second bimodal piston-cylinder assembly 370. The second bimodal piston-cylinder assembly 370 can include a second bimodal piston 372 configured to travel between a TDC position and a BDC position in a cylinder 374, similar to the first bimodal piston-cylinder assembly 302. The second bimodal piston-cylinder assembly 370 can include a second compressor valve 376, and can be in communication with the natural gas source 316 via a second inlet check valve 378. The second bimodal piston-cylinder assembly 370 can also be in communication with the high-pressure outlet header 332 via a second outlet check valve 380. The first and second bimodal piston-cylinder assemblies 302, 370 can be connected in parallel, such that both bimodal piston-cylinder assemblies 302, 370 can be used to compress natural gas at the same time when operating in the compressor mode.

Figure 15:
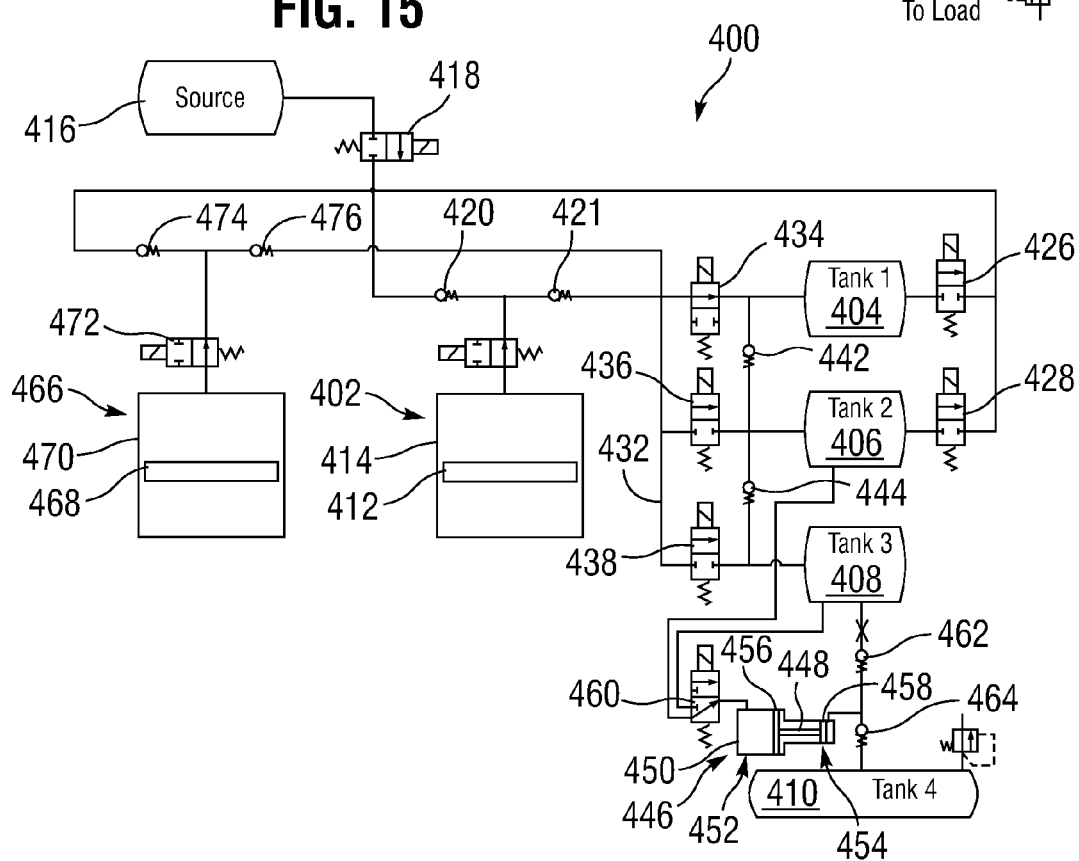
FIG. 15 is a schematic representation of an alternative embodiment of the natural gas compression system of FIG. 12 including two bimodal piston-cylinder assemblies.

FIG. 15 illustrates an alternative embodiment of the natural gas compression system 400 wherein the bimodal piston-cylinder assembly 402 is configured as a first bimodal piston-cylinder assembly, and further including a second bimodal piston-cylinder assembly 466. The second bimodal piston-cylinder assembly 466 can include a second bimodal piston 468 configured to travel between a TDC position and a BDC position in a cylinder 470, similar to the first bimodal piston-cylinder assembly 402. The second bimodal piston-cylinder assembly 466 can include a second compressor valve 472, and can be in communication with the natural gas source 416 via a second inlet check valve 474. The second bimodal piston-cylinder assembly 466 can also be in communication with the high-pressure outlet header 432 via a second outlet check valve 476. The first and second bimodal piston-cylinder assemblies 402, 466 can be connected in parallel, such that both bimodal piston-cylinder assemblies 402, 466 can be used to compress natural gas at the same time when operating in the compressor mode.

Figure 16:
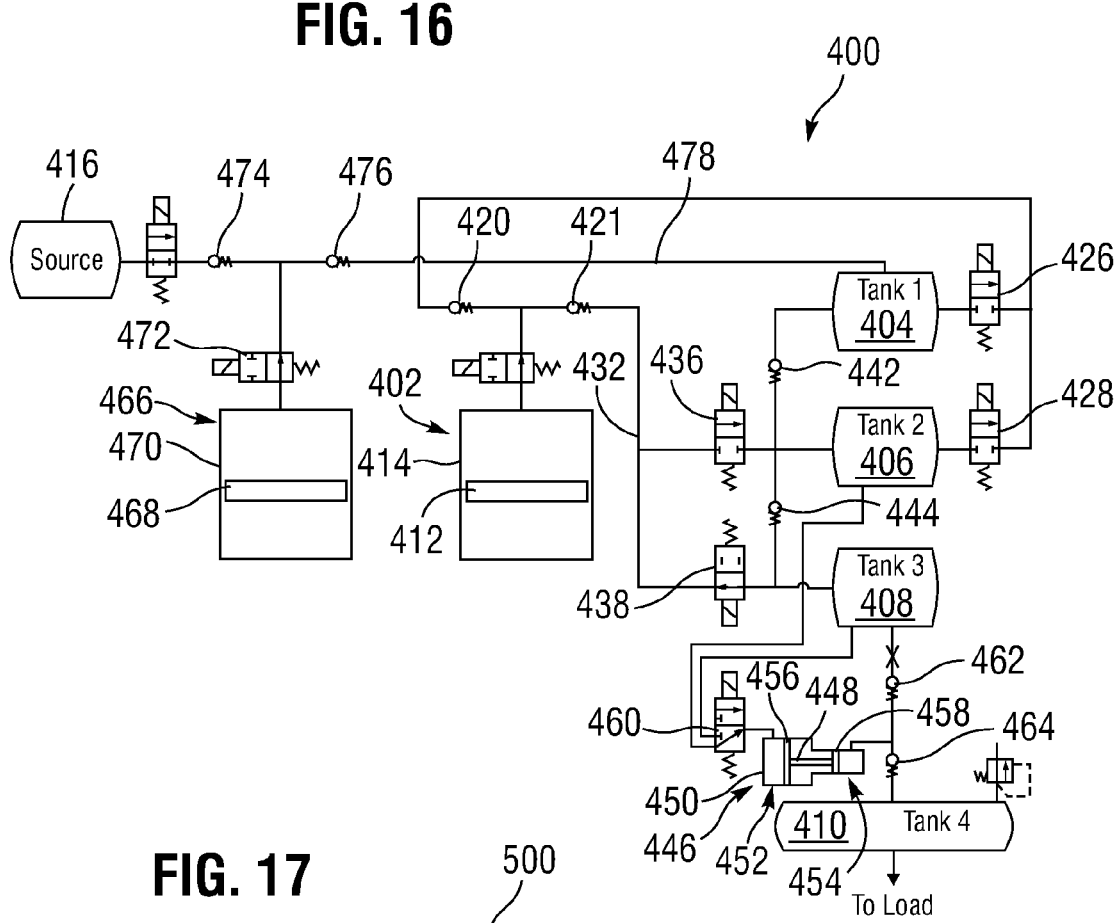
FIG. 16 is a schematic representation of the natural gas compression system of FIG. 15 illustrating the amplifier piston stroked to the left.

FIG. 16 illustrates another alternative embodiment of the natural gas compression system 400 similar to the embodiment of FIG. 15 including the first and second bimodal piston-cylinder assemblies 402, 466. In the embodiment shown, only the first bimodal piston-cylinder assembly 402 is in communication with the natural gas source 416. The first bimodal piston-cylinder assembly 402 can also be in communication with only the first pressure tank 404 via a first pressure tank conduit 478. Conversely, the second bimodal piston-cylinder assembly 466 can be in communication with the high-pressure outlet header 432, and thereby the second and third pressure tanks 406, 408. However, in the embodiment shown, the second bimodal piston-cylinder assembly 466 is in communication with the first pressure tank 404 only via the inlet header 424. In this manner, the first bimodal piston-cylinder assembly 402 can compress gas from the natural gas source 416 such that the gas flows directly into the first pressure tank 404, and the second bimodal piston-cylinder assembly 466 can draw gas from the first pressure tank 404 and compress the gas such that if lows into the second, third, and fourth pressure tanks 406, 408, 410, in combination with the amplifier piston-cylinder assembly 446.

Figure 17:
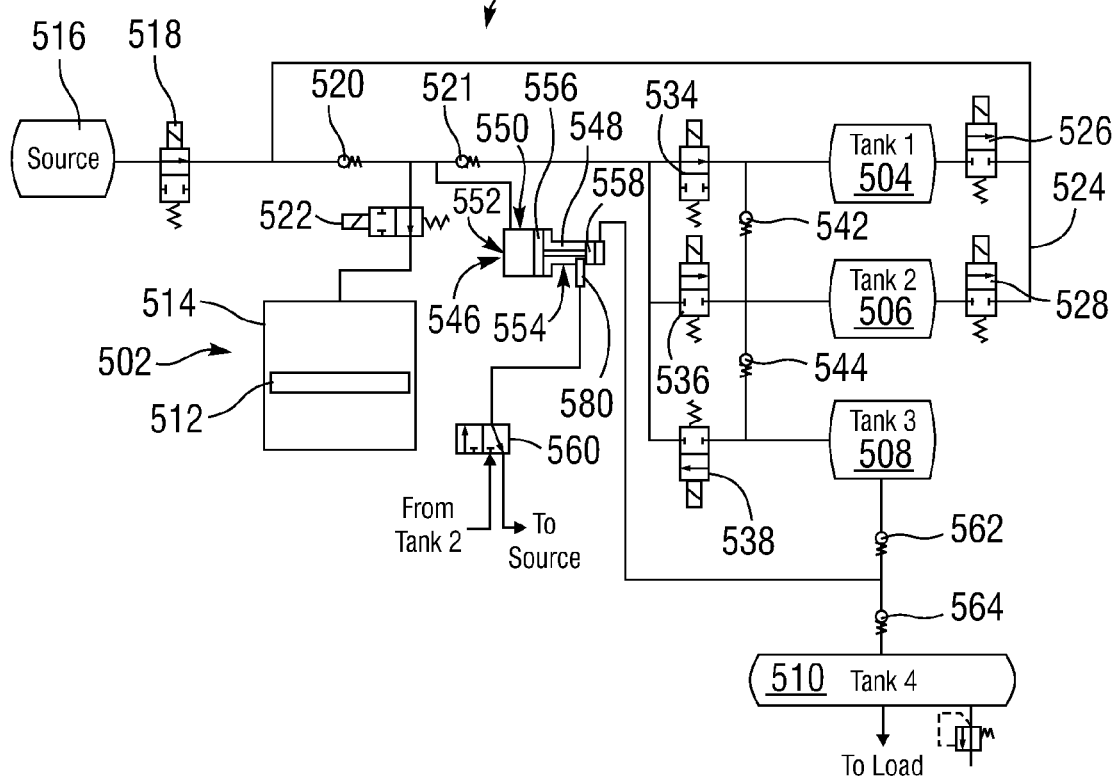
FIG. 17 is a schematic representation of another embodiment of a natural gas compression system having an amplifier piston-cylinder assembly in which a large volume portion of an amplifier cylinder of the amplifier piston-cylinder assembly is in communication with the natural gas source.

FIG. 17 illustrates another alternative embodiment of the natural gas compression system 500 in which the amplifier piston-cylinder assembly is configured to compress natural gas for storage onboard a vehicle in four compression stages. The natural gas compression system 500 can include a bimodal piston-cylinder assembly 502 as part of a multi-cylinder engine (not shown) similar to the engine 210. The bimodal piston-cylinder assembly 502 can include a bimodal piston 512 configured to move between a TDC position and BDC position in a cylinder 514, and can be configured to operate in a combustion mode or compressor mode, similar to the bimodal piston-cylinder assembly of FIG. 2. The bimodal piston-cylinder assembly 502 can also include one or more compressor valves 522 similar to the compressor valves 248. The natural gas compression system 500 can be in communication with a natural gas source 516 via a gas source valve 518 and an inlet check valve 520. A high-pressure outlet header 532 can be in communication with the bimodal piston-cylinder assembly via an outlet check valve 521.

The system 500 can include first, second, third, and fourth pressure tanks 504, 506, 508, 510. The first, second, and third pressure tanks 504, 506, 508 can be in communication with an inlet header 524 via respective first, and second pressure tank outlet valves 526, 528. Similarly, the first, second, and third pressure tanks 504, 506, 508 can be in communication with the high-pressure outlet header 532 via respective first, second, and third pressure tank inlet valves 534, 536, 538. In the embodiment shown, the first and second pressure tanks 504, 506 can be interconnected by a first check valve 542, and the second and third pressure tanks 506, 508 can be interconnected by a second check valve 544.

The system 500 can also include an amplifier piston-cylinder assembly 546 including a two-way amplifier piston 548 configured to travel in an amplifier cylinder 550, similar to the embodiment of FIG. 12. The amplifier cylinder 550 can have a large volume portion 552 and a small volume portion 554. The two-way amplifier piston 548 can have a large-diameter piston head 556 disposed in the large volume portion 552 of the amplifier cylinder 550, and a small-diameter piston head 558 disposed in the small volume portion 554 of the amplifier cylinder 550. The amplifier piston 548 can be configured to travel between a first position and a second position, the first position corresponding to a position in which the amplifier piston 548 is stroked right (i.e., the amplifier piston 548 is disposed such that the volume defined by the large-diameter piston head 556 and the large volume portion 552 of the amplifier cylinder 550 is at a maximum, and the volume defined by the small-diameter piston head 558 and the small volume portion 554 of the amplifier cylinder 550 is at a minimum). Similarly, the second position can correspond to a position in which the amplifier piston 548 is stroked left (i.e., the amplifier piston 548 is disposed such that the volume defined by the large-diameter piston head 556 and the large volume portion 552 of the amplifier cylinder 550 is at a minimum, and the volume defined by the small-diameter piston head 558 and the small volume portion 554 of the amplifier cylinder 550 is at a maximum).

In the exemplary embodiment shown, the ratio of the area of the large-diameter piston head 556 to the area of the small-diameter piston head 558 can be about 5:1 although, in alternative embodiments, the areas of the respective piston heads 556, 558 can have any suitable ratio. The large volume portion 552 of the amplifier cylinder 550 of the amplifier piston-cylinder assembly 546 can be in communication directly with the bimodal piston-cylinder assembly 502 upstream of the outlet check valve 521. The small volume portion 554 of the amplifier cylinder 550 can be in communication with the second pressure tank 506 and/or the natural gas source 516 via a three-way valve 560. The three-way valve 560 can be movable between a first position, in which the small volume portion 554 of the amplifier cylinder 550 is in communication with the second pressure tank 506, and a second position, in which the small volume portion 554 of the amplifier cylinder 550 is in communication with the natural gas source 516. The small volume portion 554 of the amplifier cylinder 550 can also be in communication with the third pressure tank 508 via a third check valve 562, and with the fourth pressure tank 510 via a fourth check valve 564 independent of the three-way valve 560. Additionally, the three-way valve can be operable to lock the amplifier piston 548 in the first position (i.e., stroked to the right). This can be accomplished by a locking pin 580 movable between a locked position and an unlocked position, as dictated by the position of the three-way valve 560. In the locked position, the locking pin 580 can extend behind the small-diameter piston head 558, thereby preventing the amplifier piston 548 from moving from the first position to the second position (i.e., keeping the amplifier piston 548 stroked right). In the unlocked position, the locking pin 580 can be retracted, allowing the amplifier piston 548 to move in the amplifier cylinder 550.

The natural gas compression system 500 can be configured such that the final stage of natural gas compression occurs in the amplifier piston-cylinder assembly 546 instead of in the bimodal piston-cylinder assembly 502, similar to the embodiment of FIG. 12. This can significantly reduce the peak pressures experienced by the bimodal piston-cylinder assembly 502 when operating in the compressor mode, which can reduce the instantaneous torque impulses experienced by the bimodal piston 512 and other associated engine components, as described above.

Operation of the natural gas compression system 500 can proceed in the following manner, and can be controlled by a computer such as the computer 100, or any other suitable electrical, mechanical, or electro-mechanical control system. First, the gas source valve 518, the compressor valve 522, and the first pressure tank inlet valve 534 are opened. All other valves can remain closed. The three-way valve 560 can be positioned such that the locking pin 580 is in the locked position. As the bimodal piston 512 moves from TDC to BDC, the pressure in the cylinder 514 can decrease below the pressure of the natural gas source 516, causing the inlet check valve 520 to open and allowing natural gas to flow into the bimodal piston-cylinder assembly 502. As the bimodal piston 512 travels from BDC to TDC, the pressure in the cylinder 514 can increase above the pressure in the first pressure tank 504, causing the outlet check valve 521 to open and allowing gas to flow into the first pressure tank 504. Gas can also flow into the second, third, and fourth pressure tanks 506, 508, 510 through the first, second, third, and fourth check valves 542, 544, 562, 564. The bimodal piston 512 can continue to reciprocate until the first, second, third, and fourth pressure tanks 504, 506, 508, 510 reach a first predetermined pressure $P_1$. At this point, the pressure in the large and small volume portions 552, 554 of the amplifier cylinder 550 of the amplifier piston-cylinder assembly 546 can be equal, and the amplifier piston 548 can remain in the first position. In some embodiments, the reciprocation of the bimodal piston 512 may cause force imbalances that would tend to move the amplifier piston 548 to the second position. However, the locking pin 580 can keep the amplifier piston 548 in the first position during this time.

When the first, second, third, and fourth pressure tanks 504, 506, 508, 510 have reached the first predetermined pressure $P_1$, the gas source valve 518 and the first pressure tank inlet valve 534 can move to the closed position, and the first pressure tank outlet valve 526 and the second pressure tank inlet valve 536 can be opened. As the bimodal piston 512 travels from TDC to BDC, the pressure in the cylinder 514 can decrease below the pressure $P_1$, causing the inlet check valve 520 to open and allowing gas to flow into the cylinder 514 from the first pressure tank 504. As the bimodal piston 512 travels from BDC to TDC, the pressure in the cylinder 514 can increase above the pressure in the second pressure tank 506, causing the outlet check valve 521 to open and allowing gas to flow into the second pressure tank 506. Gas can also flow into the third and fourth pressure tanks 508, 510 through the second, third, and fourth check valves 544, 562, 564. The bimodal piston 512 can continue to reciprocate until the second, third, and fourth pressure tanks 506, 508, 510 reach a second predetermined pressure $P_2$. At this point, the pressure in the large and small volume portions 552, 554 of the amplifier cylinder 550 of the amplifier piston-cylinder assembly 546 can remain equal, and the amplifier piston 548 can remain in the first position due to the 5:1 ratio of the areas of the large-diameter piston head 556 and the small-diameter piston head 558. The locking pin 580 can also remain in the locked position, preventing the amplifier piston 548 from moving to the second position.

When the second, third, and fourth pressure tanks 506, 508, 510 have reached the second predetermined pressure $P_2$, the first pressure tank outlet valve 526 and the second pressure tank inlet valve 536 can be closed, and the second pressure tank outlet valve 528 and the third pressure tank inlet valve 538 can be opened. As the bimodal piston 514 travels from TDC to BDC, the pressure in the cylinder 514 can decrease below the second predetermined pressure $P_2$, causing the inlet check valve 520 to open and allowing gas to flow into the bimodal piston-cylinder assembly 502. As the bimodal piston 512 travels from BDC to TDC, the pressure in the cylinder 514 can increase above the pressure in the third pressure tank 508, causing the outlet check valve 521 to open and allow gas to flow into the third pressure tank 508. Gas can also flow into the fourth pressure tank 510 through the third and fourth check valves 562, 564. The bimodal piston 512 can continue to reciprocate until the third and fourth pressure tanks 508, 510 reach a third predetermined pressure $P_3$.

Figure 18:
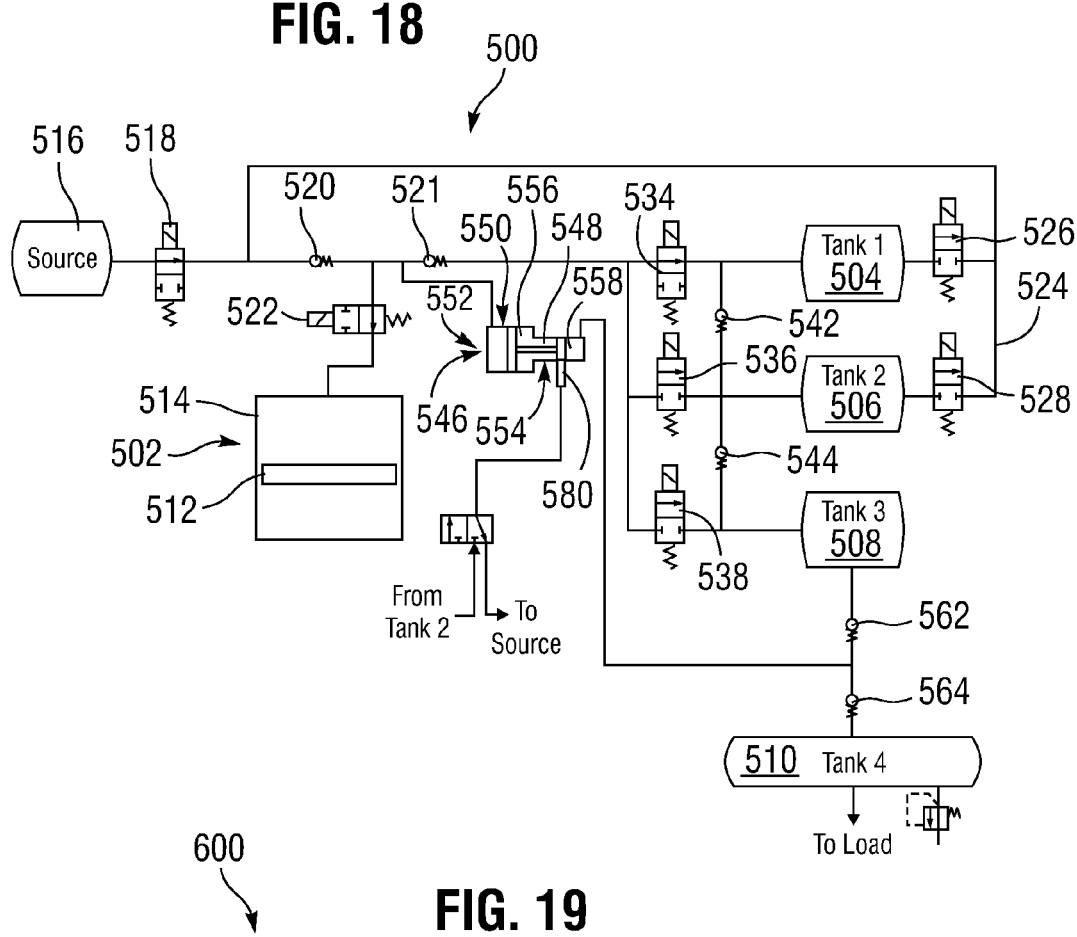
FIG. 18 is a schematic representation of the natural gas compression system of FIG. 17 illustrating an amplifier piston of the amplifier piston-cylinder assembly stroked to the left.

As the pressure in the third pressure tank 508 approaches the third predetermined pressure $P_3$, the pressure exerted against the small-diameter piston head 558 in the small volume portion 554 of the amplifier cylinder 550 can exceed the pressure exerted against the large-diameter piston head 556 in the large volume portion 552. At this point, the three-way valve 560 can move to the second position, causing the locking pin 580 to move to the unlocked position. This can cause the amplifier piston 548 to move to the second position (i.e., to be stroked to the left), as shown in FIG. 18. As the amplifier piston 548 moves to the second position, the natural gas contained in the large volume portion 552 of the amplifier cylinder 550 can be forced back into the bimodal piston-cylinder assembly 502 through the three-way valve 460 as the bimodal piston 512 travels from TDC to BDC. At the same time, the pressure in the small volume portion 554 of the amplifier cylinder 550 can decrease as the amplifier piston 548 moves to the second position, causing natural gas to flow into the small volume portion 554 from the third pressure tank 508 through the third check valve 562.

Next, the bimodal piston 512 can travel from BDC to TDC, which can increase the pressure in the cylinder 514 and the large volume portion 552 of the amplifier cylinder 550. This can cause the amplifier piston 548 to move from the second position back to the first position, while compressing the gas in the bimodal piston-cylinder assembly 502 and associated clearance volume from pressure $P_2$ to pressure $P_3$. As the amplifier piston 548 moves to the first position, the gas contained in the small volume portion 554 of the amplifier cylinder 550 can be compressed by the small-diameter piston head 558. When the pressure of the gas in the small volume portion 554 of the amplifier cylinder 550 increases beyond the pressure in the fourth pressure tank 510, the fourth check valve 564 can open and gas can flow from the small volume portion 554 of the amplifier cylinder 550 into the fourth pressure tank 510. This process can be repeated as necessary until the pressure in the fourth pressure tank 510 reaches a final pressure $P_{final}$. As the fourth pressure tank 510 is pressurized to the final pressure $P_{final}$, the pressure in the first, second, and third pressure tanks 504, 506, 508 can fall. Thus, the various valves can be moved between their respective open and closed positions as necessary to restore the pressure in first, second, and third pressure tanks 504, 506, 508 during pressurization of the fourth pressure tank 510.

Figure 19:
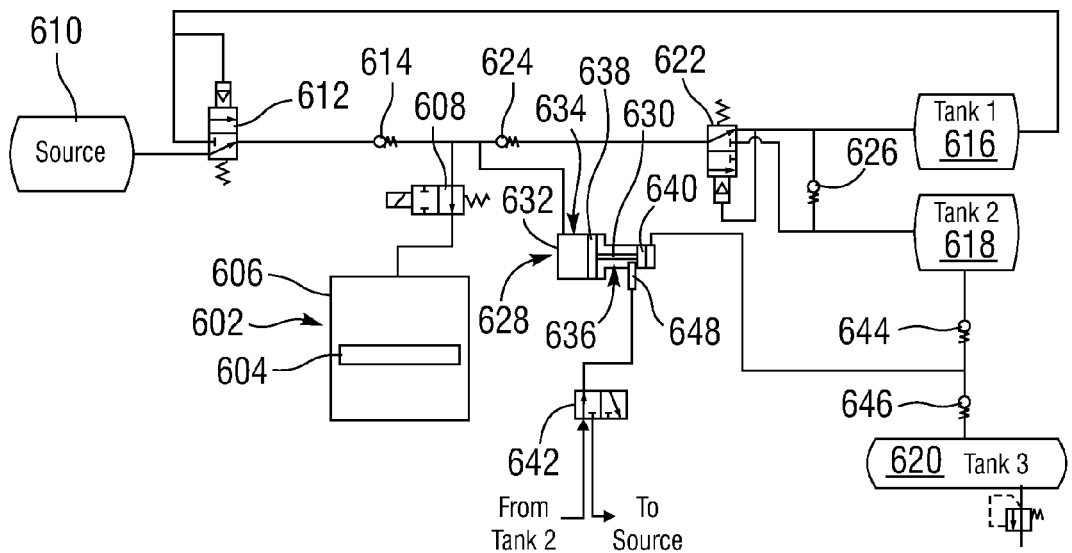
FIG. 19 is a schematic representation of another embodiment of a natural gas compression system having an amplifier piston-cylinder assembly and three pressure tanks.

Referring to FIG. 19 illustrates another alternative embodiment of the natural gas compression system 600 in which the amplifier piston-cylinder assembly is configured to compress natural gas for storage onboard a vehicle in four compression stages. The natural gas compression system 600 can include a bimodal piston-cylinder assembly 602 as part of a multi-cylinder engine (not shown) similar to the engine 210. The bimodal piston-cylinder assembly 602 can include a bimodal piston 604 configured to move between a TDC position and BDC position in a cylinder 606, and can be configured to operate in a combustion mode or compressor mode, similar to the bimodal piston-cylinder assembly of FIG. 2. The bimodal piston-cylinder assembly 602 can also include one or more compressor valves 608 similar to the compressor valves 248. The natural gas compression system 600 can be in communication with a natural gas source 610 via a passively-actuated (e.g., by a spring) three-way gas source valve 612 and an inlet check valve 614. The three-way gas source valve 612 can be movable between a first position, wherein the bimodal piston-cylinder assembly 602 is in communication with the natural gas source 610, and a second position, wherein the bimodal piston-cylinder assembly 602 is in communication with a first pressure tank 616.

In addition to the first pressure tank 616, the system 600 can include second and third pressure tanks 618, 620. The first and second pressure tanks 616, 618 can be in communication with the bimodal piston-cylinder assembly 602 via a passively-actuated (e.g., by a spring) three-way inlet valve 622 and an outlet check valve 624. The first and second pressure tanks 616, 618 can also be in communication with one another via a first check valve 626.

The system 600 can also include an amplifier piston-cylinder assembly 628 including a two-way amplifier piston 630 configured to travel in an amplifier cylinder 632, similar to the embodiment of FIG. 17. The amplifier cylinder 632 can have a large volume portion 634 and a small volume portion 636. The two-way amplifier piston 630 can have a large-diameter piston head 638 disposed in the large volume portion 634 of the amplifier cylinder 632, and a small-diameter piston head 640 disposed in the small volume portion 636 of the amplifier cylinder 632. The amplifier piston 630 can be configured to travel between a first position and a second position, the first position corresponding to a position in which the amplifier piston 630 is stroked right (i.e., the amplifier piston 630 is disposed such that the volume defined by the large-diameter piston head 638 and the large volume portion 634 of the amplifier cylinder 632 is at a maximum, and the volume defined by the small-diameter piston head 640 and the small volume portion 636 of the amplifier cylinder 632 is at a minimum). Similarly, the second position can correspond to a position in which the amplifier piston 630 is stroked left (i.e., the amplifier piston 630 is disposed such that the volume defined by the large-diameter piston head 638 and the large volume portion 634 of the amplifier cylinder 632 is at a minimum, and the volume defined by the small-diameter piston head 640 and the small volume portion 636 of the amplifier cylinder 632 is at a maximum).

In the exemplary embodiment shown, the ratio of the area of the large-diameter piston head 638 to the area of the small-diameter piston head 640 can be about 5:1 although, in alternative embodiments, the areas of the respective piston heads 638, 640 can have any suitable ratio. The large volume portion 634 of the amplifier cylinder 632 of the amplifier piston-cylinder assembly 628 can be in communication with directly with the bimodal piston-cylinder assembly 602 upstream of the outlet check valve 624. The small volume portion 636 of the amplifier cylinder 632 can be in communication with the second pressure tank 618 and/or the natural gas source 610 via an actively-actuated three-way amplifier valve 642. The three-way valve amplifier 642 can be movable between a first position, in which the small volume portion 636 of the amplifier cylinder 632 is in communication with the second pressure tank 618, and a second position, in which the small volume portion 636 of the amplifier cylinder 632 is in communication with the natural gas source 610. The small volume portion 636 of the amplifier cylinder 632 can also be in communication with the second pressure tank 618 via a second check valve 644, and with the third pressure tank 620 via a third check valve 646. Additionally, the three-way amplifier valve 642 can be operable to lock the amplifier piston 630 in the first position (i.e., stroked to the right). This can be accomplished by a locking pin 648 movable between a locked position and an unlocked position, as dictated by the position of the three-way amplifier valve 642. In the locked position, the locking pin 648 can extend behind the small-diameter piston head 640, thereby preventing the amplifier piston 630 from moving from the first position to the second position (i.e., keeping the amplifier piston 630 stroked right). In the unlocked position, the locking pin 648 can be retracted, allowing the amplifier piston 630 to move in the amplifier cylinder 632.

The natural gas compression system 600 can be configured such that the final stage of natural gas compression occurs in the amplifier piston-cylinder assembly 628 instead of in the bimodal piston-cylinder assembly 602, similar to the embodiment of FIG. 12. This can significantly reduce the peak pressures experienced by the bimodal piston-cylinder assembly 602 when operating in the compressor mode, which can reduce the instantaneous torque impulses experienced by the bimodal piston 604 and other associated engine components, as described above.

Operation of the natural gas compression system 600 can proceed in the following manner, with the passively-actuated three-way valves 612, 622 actuated pneumatically by pressure differences in the system 600, and the actively-actuated three-way amplifier valve 642 actuated by a computer, such as the computer 100. However, in alternative embodiments, the valves 612, 622, 642 can be actuated by any combination of active or passive elements, including by a computer, or any other suitable electrical, mechanical, or electro-mechanical control system, or combination thereof. First, the three-way gas source valve 612 and the compressor valve 608 can be in the open position such that gas flows from the natural gas source 610 into the bimodal piston-cylinder assembly 602. The three-way inlet valve 622 can also be in the open position. The three-way amplifier valve 642 can be positioned such that the locking pin 648 is in the locked position.

As the bimodal piston 604 travels from TDC to BDC, the pressure in the cylinder 606 can decrease below the pressure of the natural gas source 610, causing the inlet check valve 614 to open and allowing gas to flow into the bimodal piston-cylinder assembly 602. As the bimodal piston 604 travels from BDC to TDC, the pressure in the cylinder 606 can increase above the pressure in the first pressure tank 616, causing the outlet check valve 624 to open and allowing gas to flow into the first pressure tank 616. Gas can also flow into the second and third pressure tanks 618, 620 through the first, second, and third check valves 626, 644, 646. The bimodal piston 604 can continue to reciprocate until the first, second, and third pressure tanks 616, 618, 620 reach a first predetermined pressure $P_1$. At this point, the pressure in the large and small volume portions 634, 636 of the amplifier cylinder 632 of the amplifier piston-cylinder assembly 628 can be equal, and the amplifier piston 630 can remain in the first position. In some embodiments, the reciprocation of the bimodal piston 604 may cause force imbalances that would tend to move the amplifier piston 630 to the second position. However, the locking pin 648 can keep the amplifier piston 630 in the first position during this time.

Once the pressure in the first, second, and third pressure tanks 616, 618, 620 reaches the first predetermined pressure $P_1$, the pressure in the first pressure tank 616 acting against the passive spring actuators (not shown) of the three-way gas source valve 612 and the three-way inlet valve 622 can overcome the force exerted against the valves 612, 622 by their respective spring actuators, causing the valves 612, 622 to move their respective second positions. As the bimodal piston 604 travels from TDC to BDC, the pressure in the cylinder 606 can decrease below the first predetermined pressure $P_1$ in the system, causing inlet check valve 614 to open and allowing gas to flow from the first pressure tank 616 into the bimodal piston-cylinder assembly 602. As the bimodal piston 604 travels from BDC to TDC, the pressure in the cylinder 606 can increase above the pressure in the second pressure tank 618, causing the outlet check valve 624 to open and allowing gas to flow into the second pressure tank 618. Gas can also flow into the third pressure tank 620 through the second and third check valves 644, 646 until the pressure in the second and third pressure tanks 618, 620 reaches a second predetermined pressure $P_2$. Due to the 5:1 ratio of the areas of the large-diameter piston head 638 and the small-diameter piston head 640, and the locking pin 648, the amplifier piston 630 can remain in the first position (i.e., stroked to the right).

Figure 20:
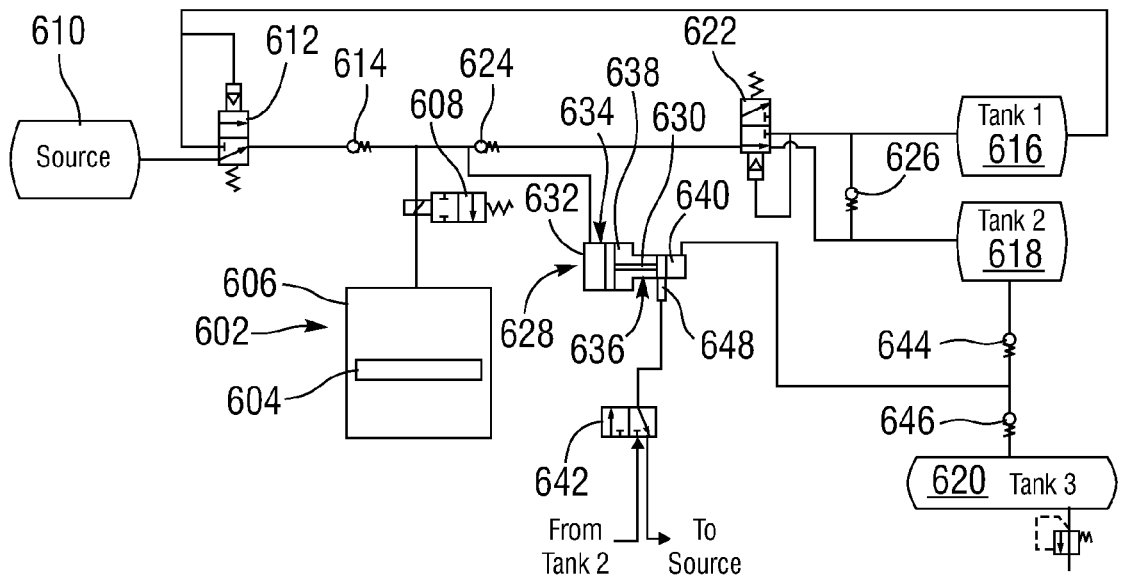
FIG. 20 is a schematic representation of the natural gas compression system of FIG. 19 illustrating an amplifier piston of the amplifier piston-cylinder assembly stroked to the left.

When the second and third pressure tanks 618, 620 reach the second predetermined pressure $P_2$, the three-way amplifier valve 642 can be moved to the second position, such that the locking pin 648 is retracted. As the bimodal piston 604 travels from TDC to BDC, gas can be drawn in to the cylinder 606 from the first pressure tank 616 via the inlet check valve 614. This can cause a difference in pressure exerted against the large-diameter piston head 638 and the small-diameter piston head 640 of the amplifier piston 630, causing the amplifier piston 630 to move to the second position (i.e., to be stroked to the left), as shown in FIG. 20. As the amplifier piston 630 moves to the second position, gas in the large volume portion 634 of the amplifier cylinder 632 can be forced to flow back into the bimodal piston-cylinder assembly 602. As the same time, gas at pressure $P_2$ can flow from the second pressure tank 618 into the small volume portion 636 of the amplifier cylinder 632 through the second check valve 644.

After the amplifier piston 630 has moved from the first position to the second position, the bimodal piston 604 can travel from BDC to TDC, which can increase the pressure of the gas in the large volume portion 634 of the amplifier cylinder 632 from $P_1$ to $P_2$, causing the amplifier piston 630 to move back to the first position. As the amplifier piston 630 moves back to the first position, the small-diameter piston head 640 compresses the gas in the small volume portion 636 of the amplifier cylinder 632. When the pressure in the small volume portion 636 of the amplifier cylinder 632 increases beyond the pressure in the third pressure tank 620, the third check valve 646 can open, allowing gas to flow into the third pressure tank 620. This process can be repeated until the pressure in the third pressure tank 620 reaches a final pressure $P_{final}$.

As the third pressure tank 620 is pressurized to the final pressure $P_{final}$, the pressure in the first and second pressure tanks 616, 618 can fall. Thus, if the pressure in the first pressure tank 616 falls below the pressure required to hold the three-way gas source valve 612 and the three-way inlet valve 622 in the open position, the valves 612, 622 can move to the closed position by action of the passive actuators, which will alter the gas flow in the system 600 such that the first pressure tank 616 can be re-pressurized. In the embodiment shown, the three-way gas source valve 612 and the three-way inlet valve 622 can be configured as bi-stable valves in order to avoid excessive switching between the valves' respective open and closed positions. For example, if the first pressure $P_1$ is desired to be 50 psi, the three-way gas source valve 612 and the three-way inlet valve 622 can be configured not to change from the open to the closed position until a pressure of 50 psi is achieved in the first pressure tank 616. As the pressure in the first pressure tank 616 decreases, the valves 612, 616 will not move back to the open position until the pressure tank falls below a low pressure threshold $P_{low}$ (e.g., 42 psi). A valve configured in this manner can include a pneumatic piston configured to move against a spring. The piston can have a first area A exposed to the first predetermined pressure $P_1$ and a second area 1.25A (i.e., the second area can be 25% larger than the first area) that will become exposed to the pressure $P_1$ as soon as the piston begins to move. The second area 1.25A will keep the valve in the second position until the pressure exerted against the first area falls below, for example, $0.8P_1$ (e.g., 0.8*50 psi=40 psi).

Figure 21:
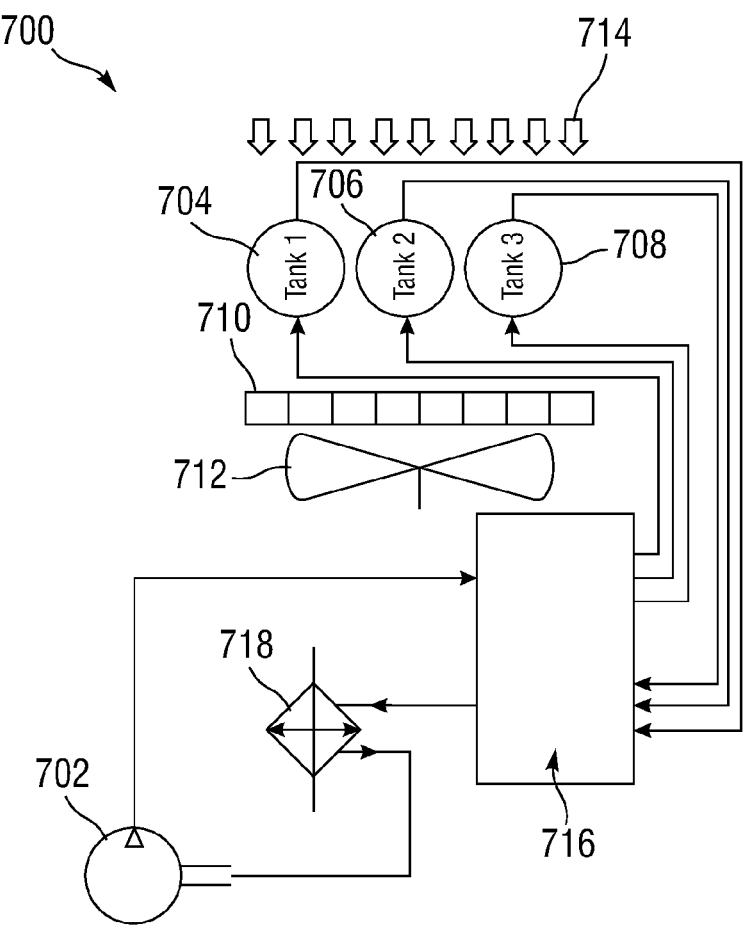
FIG. 21 is a schematic representation of another embodiment of a natural gas compression system having three pressure tanks located forward of a vehicle radiator.

FIG. 21 is a schematic illustration of an alternative embodiment of a natural gas compression system 700 configured to compress natural gas for storage onboard a vehicle, similar to the system of FIG. 2. The system 700 can include an engine having a bimodal piston-cylinder assembly 702 similar to the bimodal piston cylinder assembly 246. The system 700 can include first, second, and third pressure tanks 704, 706, 708 located upstream of a radiator 710. In this manner, a radiator fan 712 can be configured to induce air currents represented by arrows 714 to flow across the first, second, and third pressure tanks 704, 706, 708. The system 700 can include a valve block 716 in communication with the first, second, and third pressure tanks 704, 706, 708, similar to the valve block of FIG. 2. The valve block 716 can also be in communication with the bimodal piston-cylinder assembly 702 via a heat exchanger 718. The heat exchanger 718 can be configured to cool the natural gas flowing to the valve block 716 from the bimodal piston-cylinder assembly 702 using the vehicle's air conditioning system. In this manner, the system 700 need not include individual heat exchangers for each of the first, second, and third pressure tanks 704, 706, 708.

Example 1

The following example proceeds with respect to the natural gas compression system 200 of FIG. 2. However, the devices and methods described below can be applicable to any of the natural gas compression system embodiments described herein. A dynamic model was built to help understand and address the challenges associated with the onboard natural gas compression system 208. This model provides a platform for detailed analysis and evaluation of individual components of the system 208. The hardware for the system 208 was designed in parallel with the modeling effort. The dynamic model of the system in operating in the compressor mode was built in the Matlab/Simulink/Simscape environment, and was developed from first principles. The model was primarily built to guide hardware decisions, evaluate the effect of torque due to compression on the engine (designated here as 'torque disturbance'), understand filling dynamics, and to evaluate and compare various architectures. The model includes sub-models for the engine 210, compression volumes, valves and orifices, pressure tanks, and control by the computer 100, which are further described below.

The engine sub-model calculates the engine speed and crank angle based on the net torques from the piston-cylinder assemblies 234 and the bimodal piston-cylinder 248. The piston kinematics for all piston-cylinder assemblies 234 and the bimodal piston-cylinder assembly 246 are calculated from the slider crank geometry as a function of engine crank angle. Because the combustion dynamics are not very important to the modeling effort, the combustion cylinder model was simplified to reduce computation time. Measured pressure data from a representative engine was scaled and used in the model as an approximation for the true dynamics.

The engine speed is calculated dynamically from the net torque of the engine 210, so it varies in response to the torque output of the bimodal piston-cylinder assembly 246 when operating in the compressor mode. The engine inertia is modeled as a constant, but a future improvement will be to model the engine inertia as a function of crank angle.

The bimodal piston-cylinder assembly 246 sub-model has several components: a variable-volume control volume (representing the cylinder 238) connected to a fixed-volume control volume (representing the intermediate volume) by a fixed-area orifice (representing the compressor valves 248). The dynamic pressure and temperature changes in both types of control volumes are based on adiabatic compression of an ideal gas.

The control volume (CV) model dynamically calculates the pressure and temperature of the gas within the volume given the mass flow in/out and the rate of change of the CV (see Equations 1 and 2). The variable volume of the cylinder 238 is calculated based on the position of the bimodal piston 256. The equations used to calculate the change in pressure and temperature are derived from the energy equation and the ideal gas law.

$$\dot{P} = \frac{k \cdot R}{V}\sum \dot{m} \cdot T' - \frac{k \cdot P}{V}\dot{V} + \frac{\dot{Q}}{V}(k-1) \quad \text{Equation 1}$$

$$\dot{T} = \frac{R \cdot T}{P \cdot V}\left(k\sum \dot{m} \cdot T' - \sum \dot{m} \cdot T - \frac{P}{c_v}\dot{V} + \frac{\dot{Q}}{c_v}\right) \quad \text{Equation 2}$$

Where:
- k is the ratio of specific heats, $k = c_p/c_t$
- R is the gas constant (J/Kg·K)
- V is volume of the CV at time, t (m³)
- P is pressure of the CV at time, t (Pa)
- $\dot{V}$ is the volume rate of change of the CV (m³/s)
- $\dot{m}$ is the mass flow into the CV (defined as positive for mass entering the CV) (Kg/s)
- T' is the temperature of the gas flowing in/out of the CV (K). If $\dot{m}$ is positive, T' is the temperature of the gas flowing into the CV; if $\dot{m}$ is negative, T' is the temperature of the gas flowing out of the CV.
- T is the temperature of the gas in the CV (K)
- $\dot{Q}$ is the heat transfer between the CV and the surroundings (ie. through walls, not via mass flow) (W)
- For a fixed volume (tanks and intermediate volume submodels), $\dot{V}=0$. For isentropic compression (assumed for the cylinder and intermediate volume), $\dot{Q}=0$.

All valves and orifices are modeled as compressible flow orifices. The compressor valves 248 are held open during refueling, and thus are treated as a constant area orifice, with $C_d=0.6$. The inlet and outlet check valves 284, 280 are modeled as variable area orifices based on pressure differential, with $C_dA$ data provided by the manufacturer. According to the manufacturer, this style of reed valve can be assumed to be full-open as soon as the pressure differential is greater than zero because of the extremely fast response time of the reed. The modeled check valves include a ramp up from zero to full-open area over a small pressure differential to reduce chatter in the model.

The equations can provide a direct way to solve for mass flow rate as a function of the pressures and temperatures of the gas on either side of the orifice.

$$\dot{m} = C_d A \frac{P_1}{\sqrt{RT_1}}\Psi \quad \text{Equation 3}$$

Where the flow function $\Psi$ is defined in Equation 4 as:

$$\Psi = \begin{cases} \sqrt{k\left(\frac{2}{k+1}\right)^{\frac{k+1}{k-1}}} & (P_2 < P_{cr}) \\ \left(\frac{P_2}{P_1}\right)^{\frac{1}{k}}\sqrt{\frac{2k}{k-1}\left[1-\left(\frac{P_2}{P_1}\right)^{\frac{k+1}{k-1}}\right]} & (P_2 \geq P_{cr}) \end{cases} \quad \text{Equation 4}$$

The critical pressure at which the choked flow is reached is defined in Equation 5 as:

$$P_{cr} = \left[\frac{2}{k+1}\right]^{\frac{k}{k-1}} \quad \text{Equation 5}$$

Where:
- $C_d$ is the orifice discharge coefficient
- A is the orifice area (m²)
- $P_1$ is the pressure upstream of the orifice (Pa)
- $P_2$ is the pressure downstream of the orifice (Pa)
- $T_1$ is the temperature of the upstream gas (K)
- k is the ratio of specific heats, $k=c_p/c_t$
- R is the gas constant (J/Kg·K)

For this prototype, the flows remain subsonic, mostly in the incompressible regime (Mach number<0.3).

The first, second, and third pressure tanks 212, 214, 216 are modeled by a fixed control volume model in which the pressure and temperature vary dynamically as a function of mass flow in/out of the volume. Additionally, heat transfer is included to simulate the effect of the heat exchangers 220, 222, 224, which can lower the temperature of the incoming compressed gas to approximately ambient temperatures before entering the respective pressure tanks 212, 214, 216. For this model, the volume of the heat exchangers 220, 222, 224 was considered to be an extension of the respective pressure tank control volumes. Therefore, heat is removed directly from the tank control volume. This approximation should be accurate since the volume of the heat exchangers 220, 222, 224 can comprise a significant part of the total volume of the respective pressure tanks 212, 214, 216.

The sub-model of the computer 100 simulates the logic associated with operating the valving of the valve block 218. It uses feedback from tank pressures to decide which of the pressure tanks 212, 214, 216 to connect to the inlet and outlet check valves 284, 280 at the appropriate time for switching between compression stages. For 3-stage compression, there are five operational states, described above with respect to FIG. 7.

For example, while the fourth operational state 296 is enabled, (pumping from the first pressure tank 212 to the second pressure tank 214), the pressure in the first pressure tank 212 is gradually depleted. When the pressure in the first pressure tank 212 pressure reaches the threshold $P1_{low}$, the computer 100 can switch back to the third operational state 294 to replenish tank 1 from the source supply. The time in which the first and second pressure tanks 212, 214 are depleted depends on the sizes of pressure tanks 212, 214. In some embodiments, the first and second pressure tanks 212, 214 can have volumes of from about 10 L to about 20 L, which means that they would deplete over the course of several compression strokes.

Many different engines can be configured to operate with the natural gas compression system discussed herein, as described above. Any necessary modifications to the selected engine(s) could easily be designed at the OEM level. For purposes of this example, the engine 210 is a Cummins 5.9 liter, 12 valve, inline 6 (I6) diesel engine. This engine is produced in high volume and, like many diesel engines, is capable of handling high peak in-cylinder pressures. This engine is often modified for racing applications in which peak torque output is many times that of the stock engine specifications of 597 Nm (440 ft-lbf). This implies that the block, head, and all associated hardware can handle the increase in stress present in these high performance cases, provided that certain modifications are made. Similarly high stresses can be applied to the engine components when operating in the compressor mode. Some of the common modifications performed on the Cummins I6 to increase its robustness include the use of high strength head stud kits, larger crank and rod bearings, stronger billet connecting rods, and fire rings to replace the head gasket.

In addition to these high performance modifications, the Cummins I6 is also commonly converted to run on natural gas. To operate in the compressor mode, cylinder deactivation, as well as the ability to modify the cylinder head 232 to incorporate the new hardware, was also required. There are many models of the Cummins I6 available, including the original 5.9 liter-12 valve model, the 5.9 liter-24 valve model, and the newer 6.7 liter-24 valve model. The 12 valve model provides more space in the cylinder head to incorporate the new hardware, and was therefore selected for the prototype. Valve deactivation is not a standard option for the Cummins I6; however, the engine can be modified to accept collapsible lifters to achieve this functionality. Blow-by of compressed gas into the crank case can be at least partially avoided with the use of gapless piston rings. Some of the important specifications for this engine are shown in Table 2.

TABLE 2

| Cummins 5.9L Inline 6 Engine Specifications | |
|---|---|
| Displaced Volume (per cylinder) | 981.7 cc [59.9 in³] |
| Clearance Volume (per cylinder) | 61.4 cc [3.7 in³] (stock) |
| | 81.8 cc [5.0 in³] (After NG Conversion) |
| Stroke | 119.9 mm [4.72 in] |
| Bore | 102.1 mm [4.02 in] |
| Connecting Rod | 192.0 mm [7.56 in] |
| Compression Ratio | 17.0:1 (Stock) |
| | 13.0:1 (After NG Conversion) |
| Number of Valves | 12 (2 per cylinder) |
| Firing Order | 1-5-3-6-2-4 |
| Engine Inertia (Estimated) | 0.11 kg-m² |
| Idle Speed | 840 RPM |

In order to incorporate the compressor valves 248 into the cylinder head 232 of the engine 210, a custom billet head was designed. Designing new valves and ports into a stock head is extremely difficult because of the water jacket and lubrication passages cast into the OEM parts. It can be more practical to produce a billet head with cooling and lubricating passages designed around the new hardware so that these passages do not have to be sleeved and plugged. The custom cylinder head 232 in this example is made of 6061-T6 aluminum alloy for strength and weldability, and the hardware in the cylinder head 232 for the second through the fifth piston-cylinder assemblies 234 is stock with modifications to operate using natural gas as fuel. The hardware for bimodal piston-cylinder assembly 246 contains the stock intake and exhaust valves 242, 244 and a spark plug so that the bimodal piston-cylinder assembly 246 can function normally when operating in the combustion mode. The cylinder head 232 also includes the compressor valves 248. The compressor valves 248 were designed by considering at least the packaging and physical constraints balanced against model predictions for performance.

The question of how many compression stages to implement was considered. As discussed above, the benefits of fewer stages can include minimized hardware (fewer pressure tanks, fewer valves, etc.) and reduced torque. The benefits of more stages can include reduced compression ratio requirements, higher pumping efficiency, and an overall lower energy requirement for natural gas compression. At the limit of an infinite number of stages (with inter-stage cooling), the process approaches isothermal compression, which requires less work than isentropic compression. For purposes of this example, three compression stages were chosen to minimize hardware requirements while keeping the temperatures and compression ratios realistic. Table 3 shows the parameters for the compression stages.

TABLE 3

| Compression Stage Parameters | |
|---|---|
| # Stages | 3 |
| Source Pressure (bar) | 1.22 |
| Tank 1 Design Pressure (bar) | 7.2 |
| Tank 2 Design Pressure (bar) | 42.4 |
| Tank 3 Design Pressure (bar) | 250 |
| Pressure Ratio between Stages (PR) | 5.9 |
| Minimum Possible Compression Ratio ($CR_{min}$) | 3.9 |
| Actual Compression Ratio for Prototype (CR) | 4.7 |

The minimum compression ratio is calculated as the lowest compression ratio in which the bimodal piston-cylinder assembly 246 will reach the outlet pressure. If the compression ratio is any lower, the pressure in the bimodal piston-cylinder assembly 246 will not reach the outlet pressure, and no gas will flow to the pressure tanks 212, 214, 216. Assuming isentropic compression where k=1.3 for natural gas, the compression ratio CR is given by Equation 6.

$$CR^k = \left(\frac{V_1}{V_2}\right)^k = \frac{P_2}{P_1} = PR \qquad \text{Equation 6}$$

Figure 22:
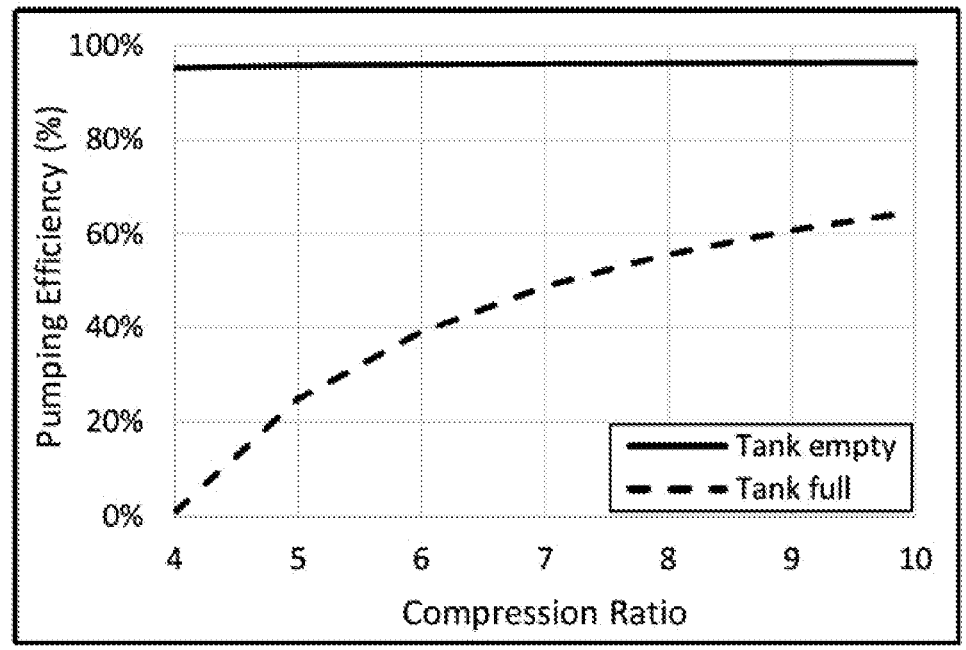
FIG. 22 is a plot of pumping efficiency versus compression ratio of a bimodal piston-cylinder assembly while filling a pressure tank.

In the present example, the compression ratio of the bimodal piston-cylinder assembly 246 when operating in the combustion mode can be 13:1 after conversion to operate using natural gas as fuel (addition of a spark plug, etc.). Because of the required intermediate volume to route gas flow out of the cylinder head 232 and hold the inlet and outlet check valves 284, 280, the effective compression ratio of the bimodal piston-cylinder assembly when operating in the compressor mode can be less than 13:1. FIG. 22 illustrates the effect of compression ratio on pumping efficiency, where pumping efficiency is defined as the ratio of actual net mass flow over a cycle to the theoretical ideal mass flow (equal to the mass in the displaced volume at inlet pressure and temperature). As shown in FIG. 22, pumping efficiency increased from about 0% at a compression ratio of 4 to about 60% at a compression ratio of about 9.

The pumping efficiencies are only a function of the pressure ratio. The 'tank empty' case represents when the outlet tank pressure is equal to the inlet pressure. The outlet tank can be the first pressure tank 212 or the second pressure tank 214, depending upon the stage of compression. When the outlet tank pressure is equal to the inlet pressure, the pressure in the bimodal piston-cylinder assembly 246 reaches the outlet pressure almost immediately and flows through the outlet check valves 280 for the entirety of the compression stroke. There is always some loss through the valves, so 100% pumping efficiency is impossible to achieve. For the 'tank full' case, the outlet tank is at the design pressure. The first and second pressure tanks 212, 214 can be close to the "full" state during most of the filling cycle and the third pressure tank 216 can gradually fill from empty to full over the course of the filling cycle.

The trend in FIG. 22 can be for a particular pressure ratio between the stages (5.9 for this example). If the pressure ratio were decreased (for example, with more stages), then, with the same compression ratio, the pressure in the bimodal piston-cylinder assembly 246 can reach the outlet pressure sooner in the compression stroke, resulting in more mass flow. For example, in this scenario the 'tank empty' case in FIG. 22 would be the pumping efficiency of the 'tank full' case at the limit of an infinite number of stages.

Figure 23:
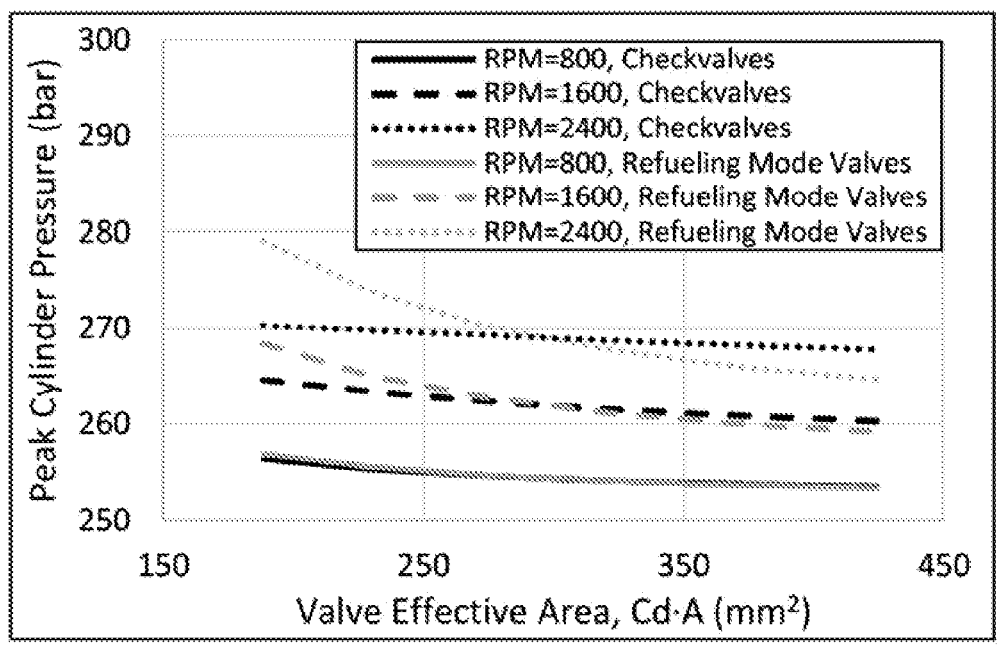
FIG. 23 is a plot of the effect of valve area on the peak cylinder pressure in a bimodal piston-cylinder assembly.
Figure 24:
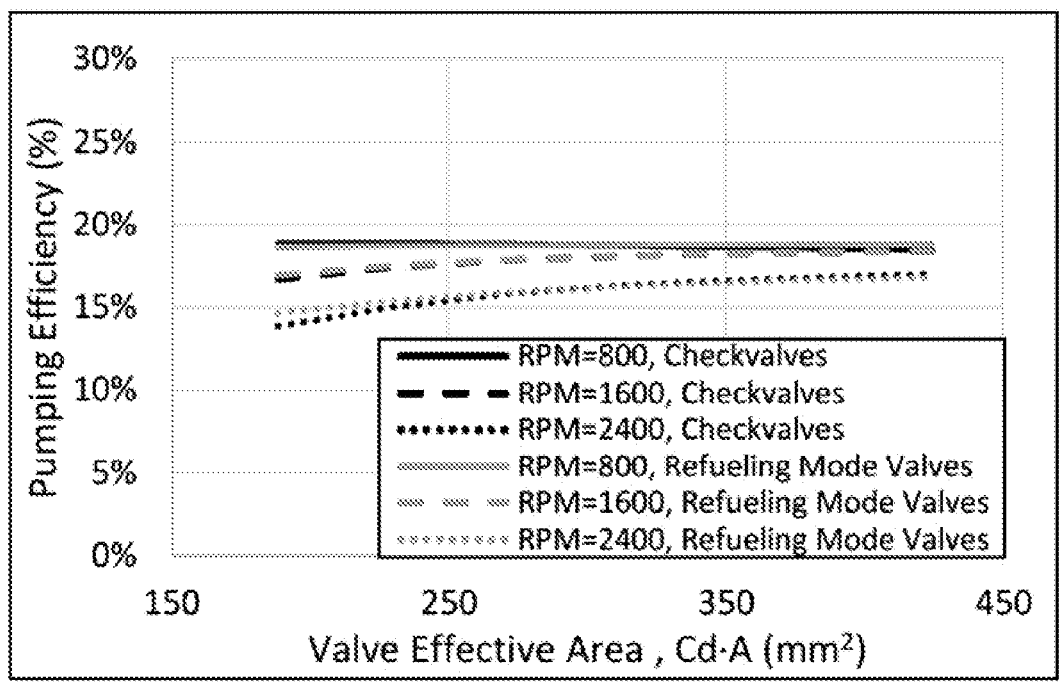
FIG. 24 is a plot of the effect of valve area on the pumping efficiency of a bimodal piston-cylinder assembly.

The model was also used to determine the size of the compressor valves 248 and the inlet and outlet check valves 284, 280. The main parameters influencing the decision were peak cylinder pressure and pumping efficiency. The peak cylinder pressure is of concern at the end of the filling cycle when the pressure in the third pressure tank 216 is close to 250 bar. Any pressure drop across the inlet and outlet check valves 284, 280 means that the pressure in the bimodal piston-cylinder assembly 246 will be higher than the outlet pressure. The cylinder head 232 was designed to handle 270 bar and, therefore, the valves and port geometry were designed to keep the pressure drop below 20 bar differential under these conditions. Additionally, pumping efficiency is improved for larger valves as flow losses are decreased. The size of the compressor valves 248 is limited by the available space at the top of the cylinder 238. The size of the inlet and outlet check valves 284, 280 was chosen to optimize flow characteristics with the assumption that larger valves increase the intermediate volume and reduce the compression ratio, but also reduce pressure drop. The valve size should be as small as possible, while maintaining reasonable peak cylinder pressures and pumping efficiencies. FIG. 23 shows the effect of valve sizes on peak cylinder pressure for different engine speeds. FIG. 24 shows the effect on pumping efficiency. Valve size is expressed in terms of flow area multiplied by the coefficient of discharge, $C_dA$. FIGS. 23 and 24 were run with a compression ratio of 4.7. Inlet and outlet check valve 284, 280 $C_dA$ and compressor valve 248 $C_dA$ were varied separately, with the other respective valve held constant at 295 mm².

For a maximum allowable bimodal piston-cylinder assembly 246 pressure of 270 bar, all valve sizes shown in the graph are viable if the engine speed is kept to 800-1600 RPM. For a higher engine speed of 2400 RPM, the pressure in the bimodal piston-cylinder assembly 246 would exceed the 270 bar limit for compressor valve $C_dA$ less than 270 mm². Higher engine speeds are desirable to reduce the refueling time as well as reducing the engine speed variation due to the torque disturbance. Pumping efficiency is slightly improved for larger valves, but the effect is not strong. For the prototype, the compressor valves 248 can be configured as two 22 mm valves, which can be routed through the manifold 250 with a 23 mm minimum diameter (modeled $C_dA$=294 mm²). Each respective set of inlet and outlet check valves 284, 280 has an outlet flow area of 648 mm² (modeled $C_dA$=389 mm²). The tightest restriction in the flow is where the manifold 250 exits the cylinder head 232. The geometry of the manifold 250 was limited by manufacturability since the prototype cylinder head 232 was machined out of billet stock. In some embodiments if the cylinder head 232 is configured as a casting, the flow areas and geometry can be improved. However, as seen in FIG. 24, pumping efficiency is not a strong function of valve area in this range.

Figure 25:
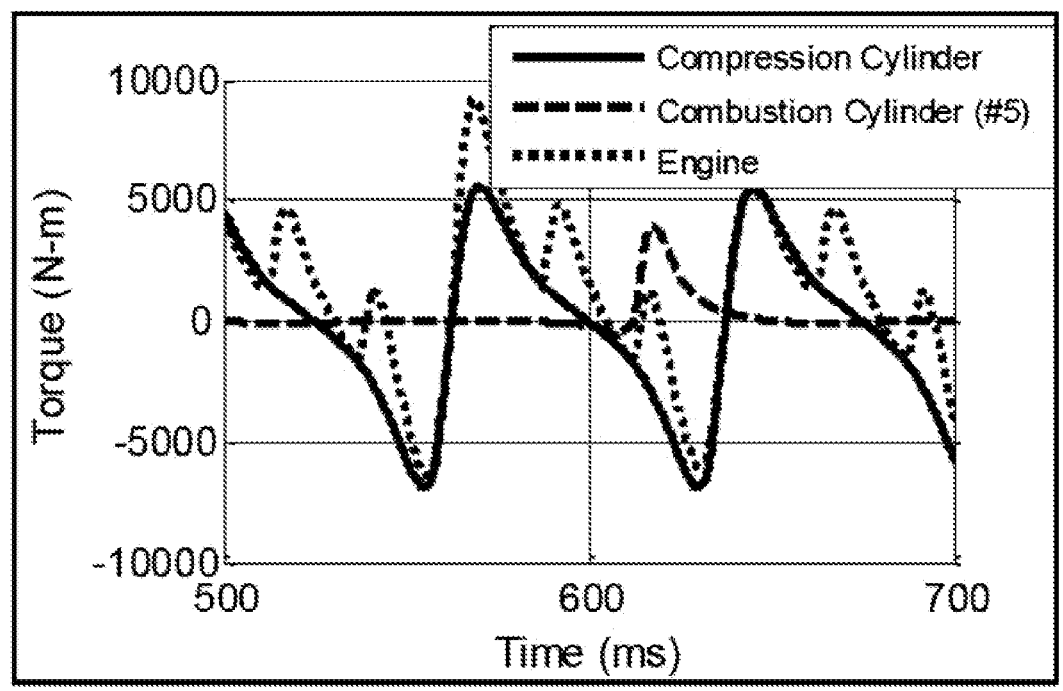
FIG. 25 is a plot of the instantaneous torque generated while filling a pressure tank from about 42 bar to about 250 bar.

As discussed previously, a unique challenge is how to use the same hardware (e.g. the bimodal piston-cylinder assembly 248) for 3 different stages of compression. Solutions can include switching between stages using the valve block 218 controlled by the computer 100. The more difficult problem is that while the engine 210 has sufficient combustion pressure to provide the average torque required for all stages of compression, the instantaneous torque during the end of stage 3 (filling the third pressure tank 216 to 250 bar) can be high enough to stall the engine 210. This torque can also damage many of the stock components of the engine 210, if they are not designed for this loading. FIG. 25 shows the instantaneous torque of the fifth piston-cylinder assembly 234 versus the bimodal piston-cylinder assembly 246 when operating during stage three compression (e.g., 42.4 bar to 250 bar). FIG. 25 also shows the net torque on the engine 210 as a function of time. The instantaneous torque of the bimodal piston-cylinder assembly 246 varies between about +5000 N-m and about −5000 N-m, while the fifth piston-cylinder assembly 234 varies from about 0 N-m to about 4000 N-m.

A larger number of stages with smaller pressure steps in each stage can actually exacerbate the torque disturbance problem. For example, if the final pressure increased from 150 bar to 250 bar instead of from 42.4 bar to 250 bar, then the average pressure in the bimodal piston-cylinder assembly 246, and, therefore, the average torque, would be higher during more of the cycle. Furthermore, increasing the compression ratio also increases the torque disturbance because the in-cylinder pressure builds more quickly, thereby also producing higher average pressure in the bimodal piston-cylinder assembly 246 and, therefore, higher average torque.

There are a few additional important characteristics regarding the torque disturbance. First, in the cases where the compression torque is the highest, the pumping efficiency is the lowest. This is illustrated in FIG. 22, with the tank full vs. tank empty plots. As a result, much of the engine speed reduction due to the natural compression is recovered on expansion during the intake stroke. Secondly, the torque due to compression may never be exactly countered with a combustion event. Therefore, the inertia of the engine 210 needs to be enough to carry the rotating group through the compression event. To address these concerns, several potential solutions were assessed.

Multiple Bimodal Piston-Cylinder Assemblies

Using two bimodal piston-cylinder assemblies 246 instead of one would produce two peak torque events. These peak torque events would be offset by cylinder phasing (see, e.g., FIG. 14). The torque events may largely cancel each other out if phased correctly.

Late Valve Timing:

This embodiment comprises delaying the addition of 42.4 bar natural gas from the second pressure tank 216 until the bimodal piston 256 is partway through the compression stroke (see, e.g., FIG. 10). The peak pressure would still reach the desired outlet pressure, but the overall flow and the overall duration of the torque event would be lessened. This embodiment employs a relatively fast valve to time the port opening correctly.

Figure 26:
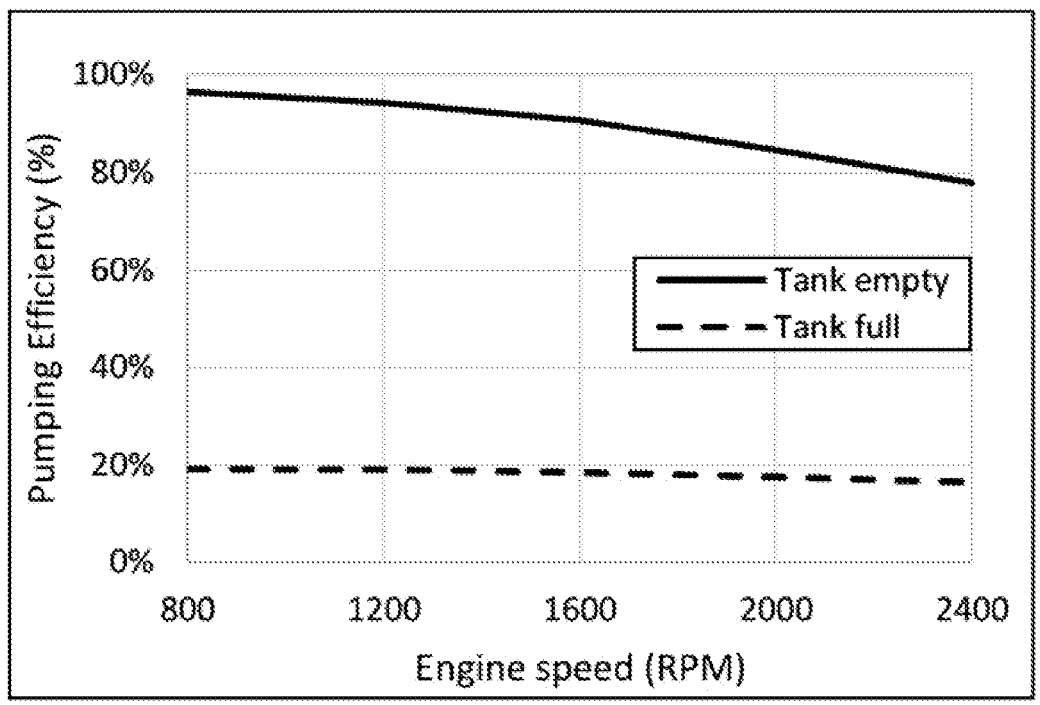
FIG. 26 is a plot of the effect of engine speed on pumping efficiency for a bimodal piston-cylinder assembly with a compression ratio of 4.7:1.
Figure 27:
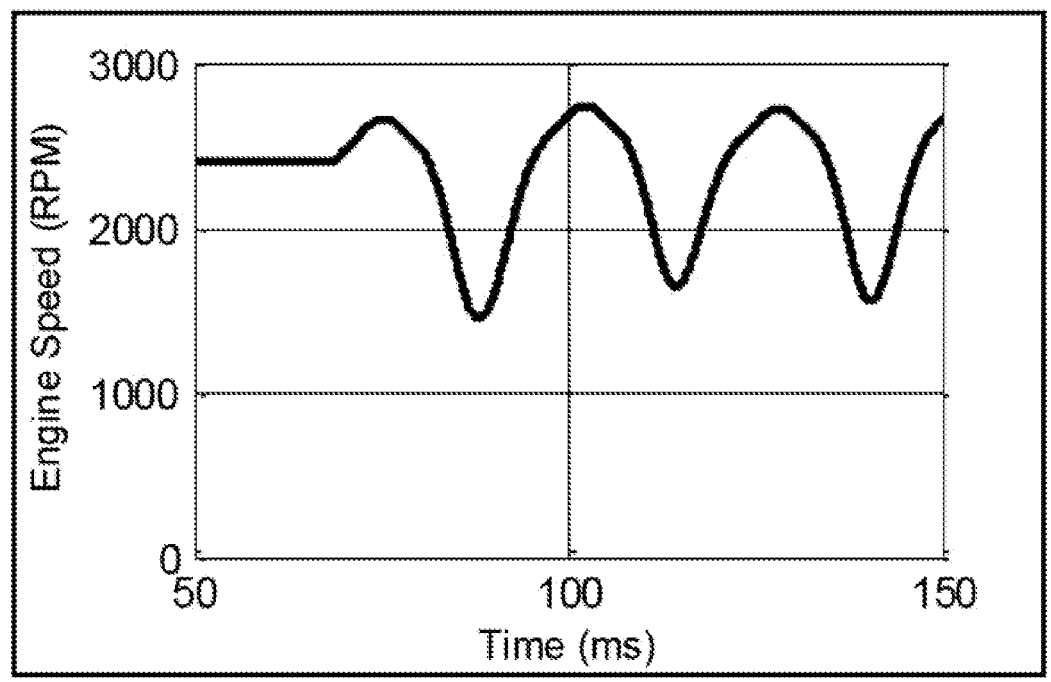
FIG. 27 is a plot of engine speed variations versus time at 2400 RPM with three times the stock rotational inertia for a compression event experienced by a bimodal piston-cylinder assembly.
Figure 28:
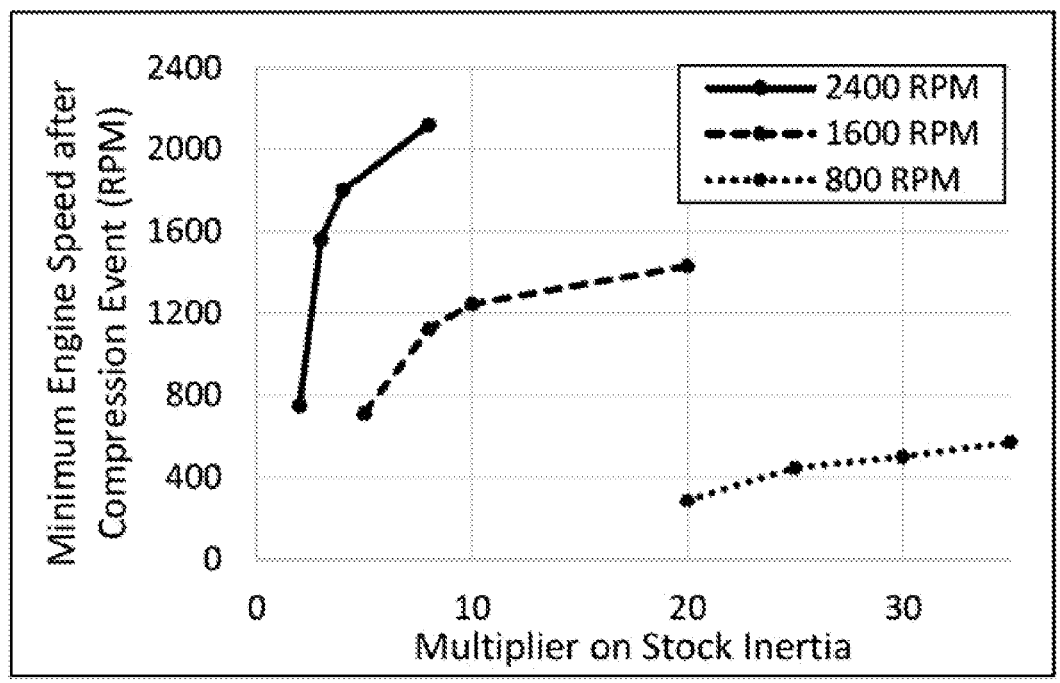
FIG. 28 is a plot of the minimum engine speed after a compression event experienced by a bimodal piston-cylinder assembly as a function of inertia and engine speed.

Inertia and RPM:

Both higher engine inertia and faster engine speeds reduce the impact of the high instantaneous torque. A compression stroke requires a certain amount of work to be done which directly relates to the reduction in engine speed during the compression process. Higher engine speeds can help because the engine starts with more kinetic energy, resulting in a smaller speed reduction. However, higher engine speeds can be disadvantageous for their high peak cylinder pressures (see, e.g., FIG. 23) and can be disadvantageous from a pumping efficiency perspective (see, e.g., FIG. 26). Higher inertia can be achieved via a flywheel or some other mechanism, which could be engaged with the system 208 via a clutch. FIG. 27 shows an example of engine speed varying through several high-torque compression events with both high engine speed (2400 RPM) and additional inertia (3× stock). The engine speed drops to a minimum of approximately 1500 RPM, which is not enough to stall the engine. FIG. 28 shows this minimum engine speed value for several baseline engine speeds and additional inertias, illustrating the tradeoff between engine speed and inertia. For example, at 800 RPM, the inertia required to keep the engine speed drop to a reasonable level would be 20-30 times the stock inertia. This analysis shows that a combination of higher engine speeds, some additional inertia, and late valve timing, can be combined to achieve the desired performance.

FIG. 6 shows a representative valve block 18 configured to provide three-stage natural gas compression functionality. With this schematic several operational system states can be described like the ones described in the controller section and a valve state chart is created like the one in Table 4. In some embodiments, the gas source valve 262 and any valve(s) on the natural gas source 254 can remain open throughout the compression process.

TABLE 4

Valve State Chart

| System State | Open Valves |
| --- | --- |
| Stage 1 Initialize | O1, O2, O3 |
| Stage 2 Initialize | I1, O2, O3 |
| Stage 1 | O1 |
| Stage 2 | I1, O2 |
| Stage 3 | I2, O3 |

The valves in the valve block 218 can control which of the pressure tanks 212, 214, 216 are connected to the bimodal piston-cylinder assembly 246, and can be controlled by the computer 100. The timing and speed at which the valves switch between their respective open and closed positions should be considered for smooth operation. The computer 100 can be configured to switch the high pressure and low pressure connections at appropriate times during the compression cycle.

Table 5 shows the valve switching logic for the various operational states 290, 292, 294, 296, 298 described above. The respective inlet valves are toggled open during the compression stroke when the inlet check valves are closed and the outlet valves are switched during the intake stroke, when the outlet check valves are not flowing. This allows the most time for the valves to switch when no flow is expected through them. As an example, when switching from operational state 296 to operation state 294, first pressure tank inlet valve 268 must be shut during the compression stroke. While the first pressure tank inlet valve 268 is moving from the open position to the closed position, the bimodal cylinder 256 is still compressing gas into the second pressure tank 214. During the subsequent filling stroke, the first pressure tank inlet valve 268 can move from the closed position to the open position so the bimodal piston-cylinder assembly 246 can fill with natural gas at source pressure. During the first half of that filling stroke the second pressure tank outlet valve 274 can be closed and during the second half of that filling stroke the first pressure tank outlet valve 270 can be opened. If the respective outlet valves 270, 274 were to overlap, a short-circuit between tanks 1 and 2 would be created. These valving requirements demonstrate that each valve must switch in ¼ of a cycle (i.e. half of a stroke). At 2400 RPM, ¼ of a cycle requires the valve to actuate in approximately 6 ms.

TABLE 5

Valve Switching Logic

| Operational State Change | Inlet Valves Switched | Outlet Valves Switched |
| --- | --- | --- |
| State 290 to State 292 | 268 Closed | 270 Open |
| State 292 to State 294 | 268 Closed | 274/276 Closed; 270 Open |
| State 294 to State 292 | 268 Closed | 270 Closed; 274/276 Open |
| State 292 to State 298 | 268 Closed; 272 Open | 274 Closed |
| State 298 to State 296 | 272 Open; 268 Open | 276 Closed; 274 Open |
| State 296 to State 298 | 268 Closed; 272 Open | 274 Closed; 276 Open |
| State 294 to State 296 | 268 Open | 270 Closed; 274 Open |
| State 296 to State 294 | 268 Closed | 274 Closed; 270 Open |

The hardware that described in this example is summarized in Table 6.

TABLE 6

| Refueling System Prototype Specifications | |
| --- | --- |
| Compression Ratio | 4.7 |
| Inlet check valve equivalent area (mm$^2$) | 389 |
| Outlet check valve equivalent area (mm$^2$) | 389 |
| Refueling mode valves equivalent area (mm$^2$) | 294 |
| Intermediate volume (mm$^3$) | 183000 |

Figure 29:
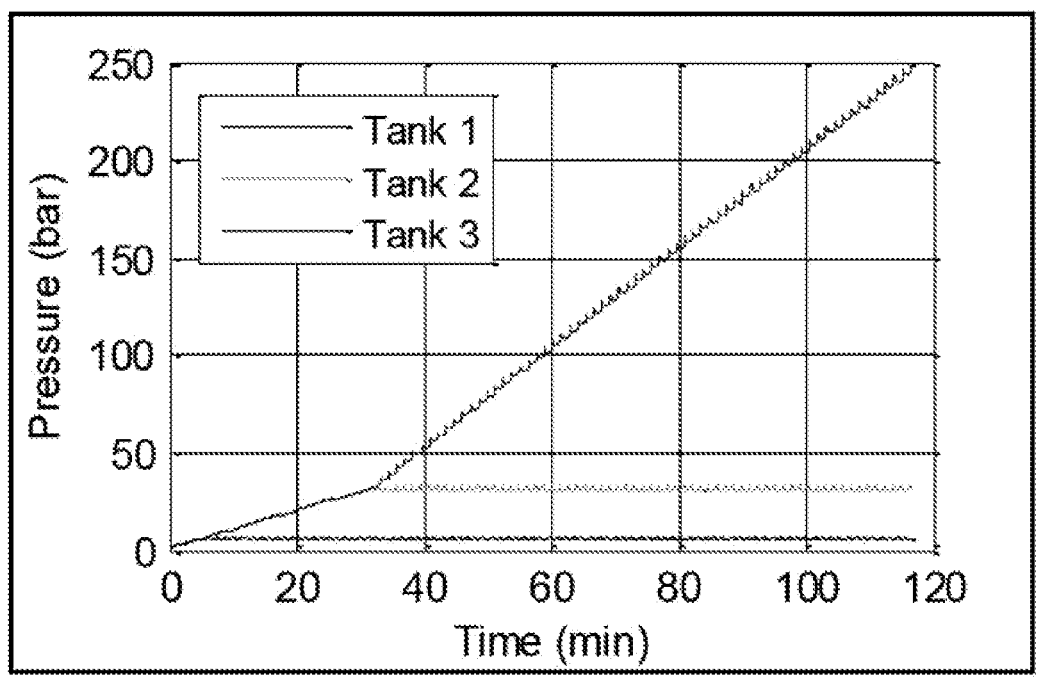
FIG. 29 is a plot of pressures in first, second, and third pressure tanks versus time during a refueling cycle.
Figure 30:
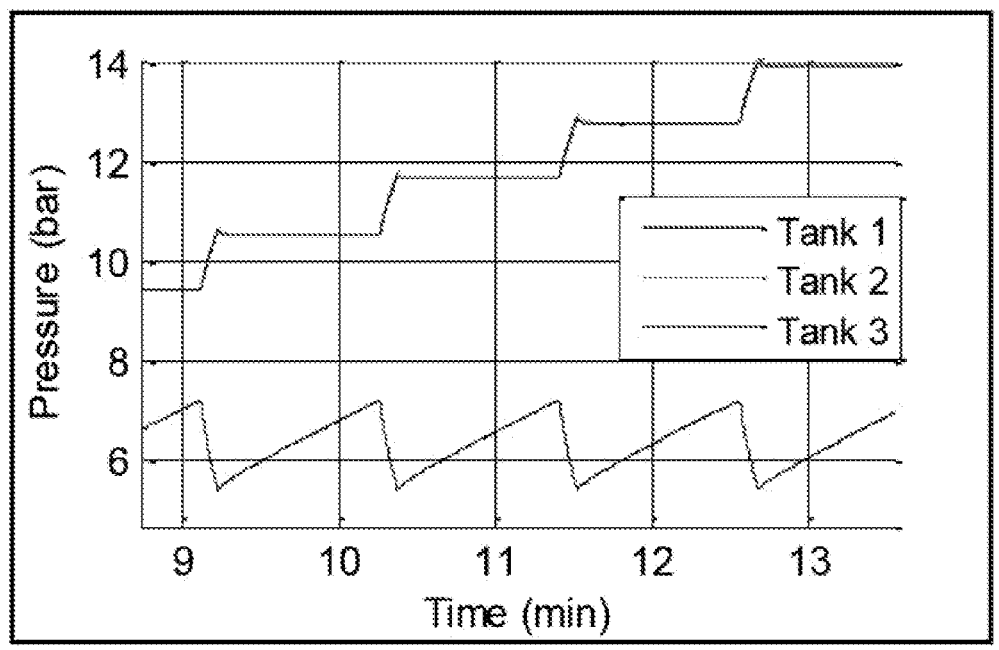
FIG. 30 is an enlarged view of a portion of the plot of FIG. 29.

A full refueling cycle is defined as filling the first, second, and third pressure tanks 212, 214, 216 from initial conditions (i.e. all pressure tanks are substantially at source pressure) and staging the compression of gas until the third pressure tank 216 reaches a desired final pressure (e.g., 250 bar). FIG. 29 shows pressures in the first, second, and third pressure tanks 212, 214, 216 during an example full refueling cycle. FIG. 30 shows the pressure changes in the first and second pressure tanks 212, 214 while the second pressure tank 214 is being filled from the first pressure tank 212. When operating in operational state 296 (stage 2 compression), the pressure in the second pressure tank 214 can increase while the pressure in the first pressure tank 212 decreases. Once the first pressure tank 212 has reached a low pressure threshold, the computer 100 can switch the system back to operational state 294 (stage 1 compression), and the first pressure tank 212 can be replenished from the source supply while the pressure in the second pressure tank 214 remains constant.

Figure 31:
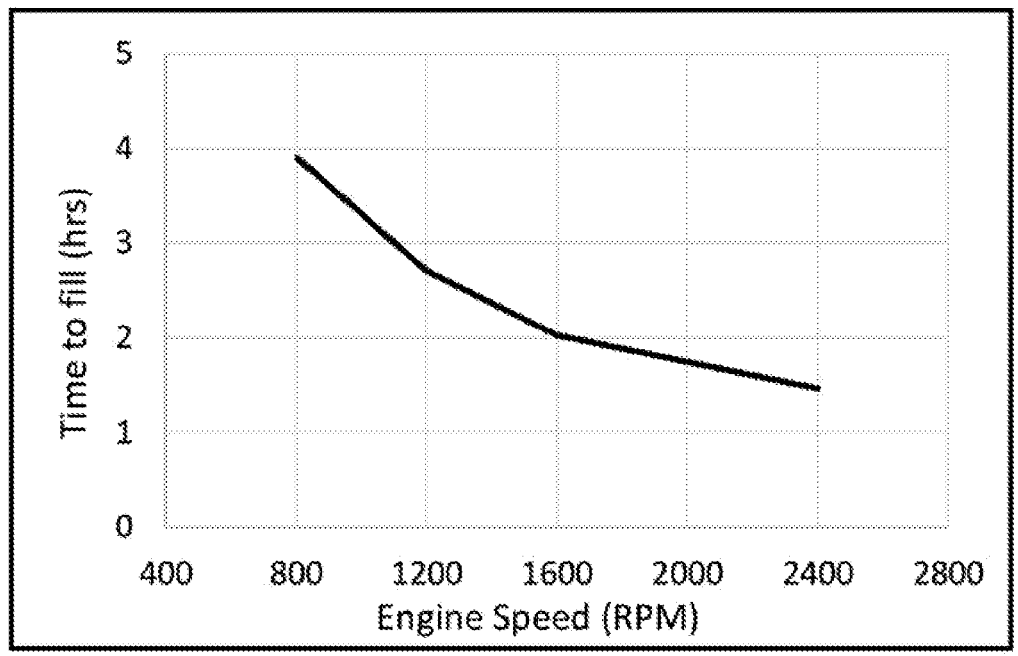
FIG. 31 is a plot of time required to compress gas into a third pressure tank to a desired pressure versus engine speed.

A primary performance consideration is to fill the third pressure tank 216 with about 10 gallons gasoline equivalent of CNG on an energy basis. The third pressure tank 216 can have a volume of from about 140 L to about 150 L to hold the equivalent amount of natural gas at 250 bar. Table 7 and Table 8 summarize the key metrics. Each stage-specific metric is given at the design pressure for the stage (i.e., stage 2 is 7.2 bar to 42.4 bar) but there are times when the values will vary due to the actual state-of-charge of the pressure tanks 212, 214, 216. The time required to fill the pressure tanks 212, 214, 216 is a function of engine speed and is shown in FIG. 31.

TABLE 7

System Performance Metrics

| | |
|---|---|
| Total compression work to fill (MJ) | 21.8 |
| Fuel energy required* (MJ) | 72.7 |
| Ratio energy used to energy stored | 6% |

*Assumes 30% engine efficiency

TABLE 8

Stage Specific Performance Metrics

| | Stage 1 | Stage 2 | Stage 3 |
|---|---|---|---|
| % of time | 86% | 13% | 1% |
| Mass flow at design pressure (kg/hr) | 7 | 40 | 239 |
| Volumetric flow at design pressure (m³/hr) | 9 | 9 | 9 |
| Avg. power at design pressure (kW) | 0.7 | 4 | 24 |

The main metric of performance is to fill the third pressure tank 216 with about 10 gallons gasoline equivalent of CNG on an energy basis. The third pressure tank 216 can have a volume of from about 140 L to about 150 L to hold the equivalent amount of natural gas at 250 bar. Table 7 and Table 8 summarize the key metrics. Each stage-specific metric is given at the design pressure for the stage (i.e., stage 2 is 7.2 bar to 42.4 bar) but there are times when the values will vary due to the actual state-of-charge of the pressure tanks 212, 214, 216. The time required to fill the pressure tanks 212, 214, 216 is a function of engine speed and is shown in FIG. 31.

Figure 32:
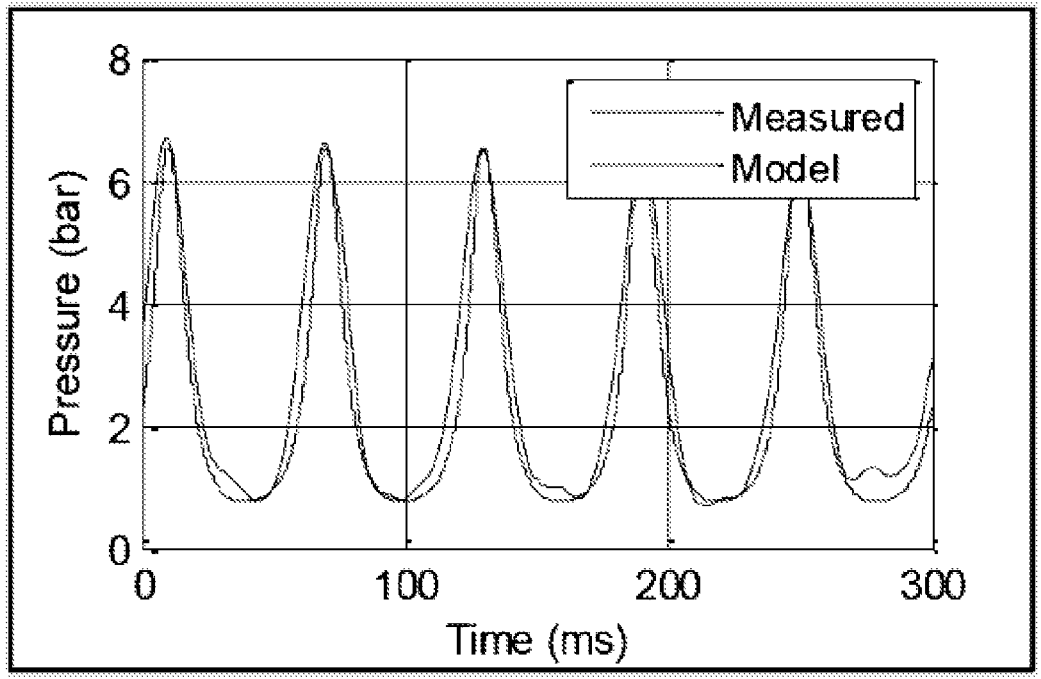
FIG. 32 is a plot of measured intermediate volume pressure versus time compared to pressure predicted by a dynamic model.

A prototype engine was run to fill the first pressure tank 212 using ambient air as the working media at a source pressure of 0.88 bar (1100 m altitude). The first pressure tank had a volume of 140 L and was pressurized to 6.8 bar during the test. The engine was run at 1000 RPM FIG. 32 shows the model prediction of pressure inside the intermediate volume against the measured data during the process pressurizing the first pressure tank 212. For this plot, the pressure in the first pressure tank 212 was 6.8 bar. A Kulite HEM-375 pressure transducer was used on the test engine having a sensor range of 0-345 bar (0-5000 psi) with ±1.72 bar (±25 psi) accuracy.

Figure 33:
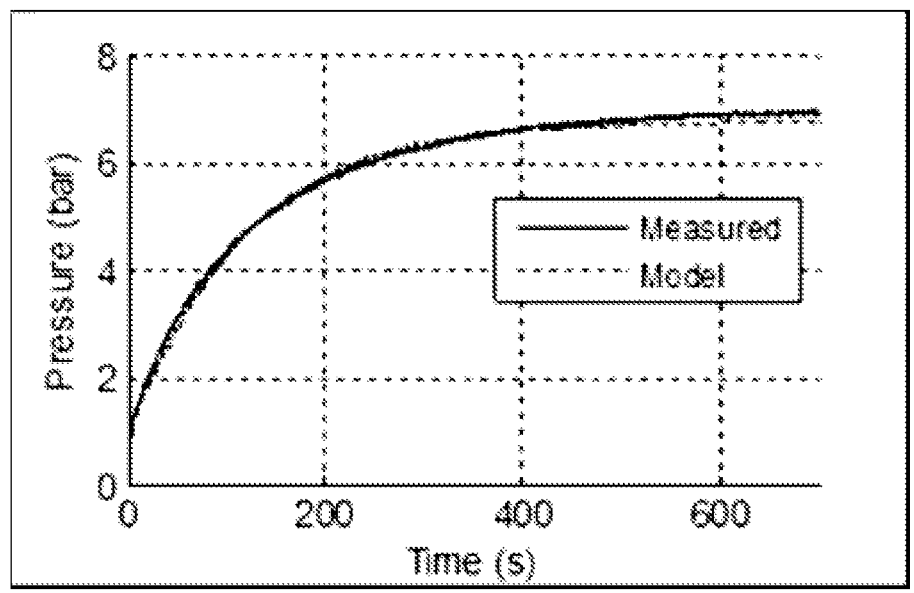
FIG. 33 is a plot of the measured tank pressure versus time compared to pressure predicted by a dynamic model.

FIG. 33 shows the model prediction of pressure in the first pressure tank 212 versus measured data during the pressurization process. The model closely matches the measured data, with the model and measured data diverging slightly beginning at a time of about 700 seconds and a pressure of about 7 bar. This could be due differences between the modeled and actual heat transfer rates, as well as mass loss from leakage in the experimental setup.

Example 2

The following example proceeds with respect to the natural gas compression system 200 of FIG. 2 including only the first pressure tank 212. However, the devices and methods described below can be applicable to any of the natural gas compression system embodiments described herein. The internal combustion engine 210 can dually serve the purpose of providing vehicle propulsion and compression for natural gas refueling with minimal hardware substitutions. A prototype vehicle that operates normally under commuting conditions and is configured as a home natural gas compressor/filling station, is described herein. This approach can mitigate refueling infrastructure concerns, removing a primary barrier to the adoption of natural gas-fueled light duty vehicles.

In many locations, the retail price difference between gasoline or diesel and compressed natural gas (CNG) can be over $2.00 per equivalent gallon of gasoline (GGE). This spread is expected to continue for several decades, due to the plentiful domestic supply of natural gas. Natural gas usage for transportation can provide benefits beyond the GGE cost savings over conventional fuels. An increase in the number of natural gas-fueled vehicles could also reduce regulated air emissions, increase revenues spent on domestic natural gas exploration and production, and decrease dependence on imported petroleum.

In order to have an energy density (thus, vehicle driving range) approaching gasoline, natural gas is compressed and stored at pressures up to about 250 bar (3626 psi). Compressors can be divided into two main types, dynamic and positive displacement. An axial compressor, such as used in turbojet engines, is an example of a dynamic compressor. A reciprocating engine piston-cylinder is an example of a positive displacement compressor. Positive displacement compressors, like the bimodal engine presented here, trap consecutive quantities of gas in an enclosure, reducing the volume of the enclosure (increasing the pressure and temperature), and then push the compressed gas out of the enclosure. Air and gas compressors can employ multi-staging in order to increase the efficiency of the compression process. In the disclosed embodiment, the same piston-cylinder assembly can be used for all compression stages, which increases the design difficulty.

In this example, an air compression test was performed using the natural gas compression system 208. The natural gas compression system 208 included a Cummins B-series 6 cylinder 5.9 L compression ignition engine 210 coupled to an AC motor. The air was compressed into the first pressure tank 212 while the temperatures and pressures in the bimodal piston-cylinder assembly 246 and the first pressure tank 212 were recorded. A numerical model of the engine 210 including the bimodal piston-cylinder assembly 246 was created in MATLAB Simulink. The goal of the model was to simulate the filling of the fuel tank (i.e., the third pressure tank 216) of the vehicle 200 and aid in determining optimized specifications of the system 208. The model was capable of simulating relevant engine dynamics such as piston position, velocity, and engine torque. These parameters were used to calculate the pressures and temperatures present inside the bimodal piston-cylinder assembly 246, intermediate volumes outside the bimodal piston-cylinder assembly 246, and filling the pressure tanks 212, 214, 216.

A 125 HP 230V TECO Westinghouse Max-E1 3-phase induction motor (IM) controlled by a Yaskawa A1000 variable frequency drive (VFD) was utilized in this example. The induction motor was coupled to a B-series Cummins diesel engine 210, with a modified compression ratio and a displacement of 0.98 L/cylinder. More 6BT engine 210 specifications are provided by Table 9. The stock engine valve timings are shown for reference, actual flow to and from the bimodal piston-cylinder assembly is controlled by the check valves 284, 280. Data acquisition was conducted with a National Instruments cRIO-9074 controller and chassis with field programmable gate array capabilities (FPGA) controlled by LabVIEW 2013 software.

Cooling the 6BT engine was accomplished with the stock cross flow heat exchanger from a donor vehicle, along with added dual electric 0.4 m [16 inch] diameter fans in a pull configuration. Engine coolant was circulated with a 50 GPM electric powered water pump that replaced the stock mechanical driven pump. The cooling system was powered by two 6V deep cell batteries in series with a linear trickle charger. For this facility a suitable motored air (that is, oil laden exhaust air from engine cylinders 2 through 6) scavenging system was constructed with a DFRE Series inline 0.25 m [10 inch] diameter duct fan with Plymovent EG-1 exhaust hose. This system removed motored air from the test facility at 550 CFM and vented the exhaust outdoors.

Figure 34:
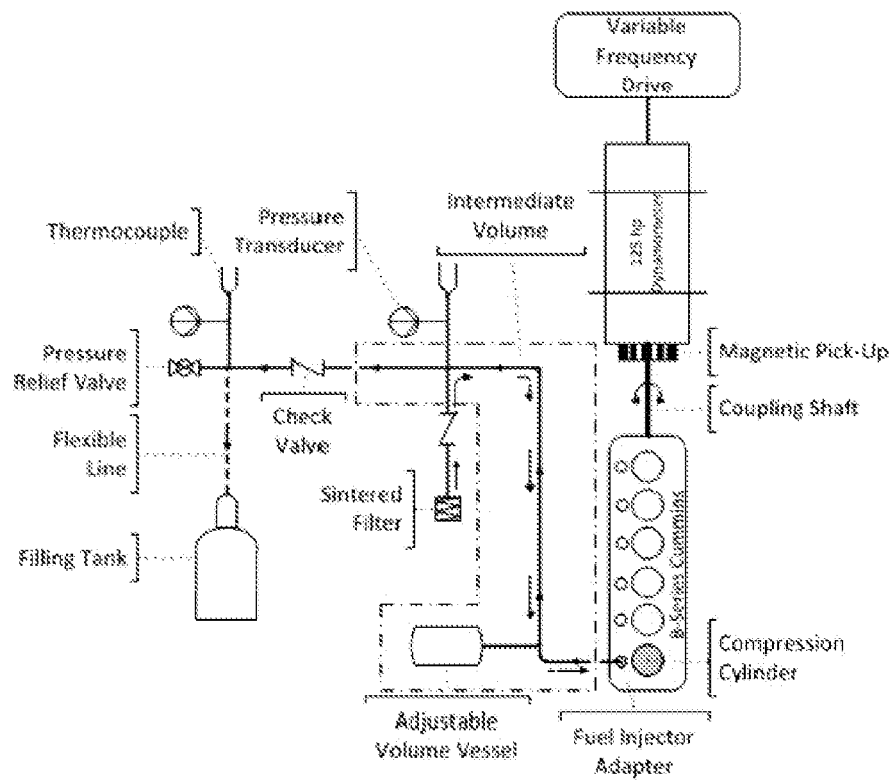
FIG. 34 is a schematic representation of another embodiment of a natural gas compression system.

For pressure tank filling experiments, the bimodal piston-cylinder assembly 246 was deactivated by removing the push rods. In order to get access to the compression chamber the fuel injector was removed. A fabricated through-hole adapter replaced the fuel injector to couple the compression chamber to a flow circuit. The flow circuit refers to the flow path of the compressed gas from the compression chamber to the first pressure tank 212. A custom cylinder head, such as the cylinder head 232, can have one or more compressor valves 248 added to the bimodal piston-cylinder assembly 246 which, when activated, can allow gas to flow in and out of the bimodal piston-cylinder assembly, as described above. FIG. 34 illustrates the compressed gas flow circuit, comprising an inlet and outlet check valve 284, 280 (see also FIG. 6), a pressure relief valve (not shown), a sintered breather filter, a variable volume vessel, and flexible stainless tubing. The test system was constructed of ⅜" and ¼" high pressure rated stainless steel tubing fastened with compression fitting connections. Sensors in the flow path included two Omega pressure transducers (PX309-500G5V and PX309-2KG5V) with an accuracy of ±2.0% Full Scale Output (68.8 kPa [10 psi] and 276 kPa [40 psi], respectively) and two McMaster-Carr type K thermocouples (3857K212) with an accuracy of ±2° C. Measurements were taken at the cylinder clearance volume and the first pressure tank 212.

TABLE 9

Cummins 6BT Engine Specifications.

| | |
|---|---|
| Displacement/Cylinder | .98 liters |
| Stroke | 120 mm |
| Bore | 102 mm |
| Connecting Rod | 129 mm |
| Compression ratio | 17:1 |
| Number of Valves/Cylinder | 2 |
| Intake Valve Open | 0° CA* |
| Intake Valve Close | 202° CA* |
| Exhaust Valve Open | 482° CA* |
| Exhaust Valve Close | 8° CA* |

*0° CA is TDC prior to intake stroke; TDC combustion is ~360° CA

An adjustable control volume vessel similar to the control volume 360 of FIG. 11 and additional tubing sections that connect to the fuel injector port can add additional volume to the clearance volume of the bimodal piston-cylinder assembly 246. Because of this, the compression ratio ranged from 16.3:1—a slight reduction from the stock 17:1—down to 3.9. The addition of the adjustable volume pressure vessel to lower the compression ratio can increase the clearance volume in the compressor, which can decrease the volumetric efficiency. The efficiency decreases because every cycle the gas trapped in the clearance volume is compressed to the discharge pressure and subsequently expanded back to the inlet pressure. This gas does not travel downstream to the filling tank and is considered a loss within the compressor. For the 16.3:1 and 3.9:1 compression ratios, the clearance volumes were 0.064 L and 0.339 L, respectively.

The inlet and outlet check valves 284, 280 allowed air to pass into the bimodal piston-cylinder assembly 246 during the intake stroke of the bimodal piston 256 while not allowing air to pass from the first pressure tank 212. The opposite is true during the compression stroke of the bimodal piston 256. Because of the deactivation of the valve train for the bimodal piston-cylinder assembly 246 and access through the fuel injector port, compression events happen every cycle of the engine 210.

For the air filling experiments, seventeen total tests were run under varying conditions. The compression ratio for the bimodal piston-cylinder assembly was about 3.9:1 for the first twelve of these tests, and about 16.3:1 for five additional tests. A parametric study was performed by rotating the engine 210 at three different speeds (840 or stock-idle, 1000, and 1800 RPM) and two different inlet pressures (89.1 kPa absolute [12.9 psia] (atmospheric), and approximately 103 kPa gage [15 psig]. The higher inlet pressure, though not representative of our first stage pressure, was an important iteration towards understanding the thermodynamic behavior of the system. Bend, Oreg., the location of the laboratory, is located at an altitude of 1067 m [3,500 ft], which has an atmospheric pressure of 89.1 kPa [7]. These six tests were run once with the intermediate stainless steel tubing from the cylinder to the storage tank covered in insulating fiberglass tape, or wrap, and once without, for a total of twelve runs. The wrap limits heat transfer, bringing the results closer to that of an adiabatic system, whereas the without wrap scenario approximated isothermal conditions. These experiments are highly transient; nevertheless, the one dimensional, steady-state thermal resistance can be compared to conduction for both the insulated and non-insulated cases to estimate the effect of the fiberglass wrap.

The thermal conductivity of stainless steel at 400K was approximately 17.3 W/mK, while the conductivity of the fiberglass insulation was around 0.038 W/mK at 300K [8]. For the unwrapped case, this yields, on a per unit length basis, a thermal resistance of 0.0019 W/K and 0.0044 W/K for ⅜" and ¼" outer diameter tubing, respectively. For the wrapped case, the thermal resistances were 0.87 W/K and 2.00 W/K for ⅜" and ¼" outer diameters, respectively, assuming a unit length. These resistances are over 450 times higher than the unwrapped tubing and, thus, substantially limited heat transfer. However, even when wrapped, there can be some heat transfer from the walls of the cylinder 238 to the engine coolant during the compression stroke. When the tubing is left unwrapped, heat transfer occurs primarily via natural convection to the surroundings. The check valves 284, 280 used in the experiment had a maximum operating temperature limit of 473 K which, if exceeded, could result in failure of the seals. For the compression ratio of 16.3:1, tests were only run without insulating wrap since the higher compression ratio produces higher temperatures at the end of a compression stroke. The temperature limit was reached too quickly when wrap was applied and no useful filling data could be obtained. This temperature limit was also the reason why 1000 and 1800 RPM operation was not attempted with the pressurized inlet; the limit was reached before the AC motor reached the desired speed. In many cases, for the compression ratio of 3.9:1, the pressure in the first pressure tank 212 reached steady state and the test was ended prior to this temperature limit being reached.

Table 10 lists the compression ratio (CR), the engine RPM, the gage inlet pressure in kPa, and the resulting peak pressure in the bimodal piston-cylinder assembly 246 and the first pressure tank in kPa. The runs in which wrap was used are labeled with a check mark and those without header wrap are labeled with an "x" in the Wrap column. The measured peak pressures for the bimodal piston-cylinder assembly 246 for all of the testing conditions are compared to the calculated pressures that would result from reversible adiabatic and isothermal ideal gas compression. Adiabatic compression represents the highest possible pressure (and temperature), whereas isothermal compression represents the lowest possible pressure (and temperature, assuming the air in the cylinder 238 is the same temperature as the ambient environment).

after the cylinder pressure spike and is smaller in magnitude because the volume of the tank is just over 4 times the displacement volume of the compression cylinder. For the filling test seen in FIG. 36, the temperature in the tank 212 rose by 2 K. This can suggest that most of the thermal energy generated during the compression stroke of the bimodal piston 256 was dissipated by the time it reached the tank 212. For the test

TABLE 10

Experimental matrix of operating conditions for compression of air using the bimodal engine. All pressures listed are gauge. Wrap refers to insulating tape.

| CR | RPM | $P_{in}$ [kPa] | Wrap | Peak Tank [kPa] | Peak Cylinder | Adiabatic [kPa] | Isothermal [kPa] |
|---|---|---|---|---|---|---|---|
| 16.3:1 | 840 | 0 | x | 1430 | 2500 | 5028 | 1646 |
| | 1000 | 0 | x | 1220 | 2250 | 5028 | 1646 |
| | 1800 | 0 | x | 880 | 2350 | 5028 | 1646 |
| | 840 | 164 | x | 4000 | 5700 | 13192 | 4320 |
| 3.9:1 | 840 | 0 | x | 250 | 520 | 679 | 394 |
| | 1000 | 0 | x | 210 | 480 | 679 | 394 |
| | 1800 | 0 | x | 140 | 430 | 679 | 394 |
| | 840 | 113 | x | 660 | 1320 | 1438 | 835 |
| | 1000 | 119 | x | 625 | 1370 | 1479 | 858 |
| | 1800 | 103 | x | 520 | 1200 | 1371 | 796 |
| | 840 | 0 | ✓ | 240 | 600 | 679 | 394 |
| | 1000 | 0 | ✓ | 210 | 550 | 679 | 394 |
| | 1800 | 0 | ✓ | 140 | 540 | 679 | 394 |
| | 840 | 102 | ✓ | 640 | 1225 | 1365 | 792 |
| | 1000 | 102 | ✓ | 530 | 1200 | 1365 | 792 |
| | 1800 | 104 | ✓ | 380 | 1150 | 1378 | 800 |

Figure 35:
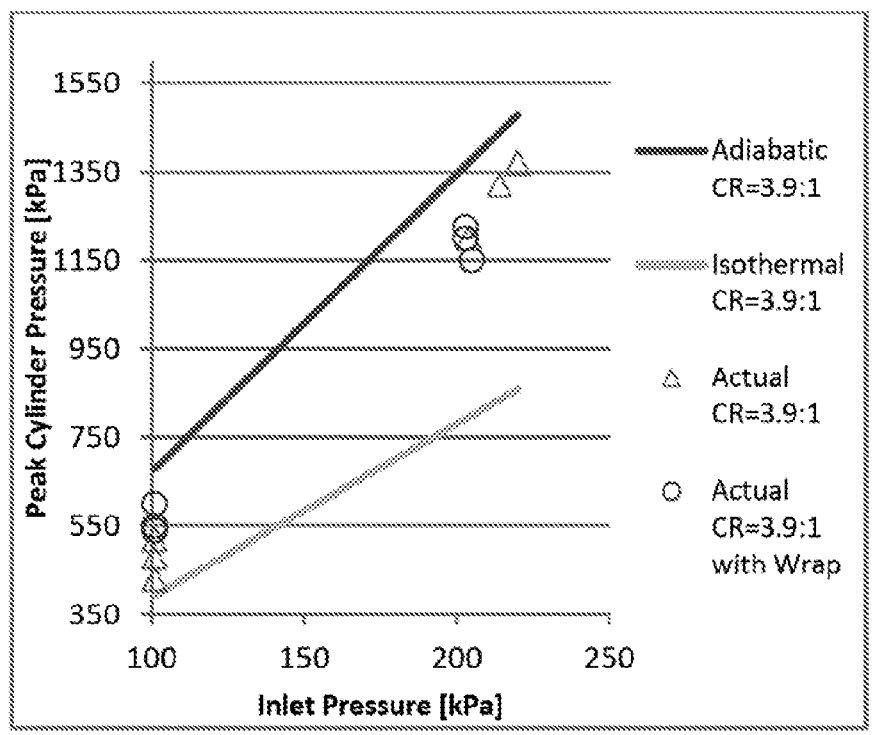
FIG. 35 is a plot of the peak cylinder pressure in a bimodal piston-cylinder assembly compared to adiabatic and isothermal bounds.
Figure 36:
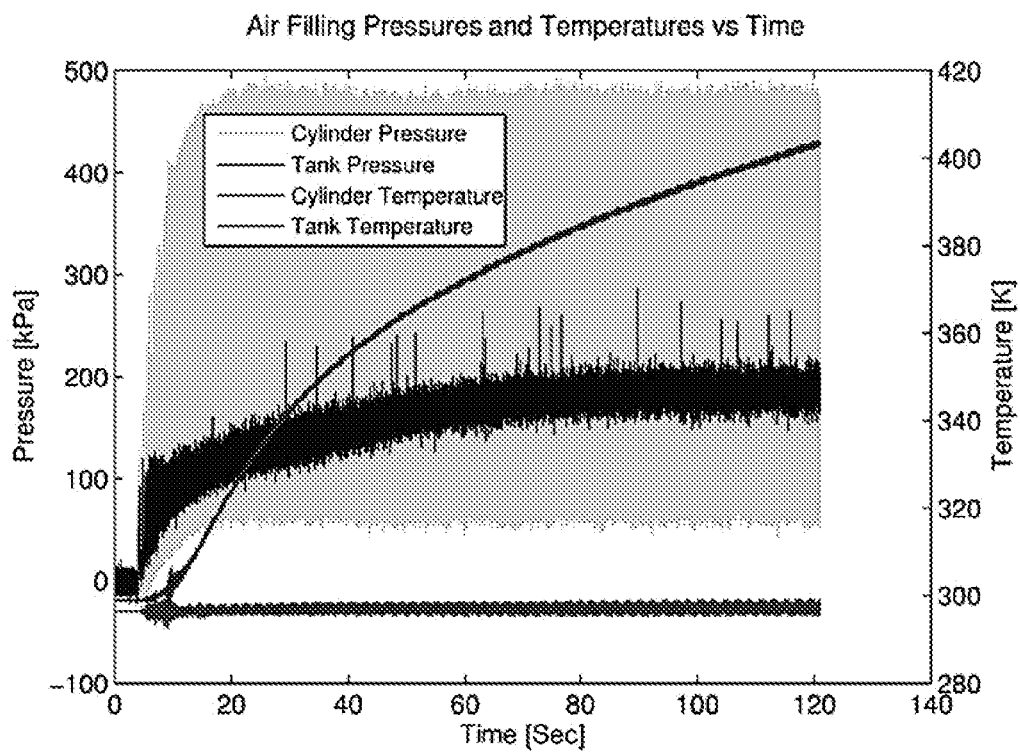
FIG. 36 is a plot of pressure in a pressure tank versus time for an air compression test with a bimodal piston-cylinder assembly having a compression ratio of 3.9:1.
Figure 37:
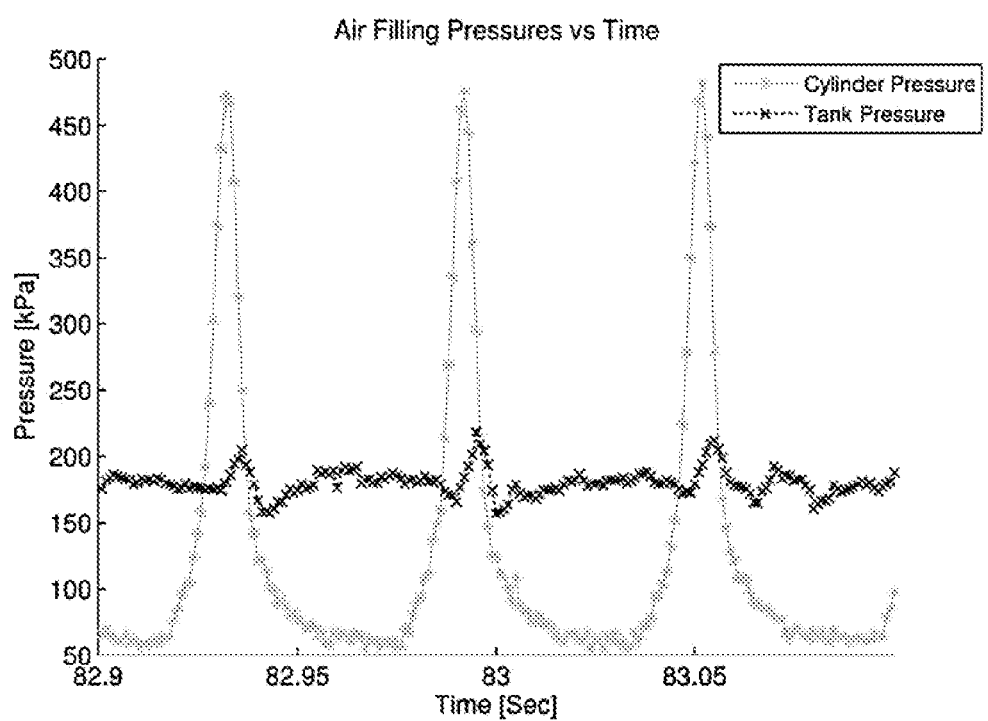
FIG. 37 is an enlarged view of a portion of the plot of FIG. 36.

FIG. 35 shows the data from Table 10 in graphical form, with the adiabatic and isothermal limits presented as solid lines. The recorded peak cylinder pressures are triangular markers for the unwrapped cases and circular markers for the wrapped cases. FIG. 36 is a plot of the pressure and temperature for the bimodal piston-cylinder assembly 246 and the first pressure tank 212 versus time. This was for the case which had a compression ratio of 3.9:1, with atmospheric inlet pressure, running at 1000 RPM with no header wrap (Table 9, second row of CR=3.9:1). FIG. 37 shows further detail of the compression events in the bimodal piston-cylinder assembly 246 and the associated pressure rise in the first pressure tank 212 where filling time was 121 seconds and the final pressure was 480 kPa.

Figure 38:
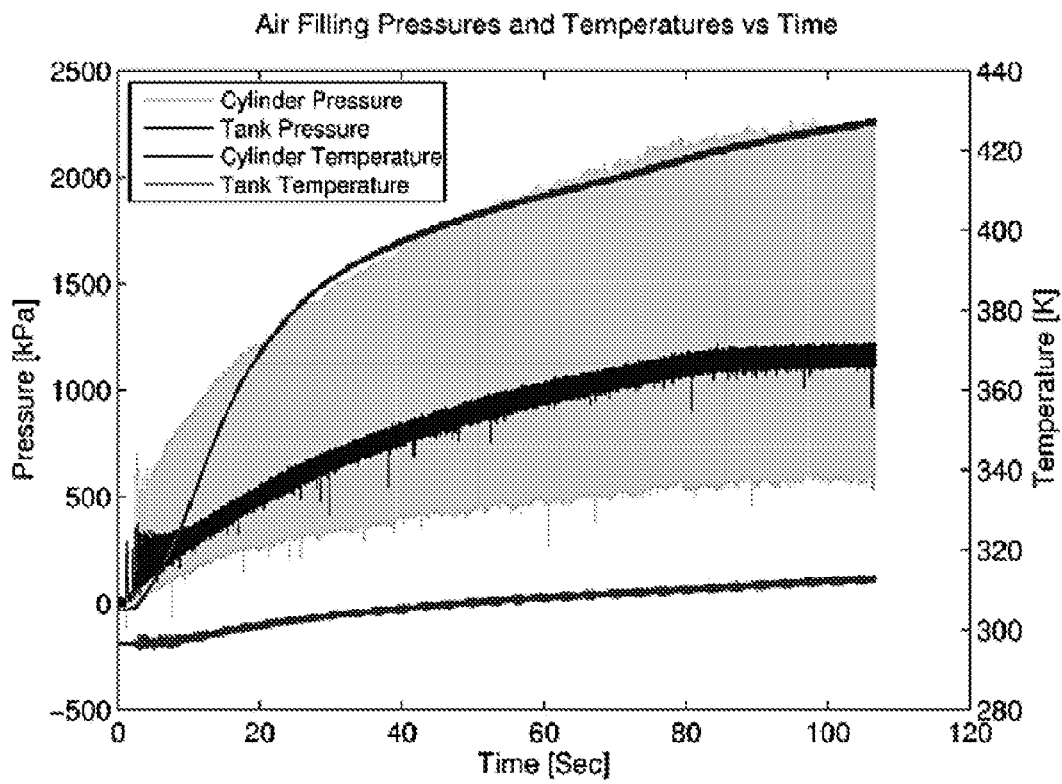
FIG. 38 is a plot of pressure in a pressure tank versus time for an air compression test with a bimodal piston-cylinder assembly having a compression ratio of 16.3:1.
Figure 39:
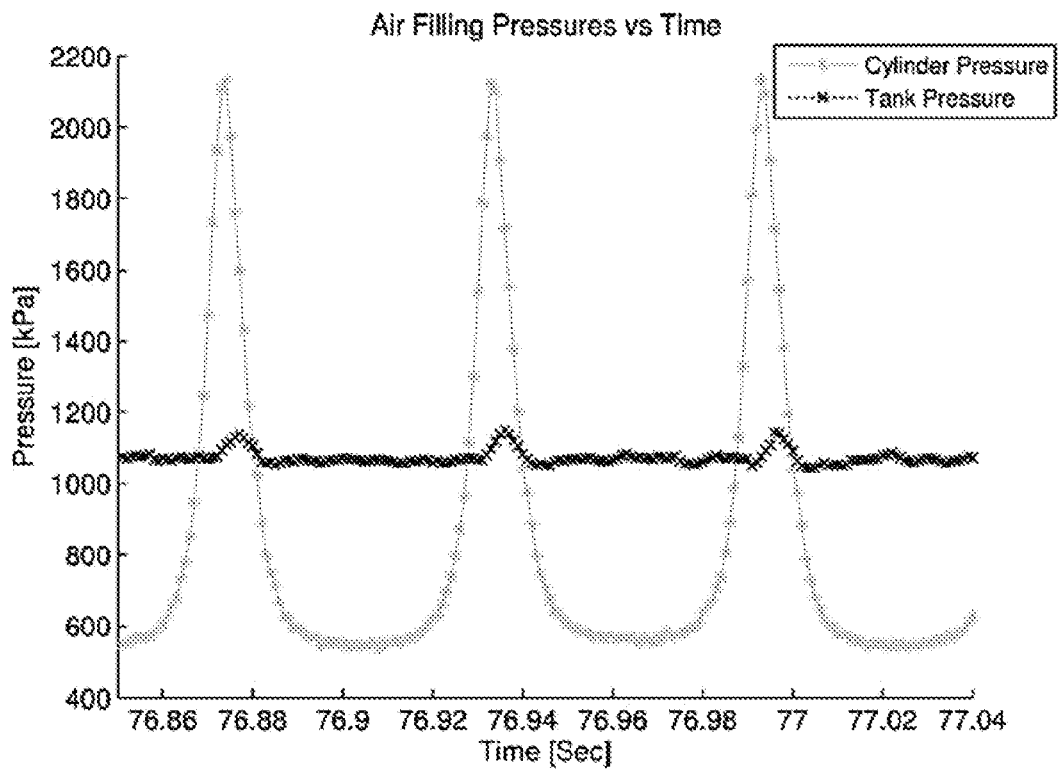
FIG. 39 is an enlarged view of a portion of the plot of FIG. 38.

FIG. 38 shows the same data illustrated in FIG. 36, but for a compression ratio of 16.3:1. All other conditions were the same (atmospheric inlet pressure, 1000 RPM, no wrap) for a fill time of 106 seconds and final pressure of 1220 kPa. FIG. 39 is a close up view of the compression events, showing that the cylinder pressure varied between about 560 kPa and about 2150 kPa, while the tank pressure remained at about 1050 kPa with short increases to about 1200 kPa coinciding approximately with peak cylinder pressures.

FIGS. 35 and 38 show data collected during the entire fill period. In FIG. 35, the cylinder pressure initially increases as the dynamometer ramps up to 1000 RPM, this takes approximately 10 seconds. After about 30 seconds, the peak cylinder pressure is reached, indicating the rate of change of mass flowing into the pressure tank 212 has reached a near constant level. Conversely, in FIG. 37 the cylinder pressure continues to rise with time, only beginning to level off near the end of the filling test. Notably, the tank pressures had first order time responses of approximately 31 s and 37 s, respectively, for the 1000 RPM cases shown.

FIGS. 37 and 39 show close-up views of the individual compression strokes and the accompanying spikes in cylinder and tank pressure. The spike in tank pressure appears slightly presented in FIG. 38, the temperature in the tank 212 rose by 15 K. The reason this tank temperature was higher was due to the high compression ratio. However, 15 K is still a small increase compared to the approximately 100 K increase of the temperature in the bimodal piston-cylinder assembly 246.

Figure 40:
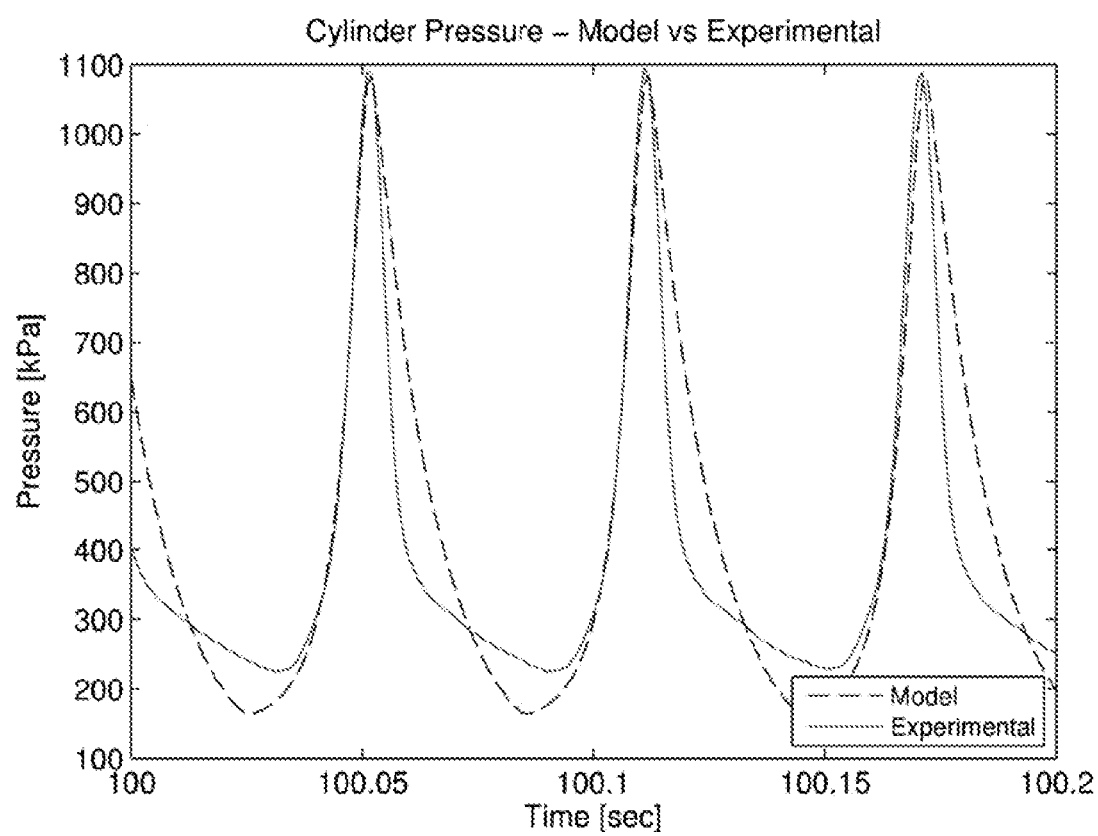
FIG. 40 is a plot of pressure versus time for a pressure tank as recorded in an air compression test and as predicted by a dynamic model.

FIG. 40 compares the pressure recorded during an experimental air compression test (CR=3.9:1, 1000 RPM, 103 kPa gage [15 psig] inlet pressure, wrapped) to that predicted by the modified Simulink numerical model. Air was used as the working fluid rather than methane, where the ratio of specific heats for air was 1.4 as opposed to 1.3 for methane. When starting a filling experiment, the AC motor slowly ramps up to the desired speed, as can be seen in FIG. 36. This is unlike the numerical model, which starts from the desired engine RPM right from the beginning. Because of this, data from later in the filling test was selected for FIG. 36. The model slightly underestimates the peak pressure in the bimodal piston-cylinder assembly 246. The shape of the pressure curve during the compression stroke closely matches that from the experimental data. However, during the expansion stroke, experimental data suggests the pressure falls more abruptly. As the bimodal piston 256 nears BDC, the pressure begins to fall more gradually and at BDC is somewhat higher than predicted, partly due to the under-predicted peak cylinder pressure. This may also be occurring because of additional, unmodeled inlet flow restrictions, which prevent the pressure from reaching the value calculated by the model. The difference in shape could be attributed to the large clearance volume, which can be quickly expanded before additional air must be pulled into the bimodal piston-cylinder assembly 246 from the inlet.

Referring again to Table 10, there is a clear downward trend in both peak pressure in the bimodal piston-cylinder assembly 246 and peak pressure in the first pressure tank 212 as the engine speed is increased from 840 RPM to 1800 RPM. This indicates increased losses from friction and flow through constrictions in the tubing, resulting in a reduction in volumetric efficiency as engine speed is increased. The pressures in the pressure tank 212 are considerably lower than the peak pressures in the bimodal piston-cylinder assembly 246. This indicates low mass flow rates and substantial losses as the compressed air traveled from the bimodal piston-cylinder assembly 246 into the first pressure tank 212. Larger diameter tubing can be used to reduce losses.

For the high compression ratio runs, the maximum temperature limit of the check valves 284, 280 was reached sooner as engine speed was increased, thus the length of the filling experiment was shorter at high RPM. This may partially contribute to the fall in pressure in the first pressure tank 212. The tank pressure would usually plateau in the lower compression ratio tests before the maximum temperature was reached. All of the measured pressures fall within the range bounded by the adiabatic and isothermal compression cases, indicating realistic results (see FIG. 35). All the compression tests for the 16.3:1 compression ratio were closest to the isothermal limit. Compression at this ratio creates very high temperatures, which generates a large driving force for heat transfer to the surroundings, much larger than is present for the 3.9:1 compression ratio.

The unwrapped filling tests with a 3.9:1 compression ratio and an atmospheric inlet pressure were also closer to the isothermal limit, although not as close as the high compression ratio tests. This indicates the temperatures produced were sufficiently high enough for significant heat transfer to occur as the compressed air flowed to the first pressure tank 212. However, when the inlet pressure is increased, the resulting pressures are closer to the adiabatic case. The higher density can have more of an adiabatic core flow which is not exposed to the tubing walls. When the wrap was added, the peak pressure in the bimodal piston-cylinder assembly 246 for both the atmospheric and pressurized inlet pressures was nearest the adiabatic condition. For both cases, the measured pressure was close to 90% of the adiabatic value at 840 RPM and about 80% at 1800 RPM, indicating the header wrap was effective.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system for compressing a fuel gas, comprising a reciprocating internal combustion engine including at least one bimodal piston-cylinder assembly operable in a compression mode and in a combustion mode, the at least one bimodal piston-cylinder assembly comprising a piston configured to travel in a cylinder and to compress fuel gas received in the cylinder from a fuel gas source with alternating intake and compression strokes of the piston without combusting the fuel gas when operating in the compression mode to supply compressed fuel gas to at least a first pressure tank in fluid communication with the bimodal piston-cylinder assembly, and to receive fuel gas for combustion in the cylinder as fuel when operating in the combustion mode.

2. The system of claim 1, wherein the first pressure tank is configured to receive compressed fuel gas from the bimodal piston-cylinder assembly until the first pressure tank reaches a predetermined pressure.

3. The system of claim 2, further comprising a second pressure tank in fluid communication with the bimodal piston-cylinder assembly and with the first pressure tank, the second pressure tank being configured to receive compressed fuel gas from the bimodal piston-cylinder assembly until the second pressure tank reaches a predetermined pressure.

4. The system of claim 3, wherein when the first and second pressure tanks have reached the predetermined pressures, the first pressure tank is configured to supply fuel gas to the bimodal piston-cylinder assembly, and the piston is configured to compress the fuel gas supplied by the first pressure tank such that the compressed fuel gas flows into the second pressure tank.

5. The system of claim 3, further comprising a third pressure tank in fluid communication with the bimodal piston-cylinder assembly and with the first and second pressure tanks.

6. The system of claim 5, wherein:

the piston is configured to compress fuel gas in the cylinder such that the compressed fuel gas flows into the first, second, and third pressure tanks until the first, second, and third pressure tanks reach the predetermined pressures, the predetermined pressures being a first predetermined pressure;

when the first, second, and third pressure tanks have reached the first predetermined pressure, the first pressure tank is configured to supply fuel gas to the bimodal piston-cylinder assembly, and the piston is configured to compress the fuel gas supplied by the first pressure tank such that compressed fuel gas flows into the second and third pressure tanks until the second and third pressure tanks reach a second predetermined pressure; and when the second and third pressure tanks have reached the second predetermined pressure, the second pressure tank is configured to supply fuel gas to the bimodal piston-cylinder assembly, and the piston is configured to compress the fuel gas supplied by the second pressure tank such that compressed fuel gas flows into the third pressure tank.

7. The system of claim 3, further comprising at least one heat exchanger through which compressed fuel gas flows after exiting the bimodal piston-cylinder assembly and before entering the first or second pressure tanks.

8. The system of claim 1, wherein the system is configured to compress fuel gas in three stages using the bimodal piston-cylinder assembly.

9. The system of claim 1, wherein the reciprocating internal combustion engine comprises a plurality of piston-cylinder assemblies, the plurality of piston-cylinder assemblies being configured to drive the bimodal piston-cylinder assembly when the bimodal piston-cylinder assembly is operating in the compression mode.

10. The system of claim 1, wherein the fuel gas is natural gas, and the fuel gas source further comprises a natural gas source configured to supply natural gas to the bimodal piston-cylinder assembly.

11. An automobile including the system of claim 1.

12. A method, comprising: supplying a fuel gas to a bimodal piston-cylinder assembly of an internal combustion engine from a fuel gas source, the bimodal piston-cylinder assembly including a piston configured to travel in a cylinder and being operable in a compression mode to compress fuel gas in the cylinder with alternating intake and compression strokes of the piston without combusting the fuel gas, and in a combustion mode to receive fuel gas for combustion in the cylinder as fuel, the bimodal piston-cylinder assembly being fluidly connected to a first pressure tank and a second pressure tank; compressing fuel gas supplied from the fuel gas source in the bimodal piston-cylinder assembly with the piston such that compressed fuel gas flows into the first and second pressure tanks; supplying compressed fuel gas from the first pressure tank to the bimodal piston-cylinder assembly when the first and second pressure tanks reach a predetermined pressure; and further compressing the compressed fuel gas in the bimodal piston-cylinder assembly with the piston such that compressed fuel gas flows into the second pressure tank at a pressure higher than the predetermined pressure.

13. The method of claim 12, wherein compressing fuel gas supplied from the fuel gas source further comprises compressing fuel gas supplied from the fuel gas source in the piston-cylinder assembly with the piston such that compressed fuel gas flows into the first and second pressure tanks and into a third pressure tank.

14. The method of claim 13, wherein supplying compressed fuel gas further comprises supplying compressed fuel gas into the bimodal piston-cylinder assembly from the first pressure tank when the first, second, and third pressure tanks reach a predetermined pressure.

15. The method of claim 14, wherein further compressing the compressed fuel gas further comprises further compressing the compressed fuel gas supplied by the first pressure tank in the bimodal piston-cylinder assembly with the piston such that compressed fuel gas flows into the second and third pressure tanks.

16. The method of claim 12, further comprising operating a vehicle using fuel gas compressed by the bimodal piston-cylinder assembly as fuel.

17. The method of claim 12, wherein:
the fuel gas is natural gas; and
supplying fuel gas to the bimodal piston-cylinder assembly from the fuel gas source further comprises supplying natural gas to the bimodal piston cylinder-assembly via a supply nozzle fluidly connected to a natural gas source.

18. A reciprocating internal combustion engine configured to compress natural gas for storage onboard an automobile, comprising: a plurality of piston-cylinder assemblies including a piston configured to travel in a cylinder, at least one of the piston-cylinder assemblies being a bimodal piston-cylinder assembly operable to receive natural gas for combustion in the cylinder as fuel when operating in a combustion mode, and to compress natural gas in the cylinder with alternating intake and compression strokes of the piston without combusting the natural gas to provide compressed natural gas when operating in a compression mode; a cylinder head located above the plurality of piston-cylinder assemblies, the cylinder head including at least one intake valve and at least one exhaust valve in fluid communication with each respective piston-cylinder assembly, the intake valves being configured to supply a natural gas fuel-air mixture to the respective piston-cylinder assemblies before a combustion stoke of the respective pistons, the exhaust valves being configured to exhaust combustion gases from the respective piston-cylinder assemblies after the combustion stroke of the respective pistons; and one or more compressor valves located in the cylinder head in fluid communication with the bimodal piston-cylinder assembly and with at least one pressure tank through a manifold in the cylinder head.

19. An automobile comprising the reciprocating internal combustion engine of claim 18.

20. The reciprocating internal combustion engine of claim 18, wherein at least one of the intake valve or the exhaust valve in fluid communication with the bimodal piston-cylinder assembly can be deactivated when the bimodal piston-cylinder assembly operates in the compression mode.

21. The system of claim 1, wherein:
the bimodal piston-cylinder assembly is operable in a four-cycle mode comprising an intake stroke, followed by a compression stroke, followed by a combustion stroke, followed by an exhaust stroke, when operating in the combustion mode; and
the bimodal piston-cylinder assembly is operable in a two-cycle mode comprising an intake stroke followed by a compression stroke when operating in the compression mode.

* * * * *